(12) United States Patent
Lee et al.

(10) Patent No.: US 11,115,082 B2
(45) Date of Patent: Sep. 7, 2021

(54) WIRELESS POWER TRANSMISSION/RECEPTION DEVICE AND METHOD USED IN ELECTRONIC APPARATUS

(71) Applicant: Samsung Electronics Co., Ltd., Gyeonggi-do (KR)

(72) Inventors: Ju-Hyang Lee, Gyeonggi-do (KR); Keumsu Song, Seoul (KR); Dongzo Kim, Gyeonggi-do (KR); Yusu Kim, Gyeonggi-do (KR); Seho Park, Gyeonggi-do (KR); Jung-Oh Sung, Gyeonggi-do (KR); Mincheol Ha, Gyeonggi-do (KR); Changjong Son, Gyeonggi-do (KR); Seung-Nyun Kim, Incheon (KR); Yong Sang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 242 days.

(21) Appl. No.: 16/315,940

(22) PCT Filed: Mar. 28, 2017

(86) PCT No.: PCT/KR2017/003330
§ 371 (c)(1),
(2) Date: Jan. 7, 2019

(87) PCT Pub. No.: WO2018/008832
PCT Pub. Date: Jan. 11, 2018

(65) Prior Publication Data
US 2019/0229771 A1     Jul. 25, 2019

(30) Foreign Application Priority Data
Jul. 7, 2016  (KR) .......................... 10-2016-0086211

(51) Int. Cl.
*H04B 5/00* (2006.01)
*H02J 50/12* (2016.01)
(Continued)

(52) U.S. Cl.
CPC ............. *H04B 5/0037* (2013.01); *H01Q 1/22* (2013.01); *H01Q 1/24* (2013.01); *H02H 9/04* (2013.01);
(Continued)

(58) Field of Classification Search
None
See application file for complete search history.

(56) References Cited

U.S. PATENT DOCUMENTS

2009/0146658 A1   6/2009   McDowell et al.
2010/0142509 A1   6/2010   Zhu et al.
(Continued)

FOREIGN PATENT DOCUMENTS

KR   1020070017804   2/2007
KR   1020140131428   11/2014
(Continued)

OTHER PUBLICATIONS

European Search Report dated Mar. 12, 2020 issued in counterpart application No. 17824388.7-1202, 4 pages.
(Continued)

*Primary Examiner* — Jared Fureman
*Assistant Examiner* — Aqeel H Bukhari
(74) *Attorney, Agent, or Firm* — The Farrell Law Firm, P.C.

(57) ABSTRACT

According to one embodiment of the present invention, an electronic apparatus can comprises: at least one antenna; a first circuit for wirelessly receiving or transmitting power by using at least one part of the at least one antenna; a second circuit for performing at least one communication by using
(Continued)

at least one part of the at least one antenna; a first electrical path for connecting the at least one antenna to the first circuit; a second electrical path for connecting the at least one antenna to the second circuit; a third electrical path for connecting a point on the first electrical path to a point on the second electrical path; and at least one passive element or active element connected to at least one of the first electrical path, the second electrical path, and the third electrical path.

19 Claims, 29 Drawing Sheets

(51) Int. Cl.
  *H02H 9/04* (2006.01)
  *H02J 50/70* (2016.01)
  *H02J 50/80* (2016.01)
  *H02J 50/90* (2016.01)
  *H02J 50/10* (2016.01)
  *H01Q 1/22* (2006.01)
  *H01Q 1/24* (2006.01)

(52) U.S. Cl.
  CPC .............. *H02J 50/10* (2016.02); *H02J 50/12* (2016.02); *H02J 50/70* (2016.02); *H02J 50/80* (2016.02); *H02J 50/90* (2016.02); *H04B 5/0081* (2013.01)

(56) References Cited

U.S. PATENT DOCUMENTS

| | | | |
|---|---|---|---|
| 2012/0007441 A1* | 1/2012 | John | H02J 50/50 307/104 |
| 2014/0327390 A1 | 11/2014 | Park et al. | |
| 2016/0020831 A1 | 1/2016 | Hamada | |
| 2016/0028159 A1 | 1/2016 | Moon et al. | |
| 2016/0285300 A1* | 9/2016 | Summers | H02J 7/025 |
| 2016/0285311 A1* | 9/2016 | Masumoto | H02J 50/80 |
| 2016/0380471 A1* | 12/2016 | Moshfeghi | H02J 7/00302 320/108 |
| 2018/0331726 A1 | 11/2018 | Ha et al. | |

FOREIGN PATENT DOCUMENTS

| | | |
|---|---|---|
| KR | 101505456 | 3/2015 |
| KR | 1020150028042 | 3/2015 |
| KR | 1020160011784 | 2/2016 |
| KR | 1020170058206 | 5/2017 |
| WO | WO 2016/037045 | 3/2016 |

OTHER PUBLICATIONS

PCT/ISA/210 Search Report issued on PCT/KR2017/003330 (pp. 5).
PCT/ISA/237 Written Opinion issued on PCT/KR2017/003330 (pp. 5).
European Search Report dated Aug. 16, 2019 issued in counterpart application No. 17824388.7-1202, 5 pages.
European Search Report dated Mar. 1, 2019 issued in counterpart application No. 17824388.7-1202, 8 pages.
European Search Report dated Oct. 23, 2020 issued in counterpart application No. 17824388.7-1202, 4 pages.
Indian Examination Report dated Mar. 5, 2021 issued in counterpart application No. 201947004019, 5 pages.

* cited by examiner

WIRELESS POWER TRANSMISSION/RECEPTION DEVICE AND METHOD USED IN ELECTRONIC APPARATUS

PRIORITY

This application is a National Phase Entry of International Application No. PCT/KR2017/003330, which was filed on Mar. 28, 2017, and claims priority to Korean Patent Application No. 10-2016-0086211, which was filed on Jul. 7, 2016, the contents of each of which are incorporated herein by reference.

BACKGROUND

1. Field

Various embodiments disclosed herein relate to a wireless power transmission/reception device and method in an electronic device.

2. Description of the Related Art

Electronic devices may wirelessly receive power from an external device using a magnetic field. Electronic devices may also perform wireless communication, such as mobile communication and wireless Internet access. Such electronic devices may include an antenna for wireless power reception and an antenna for wireless communication.

As electronic devices such as smart phones are designed in a slim form, the available space for mounting components in electronic devices is decreasing. When multiple antennas are placed close to each other in the limited space in an electronic device, there may be radio interference between the multiple antennas. For example, an antenna for wireless power reception and an antenna for wireless communication may be close to each other, and there may be electromagnetic coupling between the antennas. Due to the electromagnetic coupling between these antennas, when power is wirelessly received from an external device, the power may leak to a system for wireless communication, and this leakage current may cause damage to the system.

SUMMARY

Various embodiments of the present disclosure provide a wireless power transmission/reception device and method in an electronic device for preventing power from leaking to a communication system when a wireless power transmission/reception system receives or transmits power wirelessly.

According to an embodiment of the present disclosure, an electronic device may include: at least one antenna; a first circuit configured to wirelessly receive or transmit power using at least a portion of the at least one antenna; a second circuit configured to perform at least one type of communication using at least a portion of the at least one antenna; a first electric path configured to connect the at least one antenna and the first circuit; a second electric path configured to connect the at least one antenna and the second circuit; a third electric path configured to connect a point on the first electric path and a point on the second electric path; and at least one passive element or active element connected to at least one of the first electric path, the second electric path, and the third electric path.

According to an embodiment of the present disclosure, a method of operating an electronic device may include: wirelessly receiving or transmitting power through at least one antenna; and isolating a short-range communication circuit in the electronic device from wireless power when wirelessly receiving or transmitting power through the at least one antenna.

A wireless power transmission/reception device and method of an electronic device according to various embodiments of the present disclosure prevents power from leaking to a wireless communication system when the wireless power transmission/reception system wirelessly receives or transmits power. Thus, it is possible to prevent the wireless communication system from being damaged and to improve the power transmission/reception efficiency of the wireless power transmission/reception system.

DETAILED DESCRIPTION

Figure 1:
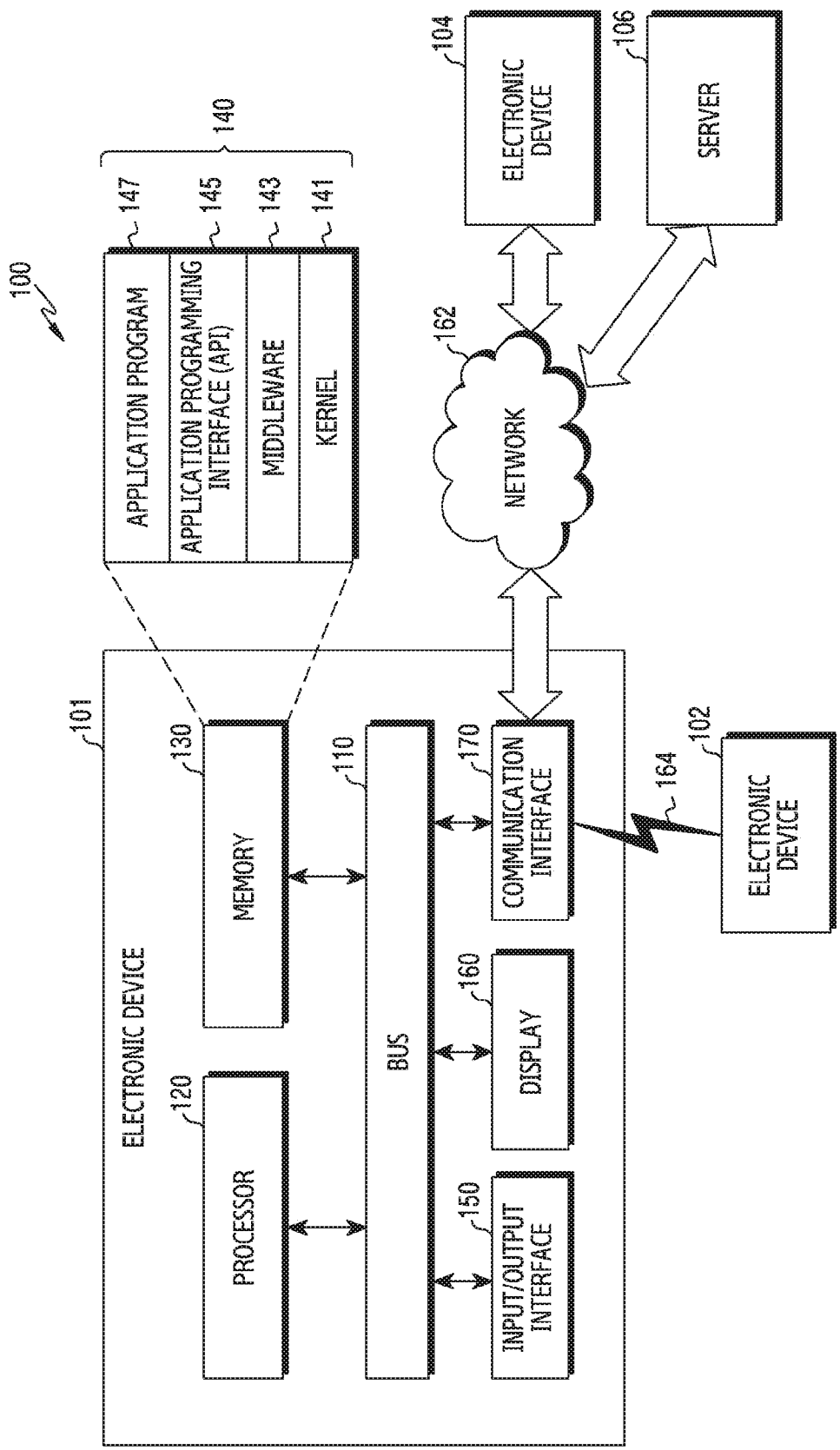
FIG. 1 is a block diagram of a network environment system according to an embodiment.

Various exemplary embodiments of the present document are mentioned below with reference to the accompanying drawings. An exemplary embodiment and the terms used in this do not intend to limit the technology mentioned in the present document to a specific embodiment form, and should be construed as including various changes of the corresponding exemplary embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a 3rd constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a Central Processing Unit (CPU) or an Application Processor (AP)) capable of performing corresponding operations by executing one or more software programs stored in a memory device.

An electronic device according to various exemplary embodiments of the present document may, for example, include at least one of a smartphone, a tablet Personal Computer (PC), a mobile phone, a video phone, an electronic book reader, a desktop PC, a laptop PC, a netbook computer, a workstation, a server, a Portable Digital Assistant (PDA), a Portable Multimedia Player (PMP), an MPEG-1 Audio Layer-3 (MP3) player, a medical device, a camera or a wearable device. The wearable device may include at least one of an accessory type (e.g., a watch, a ring, a wristlet, an anklet, a necklace, glasses, a contact lens or a Head-Mounted-Device (HMD)), a fabric or clothing integrated type (e.g., electronic clothes), a human-body mount type (e.g., a skin pad or tattoo) or a bio implantation type (e.g., an implantable circuit). In some exemplary embodiments, the electronic device may, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another exemplary embodiment, the electronic device may include at least one of various medical devices (e.g., various portable medical measurement devices (i.e., a blood glucose sensor, a heat rate sensor, a blood pressure monitor, a body temperature meter, etc.), Magnetic Resonance Angiography (MRA), Magnetic Resonance Imaging (MRI), Computed Tomography (CT), a photographing machine, an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security device, a head unit for car, an industrial or home robot, a drone, an Automatic Teller's Machine (ATM) of a financial institution, a Point Of Sales (POS) of a shop or an Internet of Things (IoT) device (e.g., an electric bulb, various sensors, a sprinkler device, a fire alarm, a thermostat, a streetlight, a toaster, an exerciser, a hot water tank, a heater, a boiler, etc.). According to some exemplary embodiment, the electronic device may include at least one of a part of furniture, a building/structure or a car, an electronic board, an electronic signature receiving device, a projector or various metering devices (e.g., tap water, electricity, gas, radio wave metering devices or the like). In various exemplary embodiments, the electronic device may be flexible, or be a combination of two or more of the aforementioned various devices. The electronic device according to an exemplary embodiment of the present document is not limited to the aforementioned devices. In the present document, the term 'user' may denote a person who uses the electronic device or a device (e.g., an artificial-intelligent electronic device) which uses the electronic device.

Referring to FIG. 1, an electronic device 101 within a network environment 100 in various exemplary embodiments is described. The electronic device 101 may include a bus 110, a processor 120, a memory 130, an input output interface 150, a display 160, and a communication interface 170. In some exemplary embodiment, the electronic device 101 may omit at least one of the constituent elements or additionally have another constituent element. The bus 110 may, for example, include a circuit coupling the constituent elements 110 to 170 with one another and forwarding communication (e.g., a control message or data) between the constituent elements. The processor 120 may include one or more of a Central Processing Unit (CPU), an Application Processor (AP) or a Communication Processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to one exemplary embodiment, the memory 130 may store a software and/or program 140. The program 140 may, for example, include a kernel 141, a middleware 143, an Application Programming Interface (API) 145, an application program (or "application") 147 and/or the like. At least some of the kernel 141, the middleware 143 or the API 145 may be called an Operating System (OS). The kernel 141 may, for example, control or manage system resources (e.g., bus 110, processor 120, memory 130 or the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a Liquid Crystal Display (LCD), a Light Emitting Diode (LED) display, an Organic Light Emitting Diode (OLED) display, a MicroElectroMechanical Systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body. The communication interface 170 may, for example, establish communication between the electronic device 101 and an external device (e.g., the 1st external electronic device 102, the 2nd external electronic device 104 or the server 106). For example, the communication interface 170 may be coupled to a network 162 through wireless communication or wired communication, to communicate with the external device (e.g., the 2nd external electronic device 104 or the server 106).

The wireless communication may, for example, include a cellular communication that uses at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like. According to one exemplary embodiment, the wireless communication may, for example, include at least one of Wireless Fidelity (WiFi), Bluetooth (BT), Bluetooth Low Energy (BLE), Zigbee, Near Field Communication (NFC), Magnetic Secure Transmission (MST), Radio Frequency (RF) or Body Area Network (BAN). According to one exemplary embodiment, the wireless communication may include GNSS. The GNSS may, for example, be a Global Positioning System (GPS), a Global navigation satellite system (Glonass), Beidou (Beidou navigation satellite system) or Galileo (the European global satellite-based navigation system). Below, in the present document, the "GPS" may be used interchangeably with the "GNSS". The wired communication may, for example, include at least one of a Universal Serial Bus (USB), a High Definition Multimedia Interface (HDMI), a Recommended Standard-232 (RS-232), Power Line Communication (PLC), a Plain Old Telephone Service (POTS) or the like. The network 162 may include at least one of a telecommunications network, for example, a computer network (e.g., Local Area Network (LAN) or Wide Area Network (WAN)), the Internet or a telephone network.

Each of the 1st and 2nd electronic devices 102 and 104 may be a device of the same or different type from that of the electronic device 101. According to various exemplary embodiments, all or some of operations executed in the electronic device 101 may be executed in another one electronic device or a plurality of electronic devices (e.g., the electronic devices 102 and 104 or the server 106). According to one exemplary embodiment, in case where the electronic device 101 has to perform some function or service automatically or in response to a request, the electronic device 101 may, instead of or additionally to executing the function or service in itself, send a request for at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
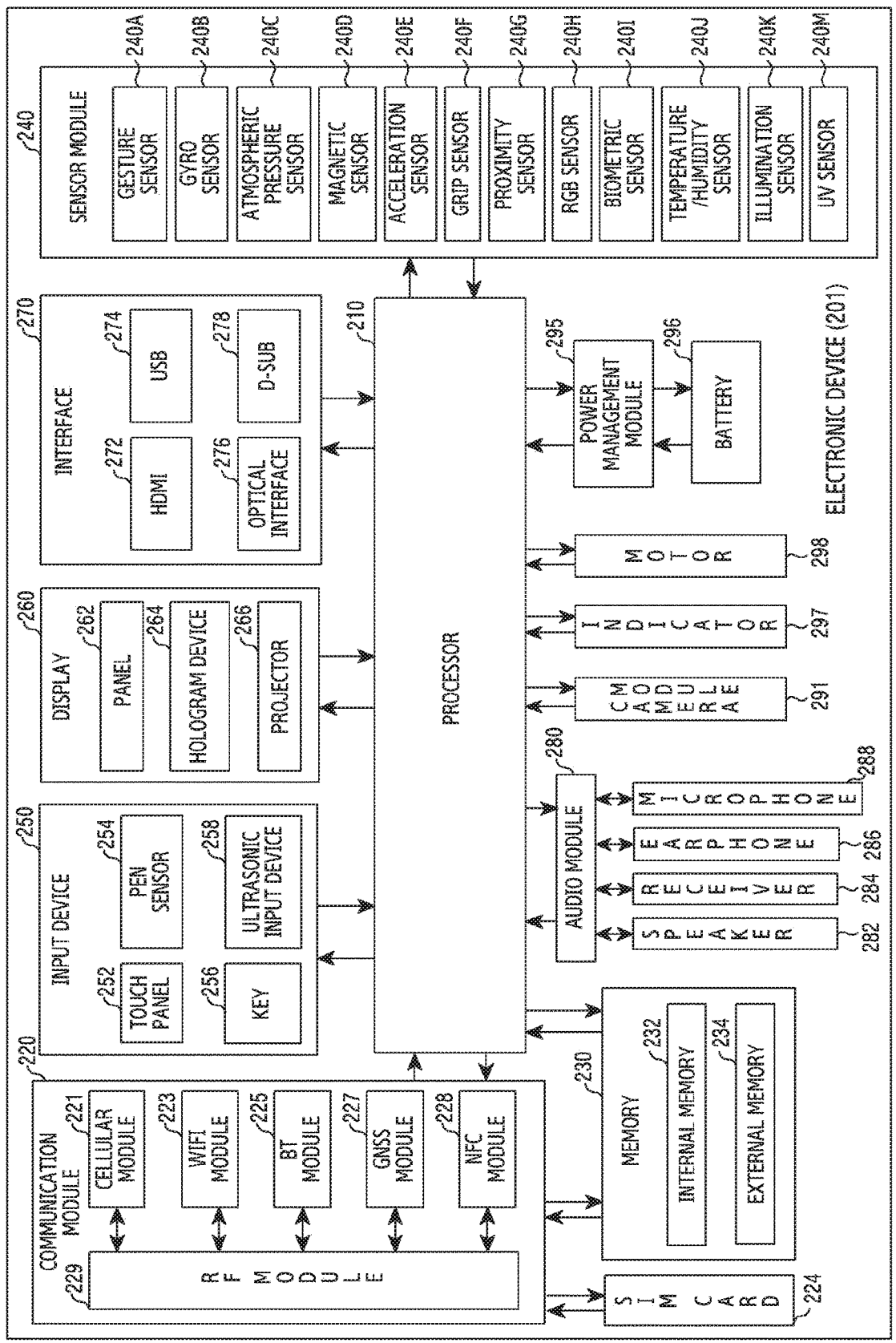
FIG. 2 is a block diagram of an electronic device according to various embodiments.

FIG. 2 is a block diagram of an electronic device 201 according to various exemplary embodiments. The electronic device 201 may, for example, include the entire or part of the electronic device 101 illustrated in FIG. 1. The electronic device 201 may include one or more processors (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a System On Chip (SoC). According to one exemplary embodiment, the processor 210 may further include a Graphic Processing Unit (GPU) and/or an Image Signal Processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

According to one exemplary embodiment, the processor 210 may control at least a partial function of a light emitting unit and/or light receiving unit of a spectrometric sensing apparatus (not shown) based on at least one mode. For example, the processor 210 may control the light emitting unit to selectively output light of a wavelength band corresponding to the at least one mode. For another example, the light emitting unit may include a majority of light sources for outputting light of mutually different wavelength bands respectively, and the processor 210 may selectively activate at least one of the majority of light sources based on the at least one mode as well. According to various exemplary embodiments, the processor 210 may selectively activate at least a part of at least one region of the light receiving unit based on the at least one mode. According to various exemplary embodiments, the processor 210 may acquire information related with the at least one mode based on light that is acquired through the light receiving unit, and display the acquired information through the display 260. According to various exemplary embodiments, the processor 210 may acquire the information related with the at least one mode based on the light that is acquired through the light receiving unit, and transmit the acquired information to another electronic device (e.g., 102, 104 or 106 of FIG. 1) through the communication module 220.

The communication module 220 may, for example, have the same or similar construction with the communication interface 170. The communication module 220 may, for example, include a cellular module 221, a WiFi module 223, a Bluetooth module 225, a GNSS module 227, an NFC module 228, and a Radio Frequency (RF) module 229. The cellular module 221 may, for example, provide voice telephony, video telephony, a text service, an Internet service or the like through a telecommunication network. According to one exemplary embodiment, the cellular module 221 may perform the distinction and authentication of the electronic device 201 within the telecommunication network, by using the subscriber identification module (e.g., SIM card) 224. According to one exemplary embodiment, the cellular module 221 may perform at least some functions among functions that the processor 210 may provide. According to one exemplary embodiment, the cellular module 221 may include a Communication Processor (CP). According to some exemplary embodiment, at least some (e.g., two or more) of the cellular module 221, the WiFi module 223, the Bluetooth module 225, the GNSS module 227 or the NFC module 228 may be included within one Integrated Chip (IC) or IC package. The RF module 229 may, for example, transceive a communication signal (e.g., RF signal). The RF module 229 may, for example, include a transceiver, a Power Amplifier Module (PAM), a frequency filter, a Low Noise Amplifier (LNA), an antenna or the like. According to another exemplary embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., Integrated Circuit Card Identifier (ICCID)) or subscriber information (e.g., International Mobile Subscriber Identity (IMSI)).

The memory 230 (e.g., memory 130) may, for example, include an internal memory 232 or an external memory 234. The internal memory 232 may, for example, include at least one of a volatile memory (e.g., a Dynamic Random Access Memory (DRAM), a Static RAM (SRAM), a Synchronous Dynamic RAM (SDRAM) or the like) and/or a non-volatile memory (e.g., One Time Programmable Read Only Memory (OTPROM), a Programmable ROM (PROM), an Erasable PROM (EPROM), an Electrically EPROM (EEPROM), a mask ROM, a flash ROM, a flash memory, a hard drive or a Solid State Drive (SSD)). The external memory 234 may include a flash drive, for example, a Compact Flash (CF), a Secure Digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a Red, Green, Blue (RGB) sensor), a medical sensor 240I, a temperature/humidity sensor 240J, an illuminance sensor 240K or an Ultra Violet (UV) sensor 240M. Additionally or alternatively, the sensor module 240 may, for example, include an E-nose sensor, an Electromyography (EMG) sensor, an Electroencephalogram (EEG) sensor, an Electrocardiogram (ECG) sensor, an InfraRed (IR) sensor, an iris scan sensor and/or a finger scan sensor. The sensor module 240 may further include a control circuit for controlling at least one or more sensors belonging therein. In some exemplary embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to one exemplary embodiment, the camera module 291 may include one or more image sensors (e.g., front sensor or rear sensor), a lens, an Image Signal Processor (ISP) or a flash (e.g., an LED, a xenon lamp or the like). The power management module 295 may, for example, manage the electric power of the electronic device 201. According to one exemplary embodiment, the power management module 295 may include a Power Management Integrated Circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of Digital Multimedia Broadcasting (DMB), Digital Video Broadcasting (DVB), mediaFlo™ or the like. Each of the constituent elements described in the present document may consist of one or more components, and a name of the corresponding constituent element may be varied according to the kind of the electronic device. In various exemplary embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
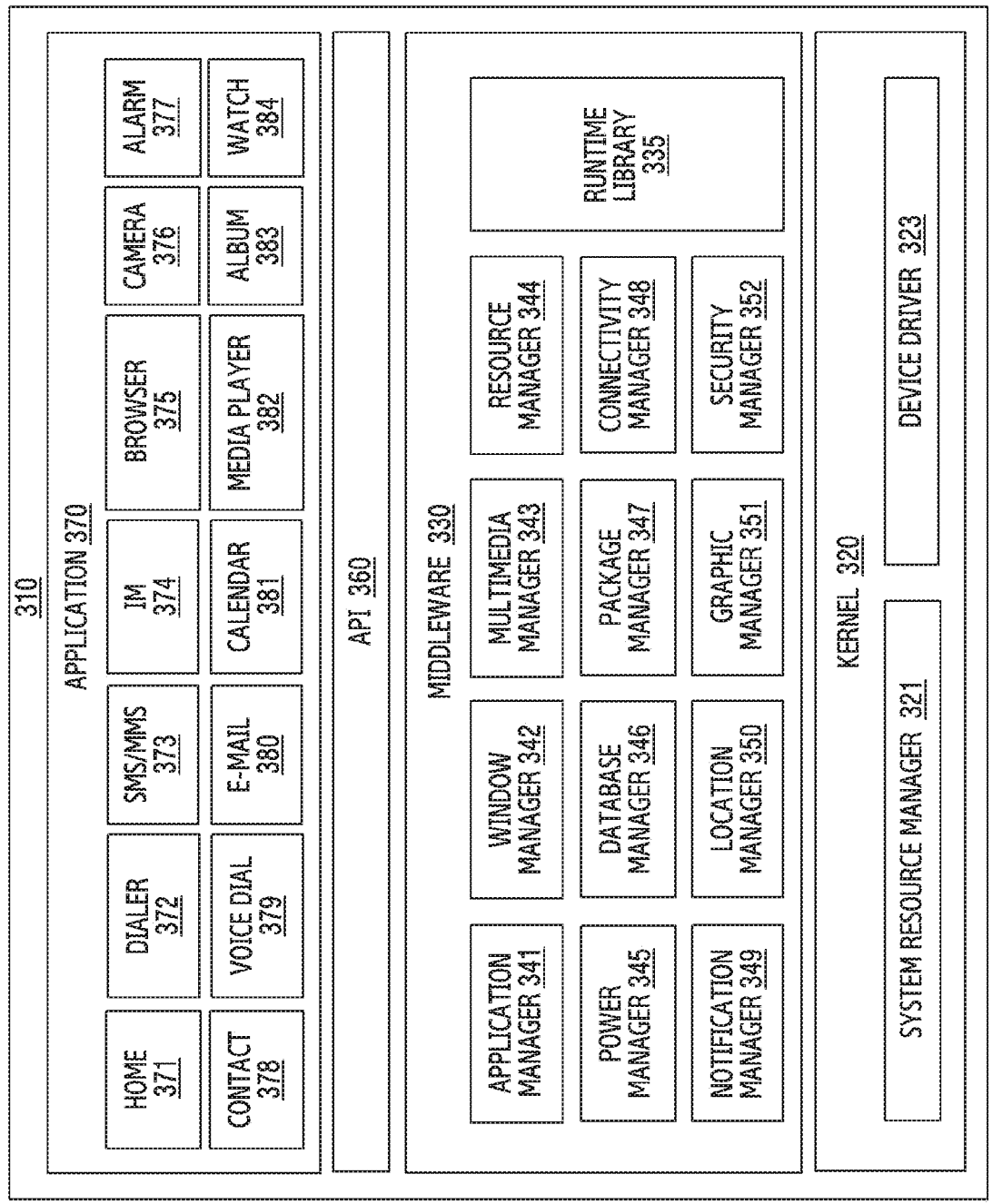
FIG. 3 is a block diagram illustrating a program module according to various embodiments.

FIG. 3 is a block diagram of a program module according to various exemplary embodiments. According to one exemplary embodiment, the program module 310 (e.g., the program 140) may include an Operating System (OS) controlling resources related to an electronic device (e.g., the electronic device 101) and/or various applications (e.g., the application program 147) run on the operating system. The operating system may, for example, include Android™, iOS™, Windows™, Symbian™, Tizen™ or Bada™ Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to one exemplary embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an Inter-Process Communication (IPC) driver. The middleware 330 may, for example, provide a function that the application 370 commonly needs, or provide various functions to the application 370 through the API 360 so that the application 370 may make use of restricted system resources within an electronic device. According to one exemplary embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing. The application manager 341 may, for example, manage a lifecycle of the application 370. The window manager 342 may manage a GUI resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to one exemplary embodiment, the power manager 345 may interwork with a Basic Input/Output System (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to one exemplary embodiment, the middleware 330 may include a telephony manager for managing a voice or video telephony function of an electronic device, or a middleware module capable of forming a combination of functions of the aforementioned constituent elements. According to one exemplary embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to one exemplary embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to one exemplary embodiment, the application 370 may include an application (e.g., a health care application of a mobile medical instrument) designated according to an attribute of the external electronic device. According to one exemplary embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an Application-Specific Integrated Circuit (ASIC) chip, Field-Programmable Gate Arrays (FPGAs) or a programmable logic device, which has been known or will be developed in future, performing some operations. At least a part of an apparatus (e.g., modules or functions thereof) or method (e.g., operations) according to various exemplary embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a Compact Disc-Read Only Memory (CD-ROM) and/or a Digital Versatile Disk (DVD)), a Magneto-Optical Media (e.g., a floptical disk), an internal memory, etc. The instruction may include a code that is made by a compiler or a code that is executable by an interpreter. The module or program module according to various exemplary embodiments may include at least one or more of the aforementioned constituent elements, or omit some, or further include another constituent element. Operations carried out by the module, the program module or the another constituent element according to various exemplary embodiments may be executed in a sequential, parallel, repeated or heuristic manner, or at least some operations may be executed in different order or be omitted, or another operation may be added.

Figure 4A:
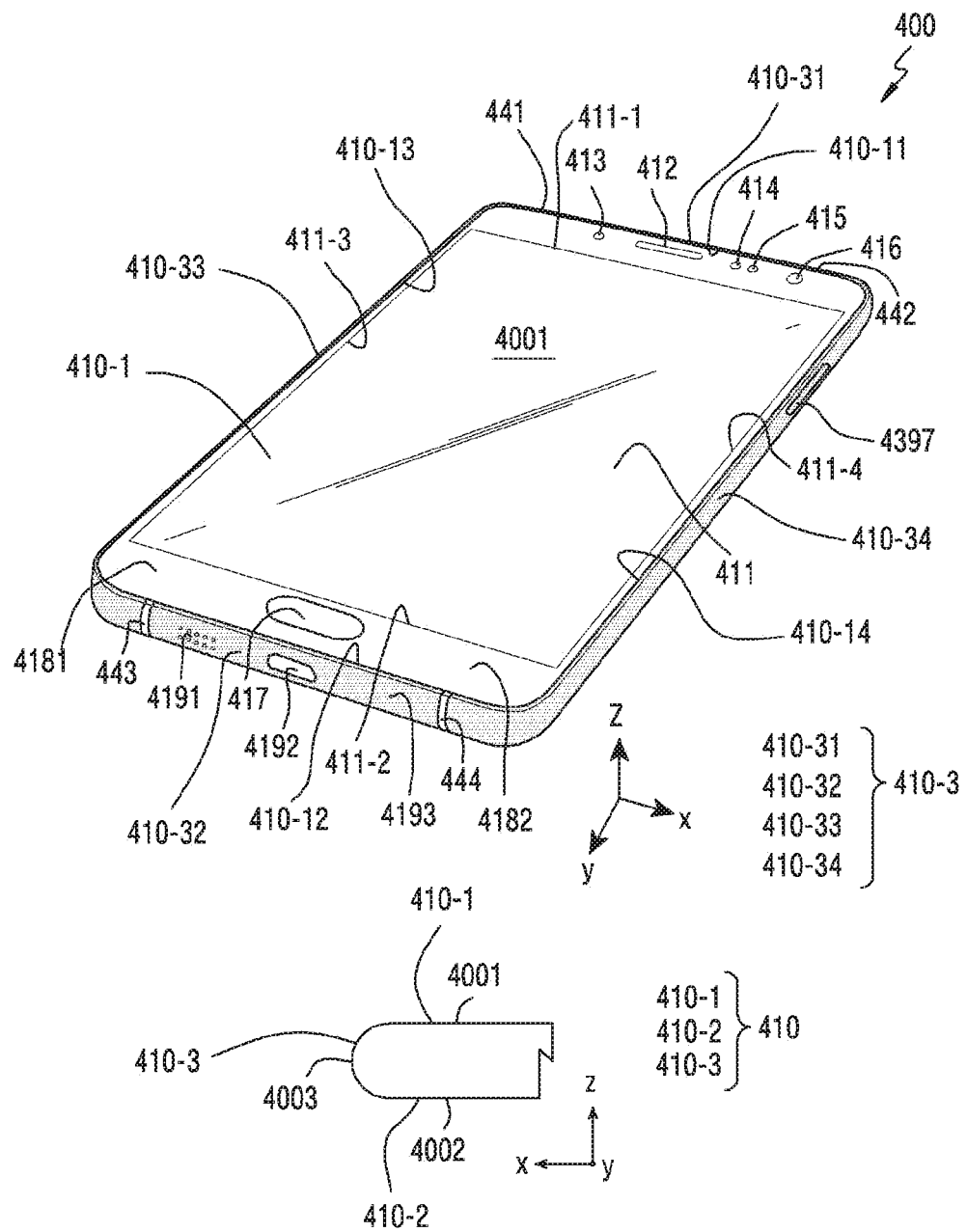
FIGS. 4A and 4B are views each illustrating an electronic device according to an embodiment of the present disclosure.
Figure 4B:
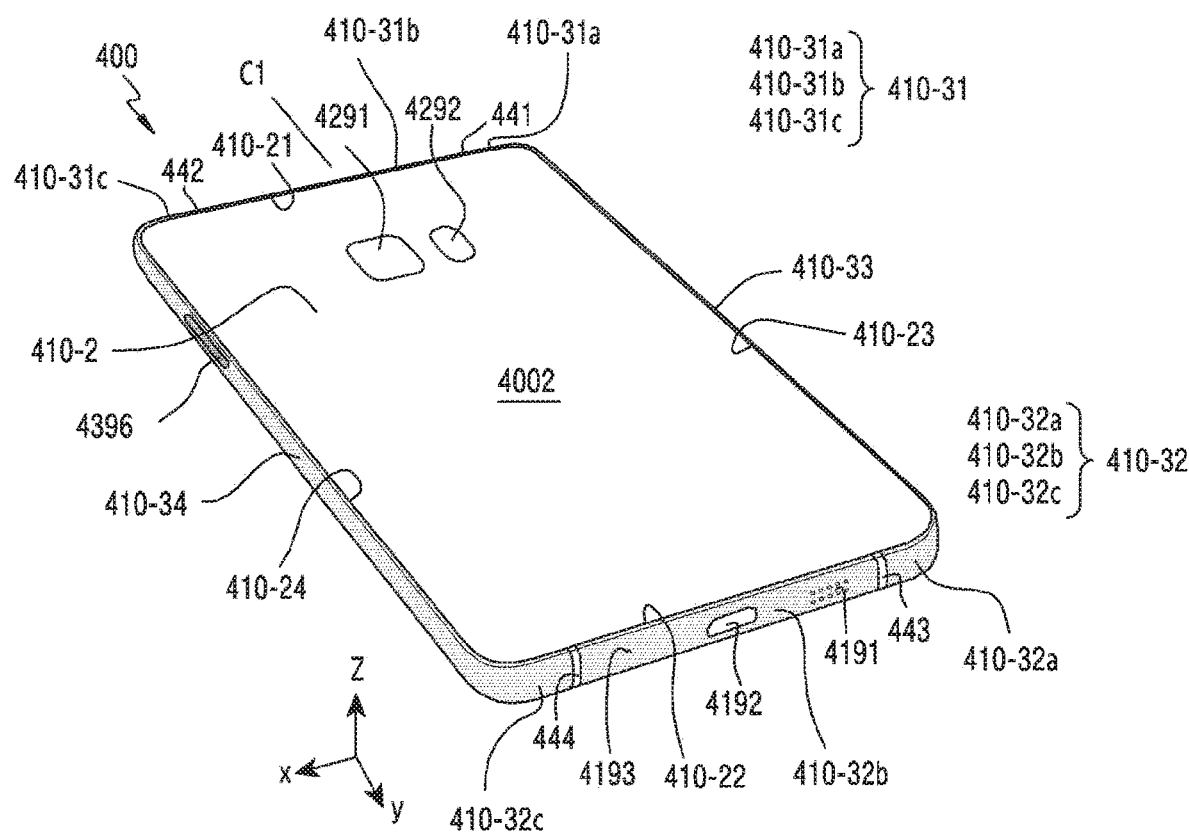

FIGS. 4A and 4B are views each illustrating an electronic device according to an embodiment of the present disclosure. According to various embodiments, an electronic device 400 may include at least some of the components of the electronic device 101 of FIG. 1 or the electronic device 201 of FIG. 2.

According to an embodiment, the electronic device 400 may include a housing 410 that forms all or at least a portion of the appearance of the electronic device 400. According to various embodiments, the housing 410 may include a non-metal material and/or a metal material. For example, the housing 410 may be formed of materials such as plastics, metal, carbon fiber and other fiber composites, ceramics, glass, and wood, or a combination thereof. According to various embodiments, the entire housing 410 may be formed of a single material or a combination of multiple materials. According to various embodiments, the housing 410 may be partially formed of materials having different physical properties.

According to an embodiment, the housing 410 may form a first face 4001, a second face 4002, and a third face 4003 of the electronic device 400. The first face 4001 and the second face 4002 may face opposite directions. The third face 4003 may surround a space between the first face 4001 and the second face 4002.

According to an embodiment, the first face 4001 and/or the second face 4002 of the housing 410 may be substantially flat. The third face 4003 of the housing 410 may include a flat face or a curved face.

According to an embodiment, the housing 410 may include a first cover 410-1 forming the first face 4001 and a second cover 410-2 forming the second face 4002. In addition, the housing 410 may also include a bezel 410-3 that surrounds the space between the first cover 410-1 and the second cover 410-2 and forms the third face 4003.

According to an embodiment, the electronic device 400 may include a display 411 embedded in the space formed by the first cover 410-1 and the second cover 410-2 of the housing 410. The screen region of the display 411 may be exposed to the outside through the first cover 410-1. According to various embodiments, the display 411 may further include a touch-sensing device for performing touch input and/or hovering input. For example, when a finger or a stylus touches the first face 4001, the electronic device 400 may sense the touch input through the display 411. According to various embodiments, when the finger or stylus is closely spaced apart from the first face 4001, the electronic device 400 may sense the hovering input using the display 411. According to an embodiment, the screen region of the display 411 may have a rectangular shape that includes a first short side 411-1, a second short side 411-2, a first long side 411-3, and a second long side 411-4.

According to an embodiment, the first cover 410-1 may have a rectangular shape that includes a $(1-1)^{th}$ edge 410-11 adjacent to the first short side 411-1 of the screen region, a $(1-2)^{th}$ edge 410-12 adjacent to the second short side 411-2 of the screen region, a $(1-3)^{th}$ edge 410-13 adjacent to the first long side 411-3 of the screen region, and a $(1-4)^{th}$ edge 410-14 adjacent to the second long side 411-4 of the screen region. The $(1-3)^{th}$ edge 410-13 may connect one end of the (1-1)$^{th}$ edge 410-11 and one end of the (1-2)$^{th}$ edge 410-12. The (1-4)$^{th}$ edge 410-14 may connect the other end of the (1-1)$^{th}$ edge 410-11 and the other end of the (1-2)$^{th}$ edge 410-12. The connection portion between the (1-1)$^{th}$ edge 410-11 and the (1-3)$^{th}$ edge 410-13 may have a curved shape. The connection portion between the (1-1)$^{th}$ edge 410-11 and the (1-4)$^{th}$ edge 410-14 may have a curved shape. The connection portion between the (1-2)$^{th}$ edge 410-12 and the (1-3)$^{th}$ edge 410-13 may have a curved shape. According to various embodiments, the connection portion between the (1-2)$^{th}$ edge 410-12 and the (1-4)$^{th}$ edge 410-14 may have a curved shape.

According to an embodiment, when viewed in the direction from the first cover 410-1 toward the second cover 410-2, the second cover 410-2 may have a substantially rectangular shape corresponding to the first cover 410-1.

According to various embodiments, the electronic device 400 may include various components disposed between the (1-1)$^{th}$ edge 410-11 of the first cover 410-1 and the first short side 411-1 of the screen region. For example, the components may include a receiver 412 for outputting a voice signal, which is received from a counterpart device during a call, as sound. For example, the components may include one or more sensors 413, 414, and 415. The one or more sensors may include an optical sensor (e.g., an illuminance sensor), a proximity sensor, an infrared sensor, an ultrasonic sensor, or the like. For example, the components may include a camera 416 that includes an image sensor.

According to various embodiments, the electronic device 400 may include various components disposed between the (1-2)$^{th}$ edge 410-12 of the first cover 410-1 and the second short side 411-2 of the screen region. For example, the components may be a variety of input keys. An input key may be a push-type button (e.g., a home button) 417. According to various embodiments, an input key may be a touch-type touch key 4181 or 4182.

According to various embodiments, the second cover 420-2 may have a rectangular shape that includes a (2-1)$^{th}$ edge 410-21 corresponding to the (1-1)$^{th}$ edge 410-11 of the first cover 410-1, a (2-2)$^{th}$ edge 410-22 corresponding to the (1-2)$^{th}$ edge 410-12 of the first cover 410-1, a (2-3)$^{th}$ edge 410-23 corresponding to the (1-3)$^{th}$ edge 410-13 of the first cover 410-1, and a (2-4)$^{th}$ edge 410-24 corresponding to the (1-4)$^{th}$ edge 410-14 of the first cover 410-1. The (2-3)$^{th}$ edge 410-23 may connect one end of the (2-1)$^{th}$ edge 410-21 and one end of the (2-2)$^{th}$ edge 410-22. The (2-4)$^{th}$ edge 410-24 may connect the other end of the (2-1)$^{th}$ edge 410-21 and the other end of the (2-2)$^{th}$ edge 410-22. The connection portion between the (2-1)$^{th}$ edge 410-21 and the (2-3)$^{th}$ edge 410-23 may have a curved shape. The connection portion between the (2-1)$^{th}$ edge 410-21 and the (2-4)$^{th}$ edge 410-24 may have a curved shape. The connection portion between the (2-2)$^{th}$ edge 410-22 and the (2-3)$^{th}$ edge 410-23 may have a curved shape. According to various embodiments, the connection portion between the (2-2)$^{th}$ edge 410-22 and the (2-4)$^{th}$ edge 410-24 may have a curved shape. According to various embodiments, the electronic device 400 may include various components (e.g., a camera 4291 and a flash 4292) disposed in the second cover 410-2.

According to an embodiment, the first cover 410-1 and/or the second cover 410-2 may be formed of a transparent or light-transmissive material (e.g., glass).

According to an embodiment, the bezel 410-3 may include a first metal frame 410-31 that connects the (1-1)$^{th}$ edge 410-11 of the first cover 410-1 and the (2-1)$^{th}$ edge 410-21 of the second cover 410-2. The bezel 410-3 may include a second metal frame 410-32 that connects the (1-2)$^{th}$ edge 410-12 of the first cover 410-1 and the (2-2)$^{th}$ edge 410-22 of the second cover 410-2. The bezel 410-3 may include a third metal frame 410-33 that connects the (1-3)$^{th}$ edge 410-13 of the first cover 410-1 and the (2-3)$^{th}$ edge 410-23 of the second cover 410-2. The bezel 410-3 may include a fourth metal frame 410-34 that connects the (1-4)$^{th}$ edge 410-14 of the first cover 410-1 and the (2-4)$^{th}$ edge 410-24 of the second cover 410-2. The first metal frame 410-31 and the second metal frame 410-32 may be disposed opposite each other, and the third metal frame 410-33 and the fourth metal frame 410-34 may be disposed opposite each other. The first metal frame 410-31 may connect one end of the third metal frame 410-33 and one end of the fourth metal frame 410-34. The second metal frame 410-32 may connect the other end of the third metal frame 410-33 and the other end of the fourth metal frame 410-34. The combination of the first metal frame 410-31, the second metal frame 410-32, the third metal frame 410-33, and the fourth metal frame 410-34 may have a substantially rectangular annular shape. The third face 4003 of the housing 410, which is formed by the bezel 410-3, may have a substantially rectangular annular shape.

According to various embodiments, the connection portion between the first metal frame 410-31 and the third metal frame 410-33 of the bezel 410-3 may have a curved shape. The connection portion between the first metal frame 410-31 and the fourth metal frame 410-34 of the bezel 410-3 may have a curved shape. The connection portion between the second metal frame 410-32 and the third metal frame 410-33 of the bezel 410-3 may have a curved shape. The connection portion between the second metal frame 410-32 and the fourth metal frame 410-34 of the bezel 410-3 may have a curved shape.

According to various embodiments, although not illustrated, the bezel 410-3 may include an extension (not illustrated) extending inside the housing 410 from at least one of the first metal frame 410-31, the second metal frame 410-32, the third metal frame 410-33, and the fourth metal frame 410-34. According to an embodiment, the extension may be coupled to a Printed Circuit Board (PCB), a bracket, or the like.

According to an embodiment, at least one of the first metal frame 410-31, the second metal frame 410-32, the third metal frame 410-33, and the fourth metal frame 410-34 of the bezel 410-3 may include a plurality of metal portions that are physically separated from each other. According to various embodiments, a non-conductive member may be disposed between the plurality of metal portions. The non-conductive member may form a portion of the third face 4003 of the housing 410. According to various embodiments, the non-conductive member may be one extending from the non-conductive portion disposed within the housing 410.

According to an embodiment, the first metal frame 410-31 of the bezel 410-3 may include a lath metal frame 410-31$a$, a 1b$^{th}$ metal frame 410-31$b$, and a 1c$^{th}$ metal frame 410-31$c$, which are physically separated from each other. The 1b$^{th}$ metal frame 410-31$b$ may be disposed between the lath metal frame 410-31$a$ and the 1c$^{th}$ metal frame 410-31$c$.

According to an embodiment, the lath metal frame 410-31$a$ of the first metal frame 410-31 may be connected to the third metal frame 410-33. The 1c$^{th}$ metal frame 410-31$c$ of the first metal frame 410-31 may be connected to the fourth metal frame 410-34. According to various embodiments, the lath metal frame 410-31$a$ and the third metal frame 410-33 may be formed of a single piece of metal. According to various embodiments, the 1c$^{th}$ metal frame 410-31c and the fourth metal frame 410-34 may be formed of a single piece of metal.

According to an embodiment, the electronic device 400 may include a first non-conductive member 441 disposed between the 1a$^{th}$ metal frame 410-31a and the 1b$^{th}$ metal frame 410-31b of the bezel 410-3. The electronic device 400 may include a second non-conductive member 442 disposed between the 1b$^{th}$ metal frame 410-31b and the 1c$^{th}$ metal frame 410-31c. The first non-conductive member 441 and the second non-conductive member 442 may be smoothly connected to the first metal frame 410-31, and may form a portion of the third face 4003 of the first housing 410. The first non-conductive member 441 and/or the second non-conductive member 442 may be a portion extending from a non-conductive member disposed inside the housing 410.

According to an embodiment, the electronic device 400 may have a generally symmetrical configuration on both sides of the center line C1 that extends from the first metal frame 410-31 to the second metal frame 410-32. The center line C1 may be present between the first non-conductive member 441 and the second non-conductive member 442, and the first non-conductive member 441 and the second non-conductive member 442 may be placed at the same distance from the center line C1. According to various embodiments, the first non-conductive member 441 and the second non-conductive member 442 may not be disposed at the same distance from the center line C1.

According to an embodiment, a first gap (not illustrated) between the 1a$^{th}$ metal frame 410-31a and the 1b$^{th}$ metal frame 410-31b may be filled with the first non-conductive member 441. A second gap (not illustrated) between the 1b$^{th}$ metal frame 410-31b and the 1c$^{th}$ metal frame 410-31c may be filled with the second non-conductive member 442. The widths of the first gap and the second gap may be the same as each other, or may be different from each other.

According to an embodiment, the second metal frame 410-32 of the bezel 410-3 may include a 2a$^{th}$ metal frame 410-32a, a 2b$^{th}$ metal frame 410-32b, and a 2c$^{th}$ metal frame 410-32c, which are physically separated from each other. The 2b$^{th}$ metal frame 410-32b may be disposed between the 2a$^{th}$ metal frame 410-32a and the 1c$^{th}$ metal frame 410-31c.

According to an embodiment, the 2a$^{th}$ metal frame 410-32a of the second metal frame 410-32 may be connected to the third metal frame 410-33. The 2c$^{th}$ metal frame 410-32c of the second metal frame 410-32 may be connected to the fourth metal frame 410-34. According to various embodiments, the 2a$^{th}$ metal frame 410-32a and the third metal frame 410-33 may be formed of a single piece of metal. According to various embodiments, the 2c$^{th}$ metal frame 410-32c and the fourth metal frame 410-34 may be formed of a single piece of metal.

According to an embodiment, the electronic device 400 may include a third non-conductive member 443 disposed between the 2a$^{th}$ metal frame 410-32a and the 2b$^{th}$ metal frame 410-32b of the bezel 410-3. The electronic device 400 may include a fourth non-conductive member 444 disposed between the 2b$^{th}$ metal frame 410-32b and the 2c$^{th}$ metal frame 410-32c. The third non-conductive member 443 and the fourth non-conductive member 444 may be smoothly connected to the second metal frame 410-32, and may form a portion of the third face 4003 of the housing 410. The third non-conductive member 443 and/or the fourth non-conductive member 444 may be a portion extending from a non-conductive member disposed inside the housing 410.

According to an embodiment, the center line C1 is present between the third non-conductive member 443 and the fourth non-conductive member 444, and the third non-conductive member 443 and the fourth non-conductive member 444 may be placed at the same distance from the center line C1. According to various embodiments, the third non-conductive member 443 and the fourth non-conductive member 444 may not be disposed at the same distance from the center line C1.

According to an embodiment, a third gap (not illustrated) between the 2a$^{th}$ metal frame 410-32a and the 2b$^{th}$ metal frame 410-32b may be filled with the third non-conductive member 443. A fourth gap (not illustrated) between the 2b$^{th}$ metal frame 410-32b and the 2c$^{th}$ metal frame 410-32c may be filled with the fourth non-conductive member 444. The widths of the third gap and the fourth gap may be the same as each other, or may be different from each other.

According to an embodiment, the first non-conductive member 441 and the third non-conductive member 443 may be disposed at the same distance from the center line C2, or may not be disposed at the same distance from the center line C1.

According to an embodiment, the second non-conductive member 442 and the fourth non-conductive member 444 may be disposed at the same distance from the center line C1, or may not be disposed at the same distance from the center line C1.

According to an embodiment, the bezel 410-3 may be used as at least a portion of a wireless communication device. Through the electrical coupling of the first metal frame 410-31, the second metal frame 410-32, the third metal frame 410-33, and the fourth metal frame 410-34, the bezel 410-3 may be used as at least a portion of the wireless communication device of the electronic device 400 that is capable of transmitting and receiving wireless signals. For example, at least a portion of the bezel 410-3 may be set to a "first state" of being electrically connected to a communication circuit (not illustrated) of the electronic device 400 so as to serve as an antenna radiator. According to various embodiments, at least a portion of the bezel 410-3 may be set to a "second state" of being electrically connected to a ground member (not illustrated) (e.g., a ground of a PCB) of the electronic device 400 so as to serve as an antenna ground. According to various embodiments, at least a portion of the bezel 410 may be set to a "third state", which is an electrical floating state.

According to an embodiment, the electronic device 400 may include at least one conductive pattern (not illustrated) disposed in a plane between the first face 4001 and the second face 4002. The plane in which the at least one conductive pattern is disposed may be substantially parallel to the first face 4001 or the second face 4002.

According to an embodiment, the conductive pattern may include a conductive line extending from a first end to a second end so as to form a wound portion of a plurality of turns.

According to an embodiment, at least one conductive pattern may be used as an antenna for receiving or transmitting wireless power. For example, at least one conductive pattern may be used as an antenna for wirelessly transmitting/receiving power in an electromagnetic resonance manner. According to various embodiments, at least one conductive pattern may be used as an antenna for wirelessly transmitting/receiving power in an electromagnetic resonance manner.

According to an embodiment, at least one conductive pattern may be used as an antenna for various types of communication. For example, at least one conductive pattern may be used for cellular communication, short-range communication (e.g., Wi-Fi, Bluetooth, NFC, or GNSS), transmission/reception of a magnetic signal (e.g., Magnetic Secure Transmission (MST) for electronic payment), or the like.

The electronic device 400 may include an electronic circuit (not illustrated) electrically connected to at least one conductive pattern. According to an embodiment, the electronic circuit may be electrically connected to a first point located at or near the first end of the conductive pattern, and to a second point located at or near the second end of the conductive pattern.

According to an embodiment, an electronic circuit electrically connected to the conductive pattern may include a wireless power transmission/reception circuit (not illustrated) for receiving and/or transmitting power using at least one conductive pattern. According to various embodiments, an electronic circuit electrically connected to the conductive pattern may include a communication circuit (not illustrated) for performing various types of communication using at least one conductive pattern.

According to various embodiments, the bezel 410-3 may include a through-hole in order to support various components of the electronic device 400. For example, the 2b$^{th}$ metal frame 410-32b of the bezel 410-3 may include a through hole 4191 used for emitting sound, which is generated from a speaker (not illustrated) of the electronic device 400, to the outside. According to various embodiments, the (1-2b)$^{th}$ metal frame 410-32b of the bezel 410-3 may include a through-hole 4192 used to connect an external connector to a connector (not illustrated) of the electronic device 400. According to various embodiments, the 2b$^{th}$ metal frame 410-32b of the bezel 410-3 may include a through-hole 4193 used to introduce external sound into a microphone (not illustrated) of the electronic device 400. According to various embodiments, the third metal frame 410-33 of the bezel 410-3 may include a through-hole 4196 for supporting a button (e.g., a volume control button) 4396 of the electronic device 400. According to various embodiments, the fourth metal frame 410-34 of the bezel 410-3 may include a through-hole 4197 for supporting a button (e.g., a power button) 4397 of the electronic device 400. According to various embodiments, the 1b$^{th}$ metal frame 410-31b of the bezel 410-3 may include a through-hole (not illustrated) used to insert an ear plug (not illustrated) into the ear jack (not illustrated) of the electronic device 400. According to various embodiments, the 1b$^{th}$ metal frame 410-31b of the bezel 410-3 may include a through-hole (not illustrated) used to insert at least one external storage medium (not illustrated) into a socket (not illustrated) of the electronic device 400.

Figure 5:
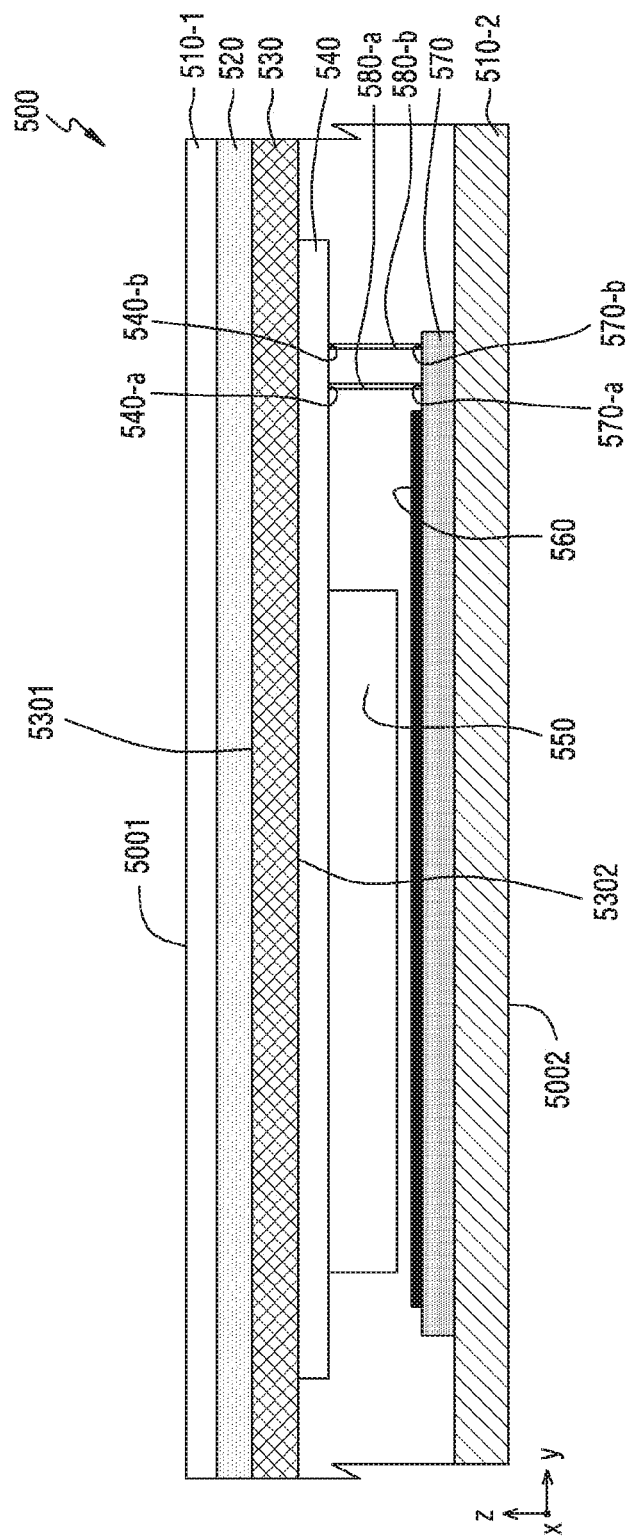
FIG. 5 is a cross-sectional view illustrating an electronic device according to an embodiment of the present disclosure.

FIG. 5 is a cross-sectional view illustrating an electronic device according to an embodiment of the present disclosure. According to various embodiments, the electronic device 500 may be any one of the electronic device 102 of FIG. 1, the electronic device 201 of FIG. 2, and the electronic device 400 of FIGS. 4A and 4B.

Referring to FIG. 5, the appearance of the electronic device 500 may include a first face 5001 oriented in a first direction and a second face 5002 oriented in a second direction opposite the first direction. The electronic device 500 may include various components disposed between the first face 5001 (the first face 4001 in FIG. 4A) and the second face 5002 (e.g., the second face 4002 in FIG. 4B).

The electronic device 500 may include a first cover 510-1 (e.g., the first cover 410-1 in FIG. 4A), a display 520 (e.g., the display 411 in FIG. 4A), a bracket 530 (or a support member) 530, a circuit board 540, a battery 550, at least one conductive pattern 570, or a second cover 510-2 (e.g., the second cover 410-2 in FIG. 4A).

According to an embodiment, the first cover 510-1 (e.g., the window) substantially has a plate shape, and may include impact-resistant plastic or glass. The first cover 510-1 may be coupled to a bezel (not illustrated) (e.g., the bezel 410-3 in FIGS. 4A and 4B), and may form the first face 5001 of the electronic device 500 (e.g., the first face 4001 in FIG. 4A). For example, an annular edge of the first cover 510-1 may be coupled to an annular mounting portion of the bezel (e.g., the bezel 410-3 in FIGS. 4A and 4B) using a coupling means (e.g., double-sided tape). When the first cover 510-1 and the case 510-3 are coupled to each other, space capable of accommodating the display 520, the bracket 530, and the circuit board 540 may be provided.

According to an embodiment, the display 520 may be disposed between the first cover 510-1 and the bracket 530. For example, the display 520 may be coupled to the first cover 510-1. The screen region of the display 520 may be exposed to the outside through at least a portion of the first cover 510-1.

According to one embodiment, the display 520 may display an electrical signal provided from the circuit board 540 as an image, and may include, for example, a Liquid Crystal Display (LCD) or an Organic Light-Emitting Diode (OLED) (e.g., an Active-Matrix OLED (AMOLED)). According to various embodiments, the display 520 may further include a conductive pattern for touch input or hovering input. For example, the conductive pattern may be disposed in an in-cell region or an on-cell region of the display 520.

According to various embodiments, the display 520 may include a display-integrated touch screen. For example, the display 520 may include an AMOLED-integrated touch screen (an On-Cell TSP AMOLED (OCTA)).

According to an embodiment, the bracket 530 may be disposed between the display 520 and the circuit board 540. The bracket 530 may be coupled to the bezel (e.g., the bezel 410-3 in FIGS. 4A and 4B), and may include a first face 5301, on which the display 520 may be mounted, and a second face 5302, on which the circuit board 540 may be mounted.

According to an embodiment, the circuit board 540 (e.g., a main board, a motherboard, or a Printed Board Assembly (PBA)) may be configured to include a plurality of electronic components mounted thereon and an electrical circuit to connect the plurality of electronic components. The circuit board 540 may set an execution environment of the electronic device 500, may maintain the information of the electronic device 500, and may support the input/out and exchange of data among the devices within the electronic device 500. For example, the circuit board 540 may include a wireless charging circuit for receiving and/or transmitting power using at least one conductive pattern (not illustrated) provided in the electronic device 500. According to various embodiments, the circuit board 540 may include a communication circuit for receiving and/or transmitting signals related to various types of communication using at least one conductive pattern provided in the electronic device 500.

The battery 550 may be disposed between the bracket 530 and the at least one conductive pattern 570.

The at least one conductive pattern 570 may be disposed in a plane (not illustrated) between the first face 5001 and the second face 5002. The plane in which the at least one conductive pattern is disposed may be substantially parallel to the first face 5001 or the second face 5002.

According to an embodiment, the at least one conductive pattern 570 may be disposed between the battery 550 and the second face 5002. For example, the at least one conductive pattern 570 may be disposed on the second cover 510-2. According to various embodiments, the at least one conductive pattern 570 may be included in the second cover 510-2.

According to an embodiment, the at least one conductive pattern 570 may include a conductive line extending from a first end (not illustrated) to a second end (not illustrated) to form a wound portion of a plurality of turns.

The at least one conductive pattern 570 may be electrically connected to the circuit board 540. According to an embodiment, the conductive pattern 570 may include a first contact 570-a and a second contact 570-b so as to be electrically connected to the circuit board 540. The first contact 570-a may be located at or near the first end of the conductive line. According to various embodiments, the second contact 570-b may be located at or near the second end of the conductive line. The circuit board 540 may include a first contact 540-a and a second contact 540-b so as to be electrically connected to the conductive pattern 570. When the circuit board 540 and the conductive pattern 570 are installed in the electronic device 500, the first contact 570-a of the conductive pattern 570 may be electrically connected to the first contact 540-a of the circuit board 540, and the second contact 570-b of the conductive pattern 570 may be electrically connected to the second contact 540-b of the circuit board 540.

According to various embodiments, the first contact 540-a and the second contact 540-b of the circuit board 540 may be electrically connected to a power transmission/reception circuit (e.g., a wireless charging circuit). According to various embodiments, the first contact 540-a and the second contact 540-b of the circuit board 540 may be electrically connected to a communication circuit (e.g., a short-range communication circuit). For example, the first contact 540-a of the circuit board 540 may be provided for feeding, and the second contact 540-b may be electrically connected to a ground member (e.g., a PCB ground) of the electronic device 500.

According to various embodiments, the electronic device 500 may include a first electrical connecting means 580-a to electrically connect the first contact 540-a of the circuit board 540 and the first contact 570-a of the conductive pattern 570 to each other. The electronic device 500 may include a second electrical connecting means 580-b to electrically connect the second contact 540-b of the circuit board 540 and the second contact 570-b of the conductive pattern 570 to each other. For example, the first electrical connecting means 580-a and/or the second electrical connecting means 580-b may include a C-clip, a pogo-pin, a spring, a piece of conductive PORON or rubber, a conductive tape or cooper connector, and the like. The first electrical connecting means 580-a and/or the second electrical connecting means 580-b may be coupled to the circuit board 540 or to the conductive pattern 570.

According to an embodiment, the at least one conductive pattern 570 may be electrically connected to the power transmission/reception circuit (e.g., the wireless charging circuit) mounted on the circuit board 540. The at least one conductive pattern 570 may be used as an antenna for wirelessly receiving or transmitting power. For example, the at least one conductive pattern 570 may include an antenna for wireless charging. According to various embodiments, the at least one conductive pattern 570 may be used as an antenna for wireless charging in an electromagnetic induction manner. According to various embodiments, the at least one conductive pattern 570 may be used as an antenna for wireless charging in an electromagnetic resonance manner.

According to an embodiment, the at least one conductive pattern 570 may be electrically connected to the communication circuit mounted on the circuit board 540. The at least one conductive pattern 570 may be used as an antenna for various types of communication. For example, the at least one conductive pattern 570 may be used for cellular communication, short-range communication (e.g., Wi-Fi, Bluetooth, NFC, or GNSS), transmission/reception of a magnetic signal (e.g., Magnetic Secure Transmission (MST) for electronic payment), or the like.

According to various embodiments, the conductive pattern 570 may be formed through a sheet-metal process. According to various embodiments, the conductive pattern 570 may be formed through Laser Direct Structuring (LDS). According to various embodiments, the conductive pattern 570 may be formed in the form of an Indium Tin Oxide (ITO) film. According to various embodiments, the conductive pattern 570 may be formed in the form of a Flexible Printed Circuit Board (FPCB).

According to various embodiments, the conductive pattern 570 may be coupled to the second housing 510-2. For example, the conductive pattern 570 may be molded in a manner similar to an In-Molding Antenna (IMA), or may be molded through dual injection molding. At least a portion of the conductive pattern 570 may be disposed in a manner of being inserted into the inside of an injection-molded product of the electronic device 500. At least a portion of the conductive pattern 570 is wrapped by an injection-molded member, and is thus capable of being protected (e.g., dust-proofed or waterproofed) from the outside. The rigidity of the injection-molded product is capable of preventing deformation of at least a portion of the conductive pattern 570. The conductive pattern 570 may be formed through any of various other molding methods.

According to various embodiments, the electronic device 500 may further include an electrical shield member 560 disposed between the battery 550 and the at least one conductive pattern 570. The electrical shield member 560 is capable of preventing the resonance characteristics of the at least one conductive pattern 570 from deteriorating by interfering with the surroundings (e.g., the battery 550). According to an embodiment, the electrical shield member 560 may include a ferrite sheet.

According to various embodiments, the second cover 510-2 may include a transparent layer. The transparent layer may be formed of a plastic material (e.g., acryl) or a glass material that is impact-resistant. For example, the transparent layer may be formed of tempered glass.

According to various embodiments, the second cover 510-2 may have a color. For example, the second cover 510-2 may include a color layer including a dye, a pigment, a coloring matter, a fluorescent material, or a phosphor that develops a predetermined color.

According to various embodiments, the second cover 510-2 may further include a plastic film. The plastic film may be formed of a material having high thermal stability and high mechanical strength. For example, the plastic film may be a PET (polyester) film, a PC (polycarbonate) film, a PE (polyethylene) film, a PP (polypropylene) film, or the like.

According to various embodiments, the second cover 510-2 may further include a pattern layer. The pattern layer may additionally include various patterns (e.g., a planar pattern or an input pattern) formed in a manner of being attached thereto or printed thereon. For example, the pattern layer may be formed through UV (Ultraviolet) molding. The pattern layer may be formed to express a metallic texture when external light is radiated thereon. For example, the pattern of the pattern layer may express a hairline. The pattern layer is disposed inside the second cover 510-2, and the pattern of the pattern layer may be three-dimensionally seen through the transparent layer due to the thickness of the transparent layer.

According to various embodiments, the second cover 510-2 may further include a metal layer. The metal layer may be formed in a manner of depositing (e.g., Physical Vapor Deposition (PVD) or Chemical Vapor Deposition (CVD)) or coating a metal (e.g., Sn, Al, Si, Ti, TiC, TiN, TiCB or $Al_2O_3$). The metal layer may express a metallic texture when external light is radiated thereon. In addition, the metal layer is disposed inside the second cover 510-2, and may be three-dimensionally seen through the transparent layer due to the thickness of the transparent layer.

According to various embodiments, the second cover 510-2 may further include a light-blocking layer to block light. The light-blocking layer may include a black component that does not reflect light but absorbs light. The light-blocking layer may be a layer printed in black. According to various embodiments, the light-blocking layer may be an adhesive containing a black component.

Figure 6:
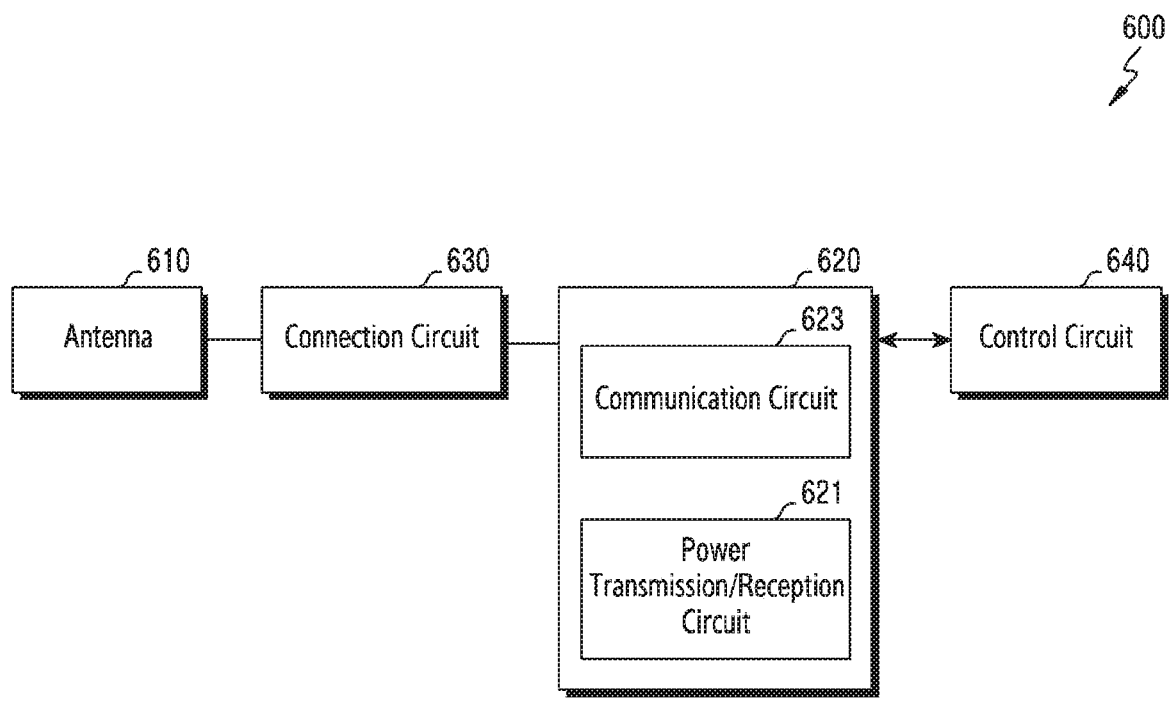
FIG. 6 is a block diagram illustrating an electronic device according to an embodiment of the present disclosure.
Figure 7:
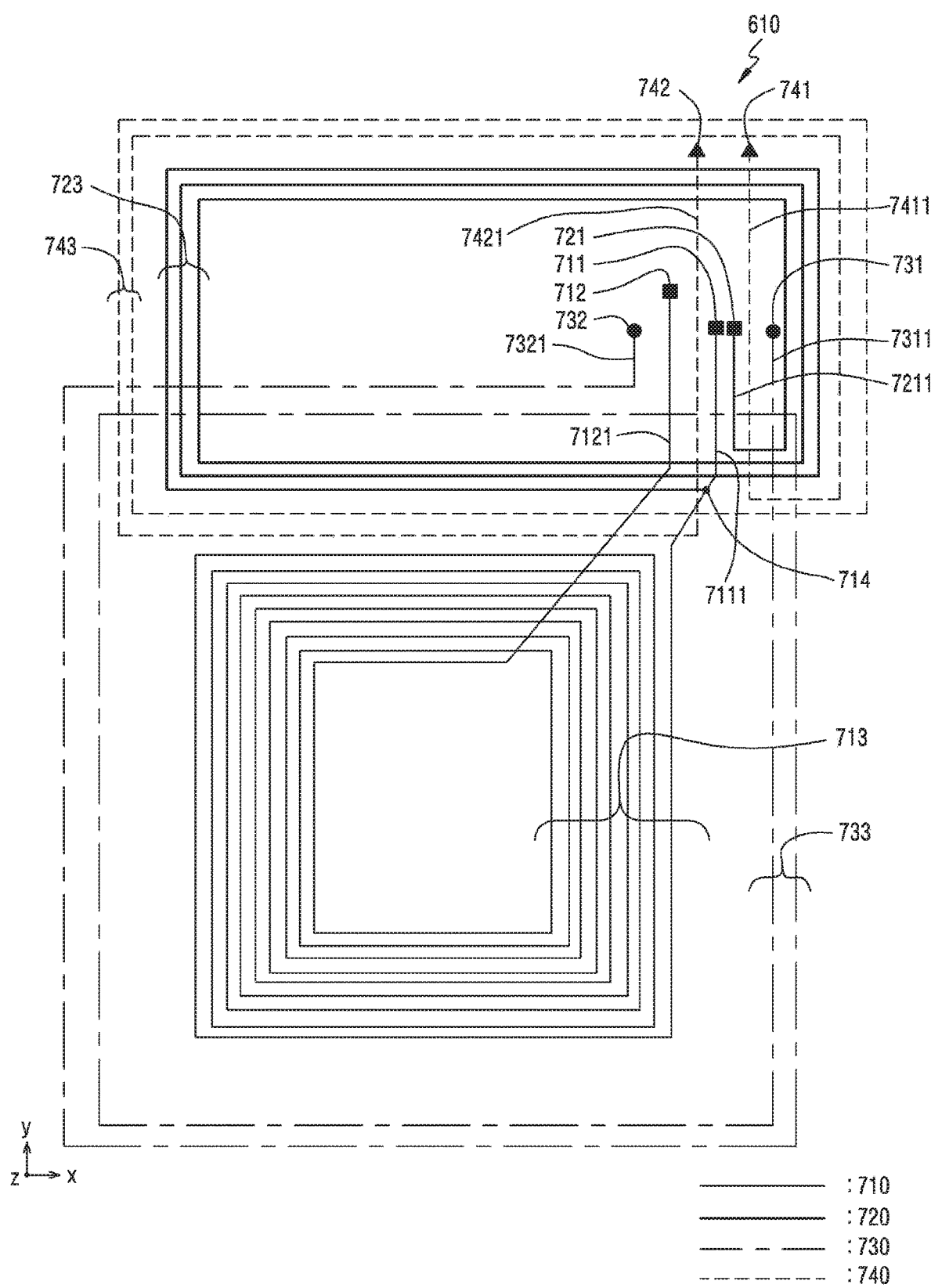
FIG. 7 is a view illustrating the arrangement structure of at least one antenna mounted on an electronic device according to an embodiment of the present disclosure.

FIG. 6 is a block diagram illustrating an electronic device according to an embodiment of the present disclosure. FIG. 7 is a view illustrating the arrangement structure of at least one antenna mounted on an electronic device according to an embodiment of the present disclosure. According to various embodiments, an electronic device 600 may include all or part of the electronic device 101 of FIG. 1 or the electronic device 201 of FIG. 2.

Referring to FIG. 6, the electronic device 600 may include at least one antenna 610, an electromagnetic field circuit 620, a connection circuit 630, and a control circuit 640.

The at least one antenna 610 may be any of various types of metallic members that are provided in the electronic device 600. For example, the at least one antenna 610 may be disposed inside the housing (not illustrated) (e.g., the housing 410 of FIG. 4A), which forms the appearance of the electronic device 600, or may form a portion of one face of the housing.

According to various embodiments, the housing may include a first face (the first face 4001 in FIG. 4A), which forms the front face of the electronic device 600, and a second face (e.g., the second face 4002 in FIG. 4B), which forms the rear face of the electronic device 600. The electronic device 600 may include a display (not illustrated), which may be exposed through at least a portion of the first face, which is light-transmissive. The at least one antenna 610 may be disposed on the second face, or may form a portion of the second face.

According to an embodiment, the at least one antenna 610 may be separated from a PCB (not illustrated) on which the electromagnetic field circuit 620, the connection circuit 630, or the control circuit 640 is mounted.

According to an embodiment, the at least one antenna 610 may take the form of at least one of a metal plate, a coil-type metal pattern, and an annular metal member.

According to an embodiment, the at least one antenna 610 may include a radiator (e.g., a conductive coil) for supporting the power transmission/reception circuit 621. For example, the power transmission/reception circuit 621 is capable of wirelessly receiving power from an external device, or is capable of wirelessly transmitting power to an external device using at least one antenna 610.

According to an embodiment, the at least one antenna 610 may include a radiator for supporting various types of communication of the communication circuit 623. For example, the at least one antenna 610 may be used for short-range communication. The short-range communication may include at least one of, for example, Wi-Fi, Bluetooth, Near Field Communication (NFC), and Global Navigation Satellite System (GNSS). As another example, the short-range communication may include signal transmission/reception of magnetic signals.

According to various embodiments, at least a portion of the at least one antenna 610 may be used for cellular communication. The cellular communication may use at least one of, for example, Long-Term Evolution (LTE), LTE Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM).

FIG. 7 illustrates the arrangement structure of the at least one antenna 610 of FIG. 6. Referring to FIG. 7, at least one antenna 610 according to an embodiment may include a first antenna 710, a second antenna 720, a third antenna 730, and a fourth antenna 740.

According to an embodiment, the first antenna 710, the second antenna 720, the third antenna 730, or the fourth antenna 740 generally extends from a first end to a second end, and may include a conductive line including a wound portion between the first end and the second end. For example, the first antenna 710, the second antenna 720, the third antenna 730, or the fourth antenna 740 may include a coil-type metal pattern.

According to an embodiment, as illustrated, the wound portions 713, 723, 733, and 743 of the first antenna 710, the second antenna 720, the third antenna 730, and the fourth antenna 740 may have a substantially tetragonal shape. Without being limited thereto, although not illustrated, the wound portions 713, 723, 733, and 743 of the first antenna 710, the second antenna 720, the third antenna 730, and the fourth antenna 740 may have various shapes, such as a circular shape and a triangular shape.

According to an embodiment, the first antenna 710, the second antenna 720, the third antenna 730, and the fourth antenna 740 may be disposed on a first face of the electronic device 600 (e.g., the first face 5001 in FIG. 5) or a second face (e.g., the second face 5002 in FIG. 5).

According to an embodiment, the wound portion 713 of the first antenna 710 may be surrounded by the wound portion 733 of the third antenna 730.

According to an embodiment, the wound portion 723 of the second antenna 720 may be surrounded by the wound portion 743 of the fourth antenna 740.

According to an embodiment, the wound portion 713 of the first antenna 710 may be disposed outside the wound portion 723 of the second antenna 720. According to various embodiments, the wound portion 713 of the first antenna 710 may be disposed outside the wound portion 743 of the fourth antenna 740. For example, the wound portion 713 of the first antenna 710 may be separated from the wound portion 723 of the second antenna 720 or the wound portion 743 of the fourth antenna 740 in the y-axis direction (e.g., the direction from the first short side 411-1 to the second short side 411-2 of the screen in FIG. 4A).

According to an embodiment, the wound portion 733 of the third antenna 730 may at least partially overlap the wound portion 743 of the fourth antenna 740 or the wound portion 723 of the second antenna 720.

According to an embodiment, the first antenna 710 may include a (1-1)$^{th}$ extension line 7111 extending from one end of the wound portion 713 and a (1-2)$^{th}$ extension line 7121 extending from the other end of the wound portion 713. The end of the (1-1)$^{th}$ extension line 7111 may include a (1-1)$^{th}$ contact 711. The end of the (1-2)$^{th}$ extension line 71211 may include a (1-2)$^{th}$ contact 712. The (1-1)$^{th}$ contact 711 and the (1-2)$^{th}$ contact 712 of the first antenna 710 may be electrically connected to the electromagnetic field circuit 620. The electromagnetic field circuit 620 may support various types of communication or various types of wireless power transmission/reception using the conductive line of the first antenna 710 between the (1-1)$^{th}$ contact 711 and the (1-2)$^{th}$ contact 712.

According to an embodiment, the (1-1)$^{th}$ contact 711 and the (1-2)$^{th}$ contact 712 of the first antenna 710 may be disposed outside the wound portion 713 of the first antenna 710. According to various embodiments, the (1-1)$^{th}$ contact 711 and the (1-2)$^{th}$ contact 712 of the first antenna 710 may be disposed inside the wound portion 723 of the second antenna 720. According to various embodiments, the (1-1)$^{th}$ contact 711 and the (1-2)$^{th}$ contact 712 of the first antenna 710 may be disposed outside the wound portion 733 of the third antenna 730.

According to an embodiment, one end of the wound portion 723 of the second antenna 720 may be connected to the (1-1)$^{th}$ extension line 7111 of the first antenna 710 at a portion 714 thereof. The second antenna 720 may include a second extension line 7211 extending from the other end of the wound portion 723. The end of the second extension line 7211 may include a second contact 721. The second contact 721 of the second antenna 720 may be electrically connected to the electromagnetic field circuit 620. The electromagnetic field circuit 620 may support various types of communication or various types of wireless power transmission/reception using the conductive lines of the first antenna 710 and the second antenna 720 between the second contact 721 and the (1-2)$^{th}$ contact 712.

According to an embodiment, the second contact 721 of the second antenna 720 may be disposed outside the wound portion 713 of the first antenna 710. According to various embodiments, the second contact 721 of the second antenna 720 may be disposed inside the wound portion 723 of the second antenna 720.

According to an embodiment, the third antenna 730 may include a (3-1)$^{th}$ extension line 7311 extending from one end of the wound portion 733 and a (3-2)$^{th}$ extension line 7321 extending from the other end of the wound portion 733. The end of the (3-1)$^{th}$ extension line 7311 may include a (3-1)$^{th}$ contact 731. The end of the (3-2)$^{th}$ extension line 7321 may include a (3-2)$^{th}$ contact 732. The (3-1)$^{th}$ contact 731 and the (3-2)$^{th}$ contact 732 of the third antenna 730 may be electrically connected to the electromagnetic field circuit (e.g., the electromagnetic field circuit 620 in FIG. 6). The electromagnetic field circuit 620 may support various types of communication or various types of wireless power transmission/reception using the conductive line of the third antenna 730 between the (3-1)$^{th}$ contact 731 and the (3-2)$^{th}$ contact 732.

According to an embodiment, the (3-1)$^{th}$ contact 731 and the (3-2)$^{th}$ contact 732 of the third antenna 730 may be disposed outside the wound portion 733 of the third antenna 730. According to various embodiments, the (3-1)$^{th}$ contact 731 and the (3-2)$^{th}$ contact 732 of the third antenna 730 may be disposed inside the wound portion 723 of the second antenna 720.

According to an embodiment, the fourth antenna 740 may include a (4-1)$^{th}$ extension line 7411 extending from one end of the wound portion 743 and a (4-2)$^{th}$ extension line 7421 extending from the other end of the wound portion 743. The end of the (4-1)$^{th}$ extension line 7411 may include a (4-1)$^{th}$ contact 741. The end of the (4-2)$^{th}$ extension line 7421 may include a (4-2)$^{th}$ contact 742. The (4-1)$^{th}$ contact 741 and the (4-2)$^{th}$ contact 742 of the fourth antenna 740 may be electrically connected to the electromagnetic field circuit 620. The electromagnetic field circuit 620 may support various types of communication or various types of wireless power transmission/reception using the conductive line of the fourth antenna 740 between the (4-1)$^{th}$ contact 741 and the (4-2)$^{th}$ contact 742.

According to an embodiment, the (4-1)$^{th}$ contact 741 and the (4-2)$^{th}$ contact 742 of the fourth antenna 740 may be disposed inside the wound portion 743 of the fourth antenna 740.

According to an embodiment, with respect to the x-axis (e.g., the direction from the first long side 411-3 to the second long side 411-4 of the screen in FIG. 4A), the (1-2)$^{th}$ contact 712 of the first antenna 710 may be disposed between the (1-1)$^{th}$ contact 711 of the first antenna 710 and the (3-2)$^{th}$ contact 732 of the third antenna 730. According to various embodiments, with respect to the x-axis, the (1-1)$^{th}$ contact 711 of the first antenna 710 may be disposed between the (1-2)$^{th}$ contact 712 of the first antenna 710 and the second contact 721 of the second antenna 720.

According to various embodiments, the second contact 721 of the second antenna 720 may be disposed between the (1-1)$^{th}$ contact 711 of the first antenna 710 and the (3-1)$^{th}$ contact 731 of the third antenna 730.

According to an embodiment, with respect to the x-axis, the (4-2)$^{th}$ contact 742 of the fourth antenna 740 may be disposed between the (1-2)$^{th}$ contact 712 and the (1-1)$^{th}$ contact 711 of the first antenna 710. According to various embodiments, with respect to the x-axis, the (4-1)$^{th}$ contact 741 of the fourth antenna 740 may be disposed between the second contact 721 of the second antenna 710 and the (3-1)$^{th}$ contact 731 of the third antenna 730.

According to an embodiment, with respect to the x-axis (e.g., the direction from the first long side 411-3 to the second long side 411-4 of the screen in FIG. 4A), the (3-2)$^{th}$ contact 732, the (1-2)$^{th}$ contact 712, the (4-2)$^{th}$ contact 742, the (1-1)$^{th}$ contact 711, the second contact 721, the (4-1)$^{th}$ contact 741, and the (3-1)$^{th}$ contact 731 may be disposed in this order.

According to an embodiment, with respect to the y-axis (e.g., the direction from the second side 411-2 to the first short side 411-1 of the screen in FIG. 4A), at least some of the (1-1)$^{th}$ contact 711, the (1-2)$^{th}$ contact 712, the second contact 721, the (3-1)$^{th}$ contact 731, the (3-2)$^{th}$ contact 732, the (4-1)$^{th}$ contact 741, and the (4-2)$^{th}$ contact 742 may be disposed at the same position. For example, with respect to the y-axis, the (3-2)$^{th}$ contact 732, the (1-1)$^{th}$ contact 711, the second contact 721, and the (3-1)$^{th}$ contact 731 may be disposed at the same first position, and the (1-2)$^{th}$ contact 712 may be disposed at a second position different from the first position. According to various embodiments, with respect to the y-axis, the (4-1)$^{th}$ contact 741 and the (4-2)$^{th}$ contact 742 may be disposed at a third position, which is different from the first position and the second position. With respect to the y-axis, the second position may be disposed between the first position and the third position.

The electromagnetic field circuit 620 may be electrically connected to at least one antenna 610. The electromagnetic field circuit 620 may wirelessly transmit and receive signals, or may wirelessly receive or transmit power using at least a portion of the at least one antenna 610. According to an embodiment, the electromagnetic field circuit 620 may include a power transmission/reception circuit 621 and a communication circuit 623.

The power transmission/reception circuit 621 may wirelessly receive or transmit power using at least a portion of the at least one antenna 610. According to an embodiment, the power transmission/reception circuit 621 may be an electromagnetic-induction-type power transmission/reception circuit. For example, when a magnetic field flowing in an antenna (e.g., a conductive coil) of an external device is applied to the at least one antenna 610, inductive current flows through at least a portion of the at least one antenna 610, and the power transmission/reception circuit 621 may use this induced current so as to provide power to the load of the electronic device 600 (e.g., for battery charging). According to various embodiments, the power transmission/reception circuit 621 may wirelessly transmit power to an external device using electromagnetic induction between the antenna of the external device and at least a portion of the at least one antenna 610 of the electronic device 600.

According to various embodiments, the electromagnetic-induction-type power transmission/reception circuit 621 may comply with the Wireless Power Consortium (WPC) standard. The electromagnetic-induction-type power transmission/reception circuit 621 according to the WPC standard is capable of wirelessly receiving power from an external device, or is capable of wirelessly transmitting power to an external device using a frequency within the range from 110 kHz to 205 kHz. According to various embodiments, the electromagnetic-induction-type power transmission/reception circuit 621 may comply with the Power Matters Alliance (PMA) standard. The electromagnetic-induction-type power transmission/reception circuit 621 according to the PMA standard is capable of wirelessly receiving power from an external device or is capable of wirelessly transmitting power to an external device using a frequency within the range from 227 kHz to 357 kHz or a frequency within the range from 118 kHz to 153 kHz.

According to another embodiment, the power transmission/reception circuit 621 may be an electromagnetic-resonance-type power transmission/reception circuit. For example, at least a portion of the at least one antenna 610 and a power transmission antenna (e.g., a conductive coil) of an external device may have the same resonance frequency, and the power transmission/reception circuit 621 may receive power from the external device or may transmit power to the external device using the resonance phenomenon therebetween.

According to various embodiments, the electromagnetic-resonance-type power transmission/reception circuit 621 may comply with the Alliance for Wireless power (A4WP) standard. The electromagnetic-resonance-type power transmission/reception circuit 621 according to the A4WP standard is capable of wirelessly receiving power from an external device or is capable of wirelessly transmitting power to an external device using a resonance frequency of 6.78 MHz.

According to an embodiment, the power transmission/reception circuit 621 may wirelessly transmit or receive power in various manners using the first antenna 710. For example, the electromagnetic-induction-type power transmission/reception circuit 621 may wirelessly receive or transmit power using the first antenna 710.

According to an embodiment, the power transmission/reception circuit 621 may wirelessly transmit or receive power using the third antenna 730. For example, the electromagnetic-resonance-type power transmission/reception circuit 621 may wirelessly receive or transmit power using the third antenna 730.

The communication circuit 623 may support various types of communication using at least a portion of the at least one antenna 610. According to an embodiment, the communication circuit 623 may include a short-range communication circuit and may support short-range communication with an external device using at least a portion of the at least one antenna 610. For example, the short-range communication may include Wi-Fi, Bluetooth, NFC, GNSS, and the like. According to various embodiments, the short-range communication may include transmission/reception of magnetic signals with an external device (e.g., MST for electronic payment). Magnetic signal transmission/reception technology is communication technology for offline payment using a magnetic field, and may be used to perform communication with a Point Of Sale (POS) device.

According to an embodiment, the communication circuit 623 may implement various types of short-range communication (e.g., MST for electronic payment) using the first antenna 710 and the second antenna 720. For example, in the case of using the MST, the communication circuit 623 may wirelessly transmit signals to an external device (e.g., a POS device) using a frequency of 70 kHz.

According to an embodiment, the communication circuit 623 may implement various types of short-range communication (e.g., NFC) using the fourth antenna 740. For example, in the case of using NFC, the communication circuit 623 may perform bidirectional communication with an external device using a frequency of 13.56 MHz.

According to various embodiments, the communication circuit 623 may include a cellular communication circuit, and may transmit or receive signals for mobile communication to or from a base station using at least a portion of at least one antenna 610.

The control circuit 640 (e.g., the processor 120 in FIG. 1 or the processor 210 in FIG. 2) may be electrically connected to the electromagnetic field circuit 620. According to an embodiment, the control circuit 640 may selectively activate the power transmission/reception circuit 621 of the electromagnetic field circuit 620 on the basis of at least a portion of at least one input 641. According to various embodiments, the control circuit 640 may detect at least one input 641 and may selectively activate the communication circuit 623 of the electromagnetic field circuit 620 on the basis of at least a portion of at least one input 641. For example, the at least one input 641 may include a signal input via an input device (not illustrated) (e.g., the input device 250 in FIG. 2) of the electronic device 600. According to various embodiments, the at least one input 641 may include a signal detected via a sensor module (not illustrated) (e.g., the sensor module 240 in FIG. 2) of the electronic device 600. According to various embodiments, the at least one input 641 may include a signal received from an external device in a wireless or wired manner.

For example, when it is detected that power is being received from the outside wirelessly, the control circuit 640 may activate at least a portion of the power transmission/reception circuit 621 of the electromagnetic field circuit 620 (e.g., the electromagnetic-induction-type wireless power transmission/reception circuit or the electromagnetic-resonance-type wireless power transmission/reception circuit) (e.g., a wireless power transmission/reception mode). According to various embodiments, when it is detected that no power is being transmitted from the outside wirelessly, the control circuit 640 may deactivate at least a portion of the power transmission/reception circuit 621 of the electromagnetic field circuit 620 (e.g., releasing the power transmission/reception mode).

As another example, when it is detected that power is being received from the outside wirelessly, the control circuit 640 may activate at least a portion of the power transmission/reception circuit 621 of the electromagnetic field circuit 620, and may deactivate at least a portion of the communication circuit 623 of the electromagnetic field circuit 620.

As another example, when input for use of a short-range communication (e.g., NFC or MST) function is detected, the control circuit 640 may activate at least a portion of the communication circuit 623 (e.g., a communication circuit for MST or a communication circuit for NFC) of the electromagnetic field circuit 620 (e.g., entering the short-range communication mode).

According to various embodiments, when input for non-use of a short-range communication function is detected via the input device of the electronic device 600, the control circuit 640 may deactivate at least a portion of the communication circuit 623 of the electromagnetic field circuit 620 (e.g., may release the short-range communication mode).

As another example, when input for use of short-range communication (e.g., NFC or MST) is detected, the control circuit 640 may activate at least a portion of the communication circuit 623 and may deactivate at least a portion of the power transmission/reception circuit 621 of the electromagnetic field circuit 620.

According to various embodiments, the electromagnetic field circuit 620 may include an inverter or a rectifier (not illustrated). For example, when driving the communication system, the electromagnetic field circuit 620 may use the inverter, and when driving the wireless power transmission/reception system, the electromagnetic field circuit 620 may use the rectifier.

The connection circuit 630 may include various types of circuits connecting the at least one antenna 610 and the electromagnetic field circuit 620. According to an embodiment, the connection circuit 630 is capable of preventing deterioration of the wireless power transmission/reception efficiency of the electronic device 600. According to various embodiments, the connection circuit 630 is capable of preventing deterioration of the wireless communication efficiency of the electronic device 600.

According to various embodiments, the connection circuit 630 may electrically or magnetically isolate the communication system from the wireless power transmission/reception system (or a wireless power transmission/reception module) so as to prevent power from leaking from the wireless power transmission/reception system to the communication system (or a wireless communication module). When the power transmission/reception circuit 621 wirelessly receives power from an external device via at least a portion of the at least one antenna 610 or wirelessly transmits power to an external device, the connection circuit 630 may prevent the generation of power leaked to the communication circuit 623, or may block power leaked to the communication circuit 623.

For example, the power transmission/reception circuit 621 (e.g., the electromagnetic-resonance-type wireless power transmission/reception circuit) is capable of wirelessly receiving power from an external device or is capable of wirelessly transmitting power to an external device using the third antenna 730. When power is wirelessly received from an external device, an electromagnetic field generated by the antenna of the external device may be applied not only to the third antenna 730, but also to the first antenna 710, the second antenna 720, or the fourth antenna 740, which is located adjacent to the third antenna 730. The electromagnetic field generated by the antenna of the external device may have an electromagnetic characteristic (e.g., a Self-Resonance Frequency (SRF)) that is capable of resonating at least a portion of the first antenna 710, the second antenna 720, or the fourth antenna 740. According to various embodiments, a wireless power transmission/reception system including the third antenna 730 and the power transmission/reception circuit 621 may have an electromagnetic characteristic capable of resonating at least a portion of the first antenna 710, the second antenna 720, or the fourth antenna 740. According to an embodiment, this electromagnetic characteristic may be a harmonic of the resonance frequency for wireless power transmission/reception between the wireless power transmission/reception system (e.g., the third antenna 730) and the antenna of an external device. Due to this, when power is wirelessly received from an external device, some of the power from the external device may leak to the first antenna 710, the second antenna 720, or the fourth antenna 740. Similarly, when power is wirelessly transmitted to an external device using the third antenna 730, some of the power may leak to the first antenna 710, the second antenna 720, or the fourth antenna 740 by electromagnetic coupling between the wireless power transmission/reception system (e.g., the third antenna 730) and at least a portion of the first antenna 710, the second antenna 720, or the fourth antenna 740. This leakage power may degrade the efficiency of wireless power reception or transmission by the electronic device 600. According to various embodiments, the leakage power may damage the communication circuit 623 of the electromagnetic field circuit 620.

According to one embodiment, the connection circuit 630 is capable of preventing power from leaking from the wireless power transmission/reception system to the communication system when power is wirelessly transmitted/received by adjusting an electromagnetic characteristic between the wireless power transmission/reception system and the communication system. For example, the connection circuit 630 is capable of adjusting the electromagnetic characteristic such that resonance at at least one frequency between the wireless power transmission/reception system and at least a portion of the communication system (e.g., an antenna) does not occur. A wireless power transmission/reception system may include the third antenna 730 and the power transmission/reception circuit 621. A communication system may include the first antenna 710, the second antenna 720, and the communication circuit 623. According to various embodiments, a communication system may include the fourth antenna 740 and the communication circuit 623.

According to an embodiment, the connection circuit 630 may include various types of circuits to prevent power from leaking to the communication system when transmitting and receiving wireless power, without degrading the performance of the communication system.

According to various embodiments, the connection circuit 630 may include at least one passive element or active element.

According to various embodiments, the connection circuit 630 may include various types of components connected to the communication system. For example, the connection circuit 630 may include various types of components (e.g., a capacitor and a diode) connected to the communication system including at least a portion of the at least one antenna 610 and the communication circuit 623.

For example, the power transmission/reception circuit 621 (e.g., the electromagnetic-induction-type wireless power transmission/reception circuit) is capable of wirelessly receiving power from an external device using the first antenna 710. According to an embodiment, the second antenna 720 is electrically connected to the first antenna 710, and some of the power received from an external device may leak to the second antenna 720. This leakage power may damage the communication circuit 623 of the electromagnetic field circuit 620.

According to an embodiment, the connection circuit 630 may electrically or magnetically isolate the communication system from the wireless power transmission/reception system so as to prevent power from leaking from the wireless power transmission/reception system to the communication system. For example, when power is wirelessly received from an external device or power is wirelessly transmitted to an external device, the connection circuit 630 is capable of preventing the communication circuit 623 from damage by blocking the flow of the leakage current into the communication circuit 623. For example, when power is wirelessly received from an external device wirelessly or power is wirelessly transmitted to an external device, the control circuit 640 may adjust the connection circuit 630 so as to release the connection between at least a portion of the at least one antenna 610 and the communication circuit 623. For example, the connection circuit 630 may include at least one switch mounted between the at least one antenna 610 and the communication circuit 623.

According to various embodiments, the connection circuit 630 may further include a circuit (e.g., an antenna-matching circuit) for matching a wireless frequency between at least a portion of the at least one antenna 610 and a communication system (e.g., a short-range communication system) including the communication circuit 623.

According to an embodiment, the communication circuit 623 of the electromagnetic field circuit 620 may be of a single-component type (e.g., a System on Chip (SoC)). According to various embodiments, the power transmission/reception circuit 621 of the electromagnetic field circuit 620 may be an SoC.

According to various embodiments, the electromagnetic field circuit 620 may be of a single-component type (e.g., an SoC) including both the power transmission/reception circuit 621 and the communication circuit 623.

Figure 8:
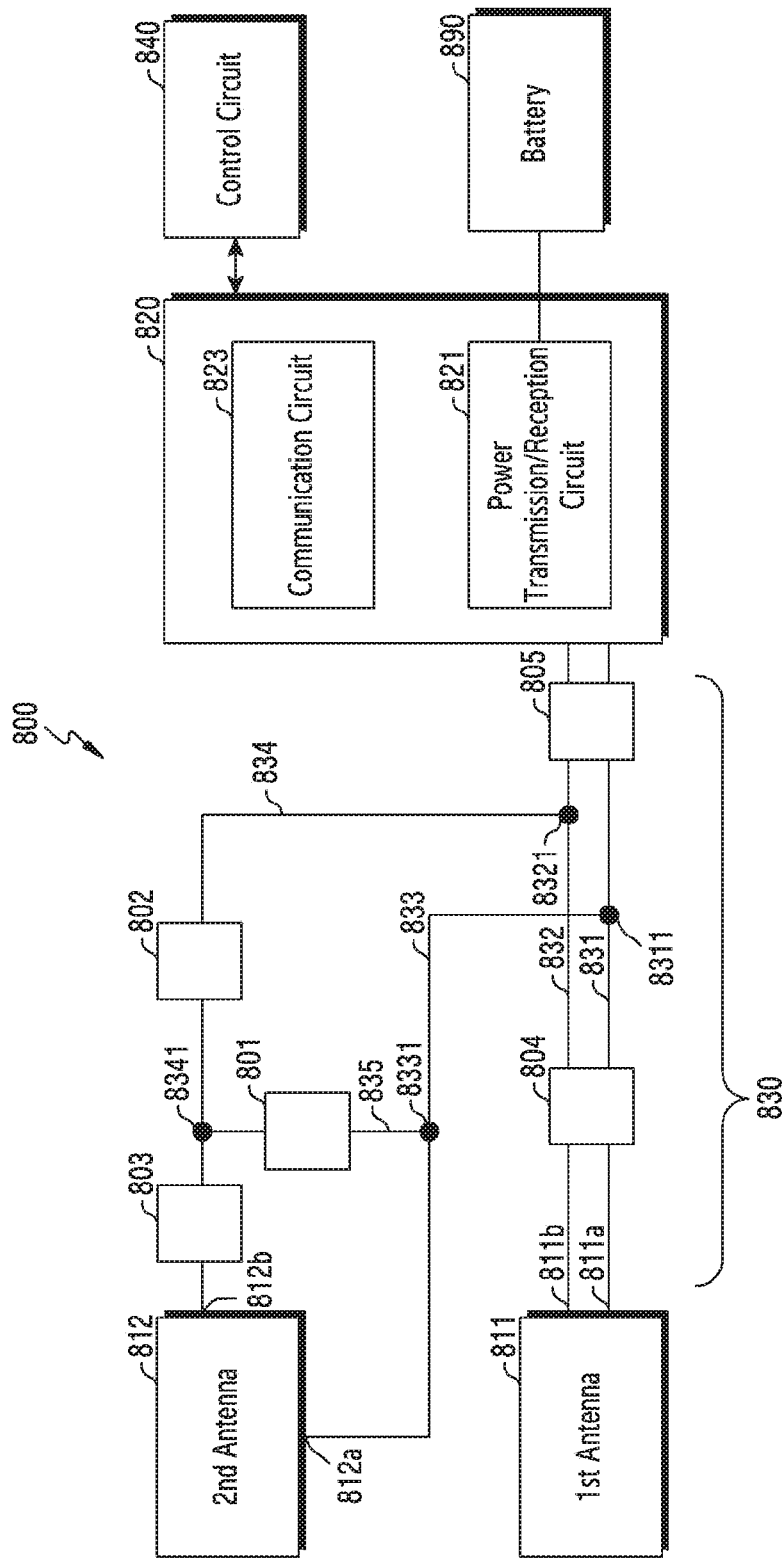
FIG. 8 is a block diagram illustrating an electronic device according to an embodiment of the present disclosure.

FIG. 8 is a block diagram illustrating an electronic device according to an embodiment of the present disclosure. An electronic device 800 may include all or part of, for example, the electronic device 101 of FIG. 1, the electronic device 201 of FIG. 2, the electronic device 400 of FIGS. 4A and 4B, the electronic device 500 of FIG. 5, or the electronic device 600 of FIG. 6.

Referring to FIG. 8, the electronic device 800 may include a first antenna 811, a second antenna 812, an electromagnetic field circuit 820, a connection circuit 830, and a control circuit 840.

According to an embodiment, the first antenna 811 may be a radiator for supporting a power transmission/reception circuit 821. The first antenna 811 may be any of various types of radiators. For example, the first antenna 811 may include a conductive line extending from a first end 811a to a second end 811b and including a wound portion between the first end 811a and the second end 811b. According to various embodiments, the first antenna 811 may include the first antenna 710 or the third antenna 730 of FIG. 7.

According to an embodiment, the second antenna 812 may be a radiator for supporting a communication circuit 823. The second antenna 812 may be any of various types of radiators. For example, the second antenna 812 may include a conductive line extending from a first end 812a to a second end 812b and including a wound portion between the first end 812a and the second end 812b. According to various embodiments, the second antenna 812 may include the fourth antenna 740 of FIG. 7. According to various embodiments, the second antenna 812 may include the first antenna 710 and the second antenna 720 of FIG. 7.

According to an embodiment, the first antenna 811 and/or the second antenna 812 may be disposed within a housing (not illustrated) that forms the appearance of the electronic device 800, or may form the outside of one face of the housing. For example, the housing may include a first face (the first face 4001 in FIG. 4A) that forms the front face of the electronic device 800 and a second face (e.g., the second face 4002 in FIG. 4B) that forms the rear face of the electronic device 800. The electronic device 800 may include a display (not illustrated) (e.g., the display 411 in FIG. 4A or the display 520 in FIG. 5), which may be exposed through at least a portion of the first face, which is light-transmissive. The first antenna 811 and the second antenna 812 may be disposed on the second face, or may form a portion of the second face.

The electromagnetic field circuit 820 may include a power transmission/reception circuit 821 and a communication circuit 823. According to an embodiment, the power transmission/reception circuit 821 may wirelessly receive power from an external device or may wirelessly transmit power to an external device using the first antenna 811. For example, the power transmission/reception circuit 821 is capable of wirelessly receiving power from an external device using the first antenna 811 so as to charge the battery 890 of the electronic device 800.

According to various embodiments, the power transmission/reception circuit 821 may be an electromagnetic-induction-type or electromagnetic-resonance-type power transmission/reception circuit.

According to an embodiment, the communication circuit 823 may implement various types of communication using the second antenna 812. For example, the communication circuit 823 may implement short-range communication (e.g., NFC or MST) with an external device using the second antenna 812.

The connection circuit 830 may connect the first antenna 811 and the electromagnetic field circuit 820. According to an embodiment, the connection circuit 830 may include a first line 831 that connects the first end 811a of the first antenna 811 and the electromagnetic field circuit 820. According to various embodiments, the connection circuit 830 may include a second line 832 that connects the second end 811b of the first antenna 811 and the electromagnetic field circuit 820. For example, the wireless power transmission/reception system of the electronic device 800 may include a first electric path in which the power transmission/reception circuit 821, the first line 831, the first antenna 811, and the second line 832 are connected.

The connection circuit 830 may connect the second antenna 812 and the electromagnetic field circuit 820. According to an embodiment, the connection circuit 830 may include a third line 833 that connects the first end 812a of the second antenna 812 and the electromagnetic field circuit 820. According to various embodiments, the connection circuit 830 may include a fourth line 834 that connects the second end 812b of the second antenna 812 and the electromagnetic field circuit 820. For example, one end of the third line 833 may be electrically connected to the first end 812*a* of the second antenna 812, and the other end of the third line 833 may be electrically connected to a point 8311 on the first line 831. One end of the fourth line 834 may be electrically connected to the second end 812*b* of the second antenna 812, and the other end of the fourth line 834 may be electrically connected to a point 8321 on the first line 832. The communication system of the electronic device 800 may include a second electric path in which the communication circuit 823, the third line 833, the second antenna 812, and the fourth line 834 are connected.

According to an embodiment, the connection circuit 830 may include a fifth line 835 connected to the second electric path. For example, one end of the fifth line 835 may be electrically connected to a point 8331 on the third line 833, and the other end of the fifth line 835 may be electrically connected to a point 8341 on the fourth line 834.

According to an embodiment, the connection circuit 830 may include various types of first connection circuits 801 (or first isolation circuits) connected to the fifth line 835. The first connection circuit 801 may electrically or magnetically isolate the communication system from the wireless power transmission/reception system so as to prevent power from leaking from the wireless power transmission/reception system to the communication system. A communication system may include the second antenna and the communication circuit 823. A wireless power transmission/reception system supports electromagnetic-induction-type or electromagnetic-resonance-type wireless power transmission/reception, and may include the first antenna and the power transmission/reception circuit 821.

For example, the power transmission/reception circuit 821 (e.g., the electromagnetic-resonance-type wireless power transmission/reception circuit) is capable of wirelessly receiving power from an external device or capable of wirelessly transmitting power to an external device using the first antenna 811. When power is wirelessly received from an external device, an electromagnetic field generated by the antenna of the external device may be applied not only to the first antenna 811, but also to the second antenna 812 adjacent to the first antenna 811. The electromagnetic field generated by the antenna of the external device may have an electromagnetic characteristic (e.g., an SRF) capable of resonating at least a portion of the second antenna 812. According to various embodiments, the wireless power transmission/reception system including the first antenna 811 and the power transmission/reception circuit 821 may have an electromagnetic characteristic capable of resonating at least a portion of the second antenna 812. According to an embodiment, this electromagnetic characteristic may be harmonics of the resonance frequency for wireless power transmission/reception between the wireless power transmission/reception system and the antenna of an external device. Due to this, when power is wirelessly received from an external device, some of the power from the external device may leak to the communication circuit 823. Similarly, when power is wirelessly transmitted to an external device using the first antenna 811, some of the power may leak to the communication circuit 823 by electromagnetic coupling between the wireless power transmission/reception system and at least a portion of the second antenna 812. This leakage power may degrade the efficiency of wireless power reception or transmission by the electronic device 800. According to various embodiments, the leakage power may damage the communication circuit 823 of the electromagnetic field circuit 820.

According to various embodiments, the first connection circuit 801 is capable of preventing power from leaking to the communication circuit 623 when the power transmission/reception circuit 821 wirelessly receives the power from an external device or wirelessly transmits the power to an external device using the first antenna 811.

According to various embodiments, the first connection circuit 801 may include at least one passive element or active element.

According to an embodiment, the first connection circuit 801 may include at least one capacitor.

According to an embodiment, the first connection circuit 801 may include at least one variable capacitor. For example, when the power transmission/reception circuit 821 wirelessly receives power from an external device or wirelessly transmits power to an external device via the first antenna 811, the control circuit 840 may detect power leaking from the wireless power transmission/reception system and may adjust the variable capacitor of the first connection circuit 801 according to the detected leakage power.

According to an embodiment, the connection circuit 830 may include various types of second connection circuits 802 (or second isolation circuits) connected to the fourth line 834. The second connection circuit 802 may be connected to a line between a point 8341 on the fourth line 834 and a point 8321 on the second line 832. The second connection circuit 802 may electrically or magnetically isolate the communication system from the wireless power transmission/reception system so as to prevent power from leaking from the wireless power transmission/reception system to the communication system. For example, when the power transmission/reception circuit 821 wirelessly receives power from an external device or wirelessly transmits power to an external device via the first antenna 811, the second connection circuit 802 is capable of preventing the communication circuit 823 from being damaged by blocking the power leaking to the communication circuit 823.

According to various embodiments, the second connection circuit 802 may include at least one passive element or active element.

According to various embodiments, the second connection circuit 802 may include various types of high-voltage elements. For example, the second connection circuit 802 may include various types of capacitors, diodes, switches (e.g., a MOSFET and an AC isolation switch), or the like.

According to an embodiment, the second connection circuit 802 may include a Transient Voltage Suppressor (TVS) diode. For example, the TVS diode may be mounted on a line between the point of the fourth line 834 and a ground member (e.g., a ground of a PCB). When the power transmission/reception circuit 821 wirelessly receives power from an external device or wirelessly transmits power to an external device via the first antenna 811, the TVS diode is capable of blocking power leaking to the communication circuit 823.

According to another embodiment, the second connection circuit 802 may include a switch. For example, when the power transmission/reception circuit 821 wirelessly receives power from an external device or wirelessly transmits power to an external device via the first antenna 811, the switch is turned off, so that power can be prevented from leaking to the communication circuit 623. According to an embodiment, the switch of the second connection circuit 802 may be adjusted by the control circuit 840.

According to an embodiment, the first connection circuit 801 reduces power transmitted to the second connection circuit 802, so that the amount of leakage power that needs to be blocked by the second connection circuit 802 can be reduced. Thereby, it is possible to secure the performance of the second connection circuit 802 (e.g., the TVS diode). Thereby, according to various embodiments, the risk of the second connection circuit 802 being damaged by leakage power can be reduced. According to various embodiments, when the first connection circuit 801 is applied, the second connection circuit 802 may be designed such that an element of a first specification and cost can be replaced by an element of a second specification and cost lower than the first specification and cost.

According to various embodiments, the electronic device 800 may further include a fourth connection circuit 804 or a fifth connection circuit 805 mounted on the lines 831 and 832 between the first antenna 811 and the electromagnetic field circuit 820.

According to various embodiments, at least a portion of the third connection circuit 803, the fourth connection circuit 804, or the fifth connection circuit 805 may include a circuit for adjusting an electromagnetic characteristic (e.g., frequency matching) of a system (e.g., a wireless power transmission/reception system) including the first antenna 811 and the power transmission/reception circuit 821. According to various embodiments, at least a portion of the third connection circuit 803, the fourth connection circuit 804, or the fifth connection circuit 805 may include a circuit for adjusting an electromagnetic characteristic (e.g., frequency matching) of a system (e.g., a short-range communication system) including the second antenna 812 and the communication circuit 823. For example, the third connection circuit 803, the fourth connection circuit 804, or the fifth connection circuit 805 may include at least one passive element or active element. According to various embodiments, the third connection circuit 803, the fourth connection circuit 804, or the fifth connection circuit 805 may include various types of components such as a capacitor and a diode.

According to various embodiments, the fourth connection circuit 804 may be connected to a line between the first end 811a of the first antenna 811 and the point 8311 on the first line 831. According to various embodiments, the fourth connection circuit 804 may be connected to a line between the second end 811a of the first antenna 811 and the point 8321 on the second line 832. According to various embodiments, the fourth connection circuit 804 may be a parallel-type circuit that connects a point on the first line 831 and a point on the second line 832.

According to various embodiments, the fifth connection circuit 805 may be connected to a line between the point 8311 on the first line 831 and the electromagnetic field circuit 820. According to various embodiments, the fifth connection circuit 805 may be connected to a line between the point 8321 on the second line 832 and the electromagnetic field circuit 820. According to various embodiments, the fifth connection circuit 805 may be a parallel-type circuit that connects a point on the first line 831 and a point on the second line 832.

The control circuit 840 (e.g., the processor 120 in FIG. 1 or the processor 210 in FIG. 2) may be electrically connected to the electromagnetic field circuit 820. According to various embodiments, the control circuit 840 includes at least a portion of the control circuit 640 of FIG. 6, and a detailed description thereof will thus be omitted.

Figure 9:
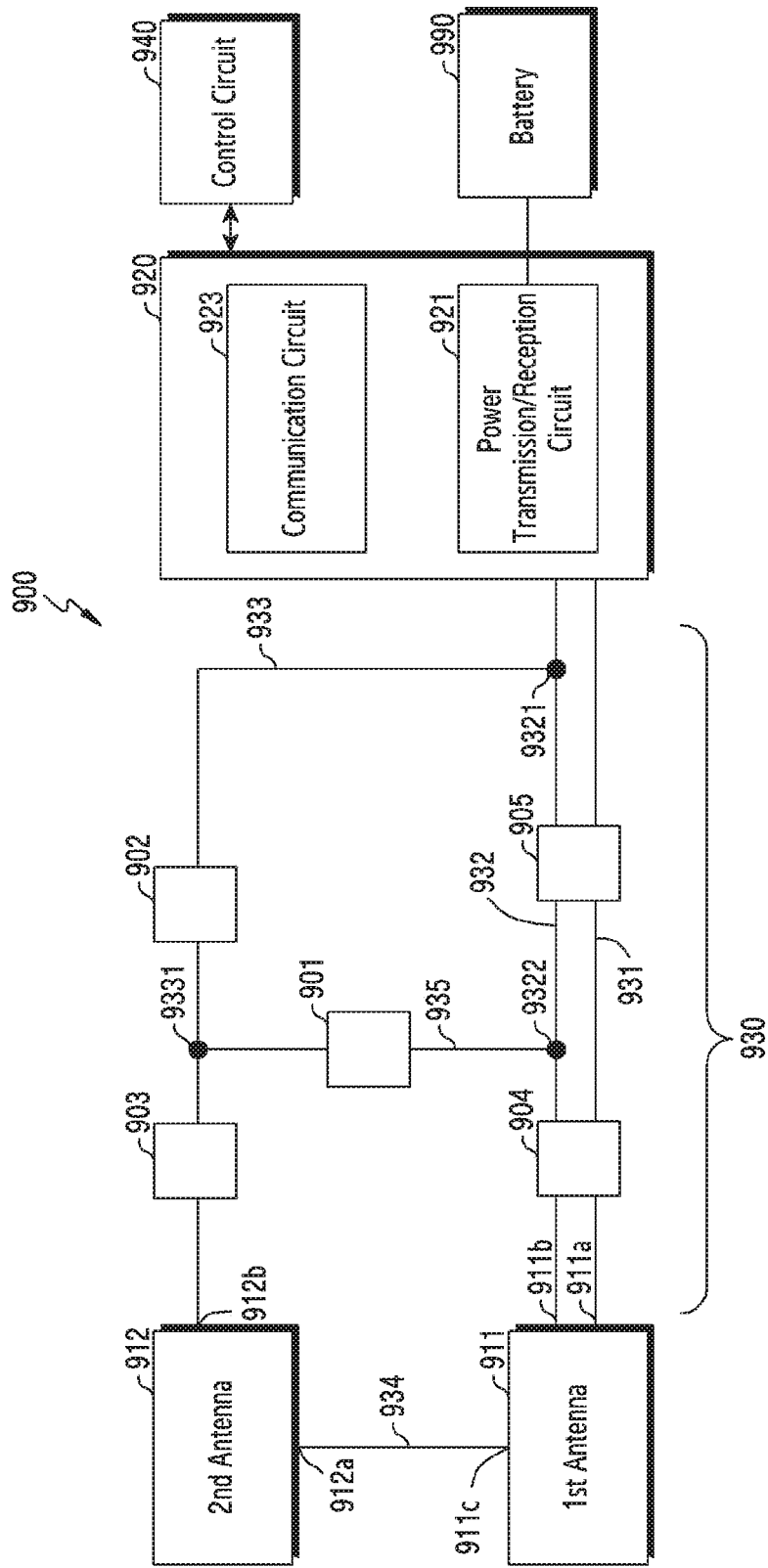
FIG. 9 is a block diagram illustrating an electronic device according to an embodiment of the present disclosure.

FIG. 9 is a block diagram illustrating an electronic device according to an embodiment of the present disclosure. FIGS. 10A to 10F are circuit diagrams of the electronic device of FIG. 9, according to various embodiments. An electronic device 900 may include all or part of, for example, the electronic device 101 of FIG. 1, the electronic device 201 of FIG. 2, the electronic device 400 of FIGS. 4A and 4B, the electronic device 500 of FIG. 5, or the electronic device 600 of FIG. 6.

Figure 10A:
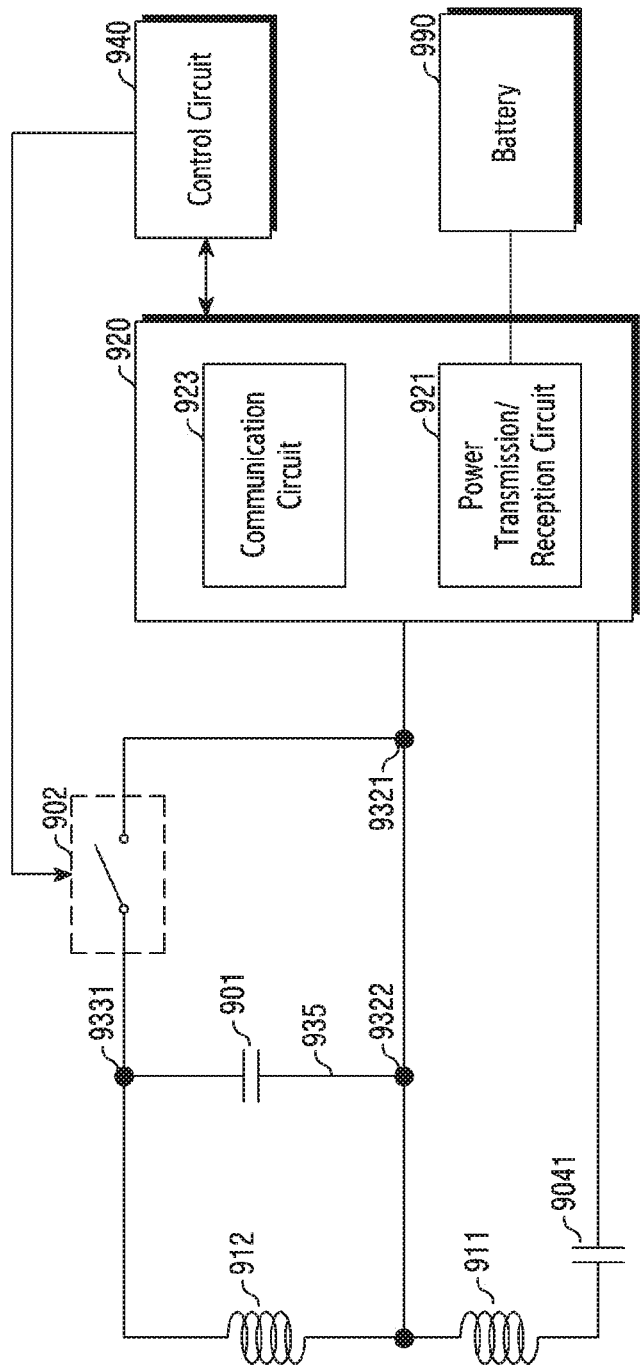
FIGS. 10A to 10F are circuit diagrams of the electronic device of FIG. 9, according to various embodiments.
Figure 10B:
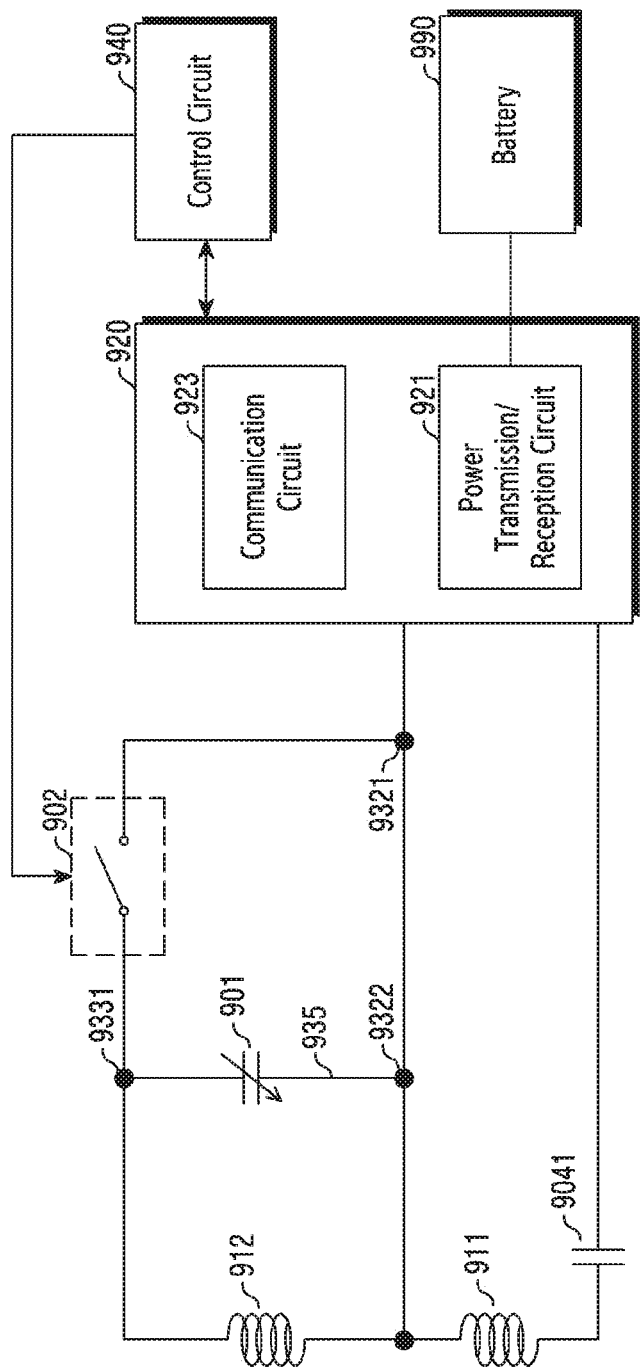
Figure 10C:
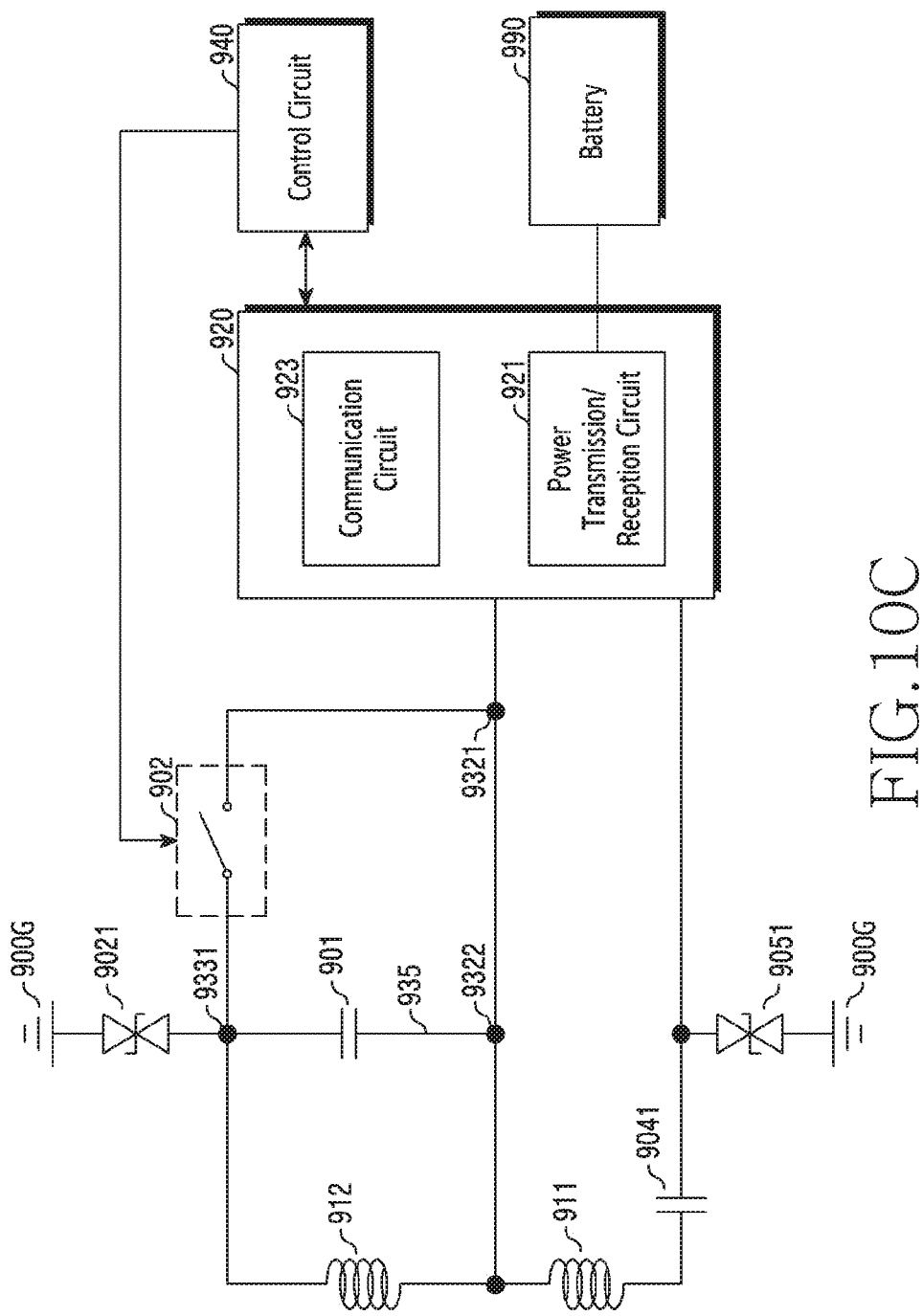
Figure 10D:
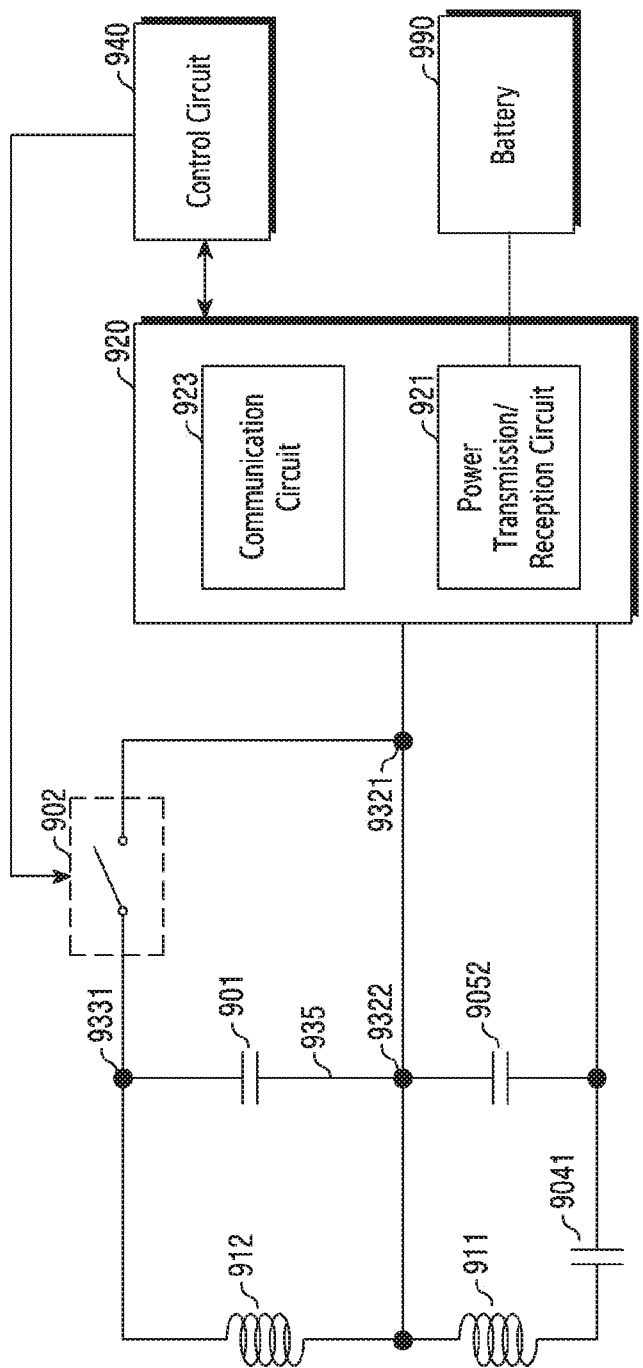
Figure 10E:
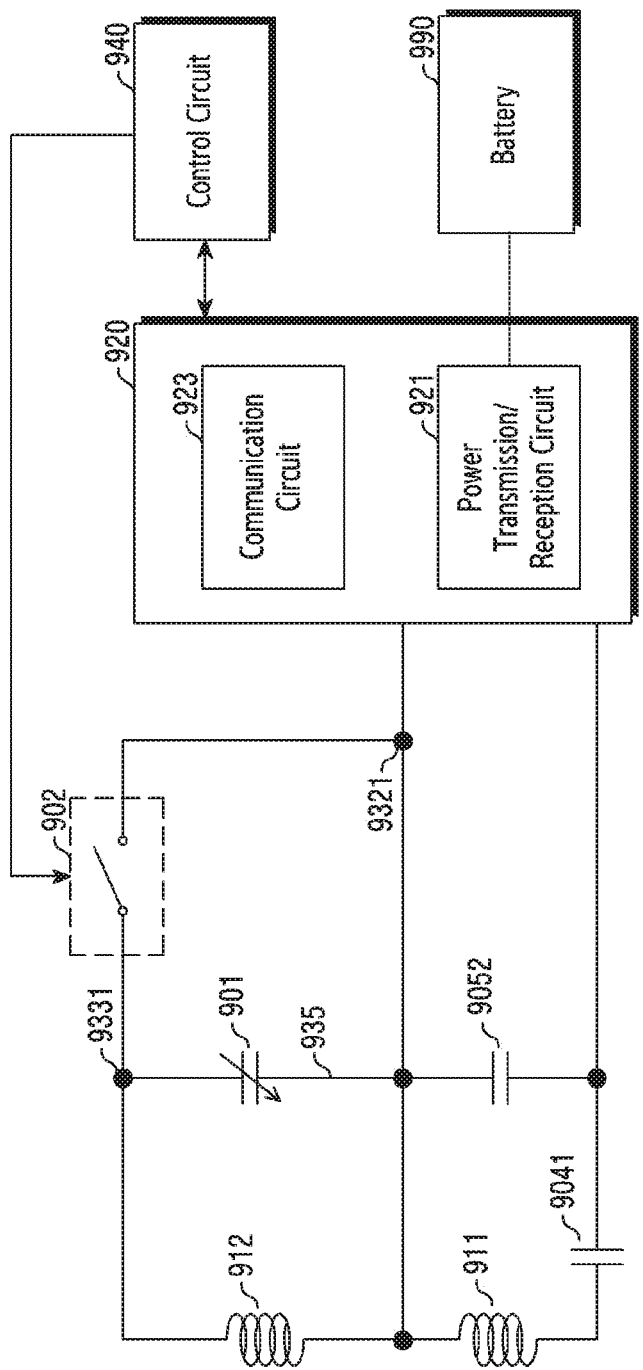
Figure 10F:
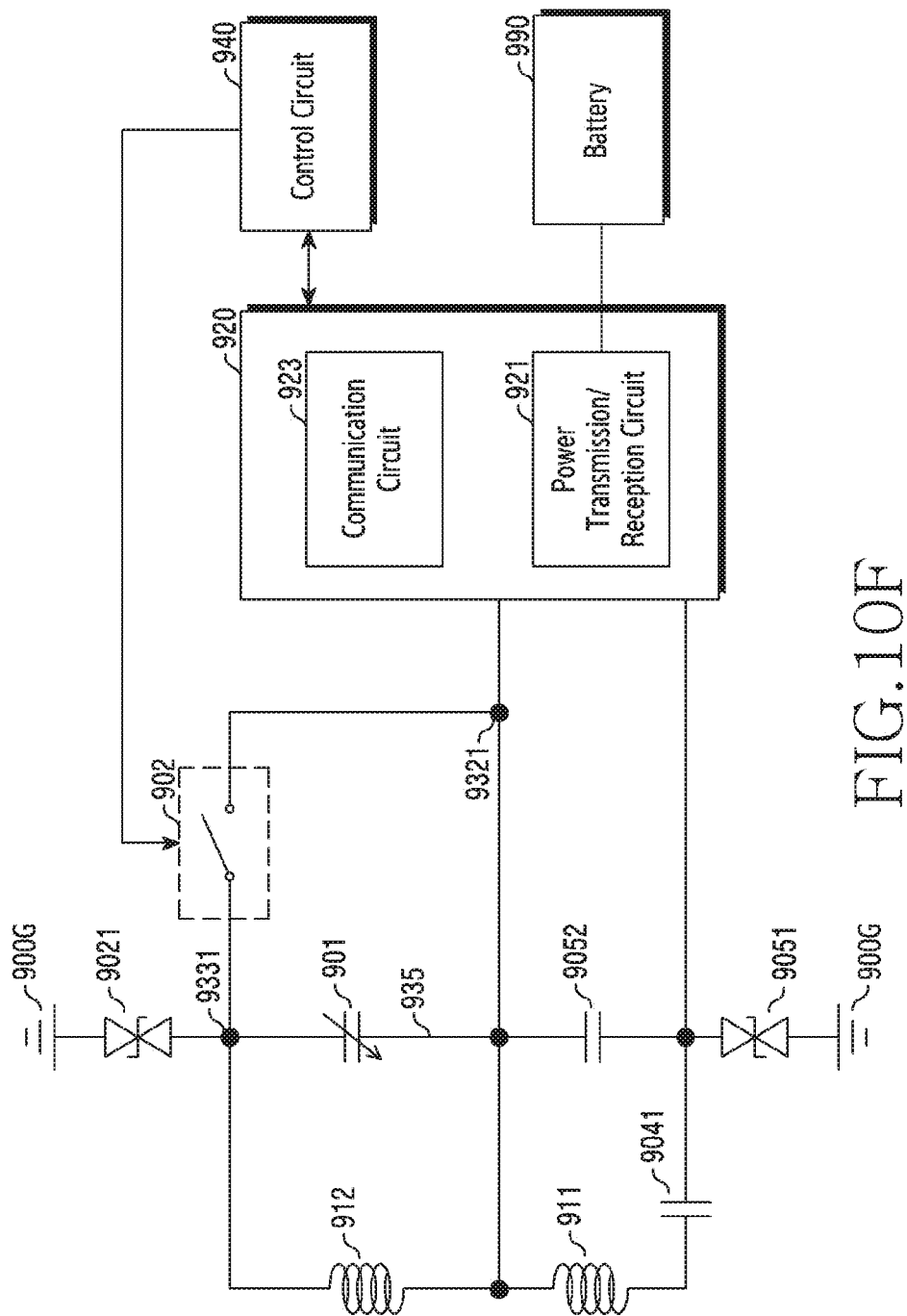

Referring to FIGS. 9 to 10F, the electronic device 900 may include a first antenna 911, a second antenna 912, an electromagnetic field circuit 920, a connection circuit 930, and a control circuit 940.

According to an embodiment, the first antenna 911 may be a radiator for supporting a power transmission/reception circuit 921. The first antenna 911 may be any of various types of radiators. For example, the first antenna 911 may include a conductive line extending from a first end 911a to a second end 911b and including a wound portion between the first end 911a and the second end 911b. According to various embodiments, the first antenna 911 may include the first antenna 710 of FIG. 7.

The second antenna 912 may be any of various types of radiators. According to an embodiment, the second antenna 912 may include a conductive line extending from a first end 912a thereof to a second end 912b thereof and including a wound portion between the first end 912a and the second end 912b.

According to an embodiment, the first end 912a of the second antenna 912 may be a point 911c on the conductive line of the first antenna 911 (e.g., the portion 714 on the $(1-1)^{th}$ extension line 7111 in FIG. 7). According to various embodiments, the second antenna 912 may include the second antenna 720 of FIG. 7.

According to an embodiment, the first antenna 911 and/or the second antenna 912 may be disposed within a housing (not illustrated) (e.g., the housing 410 in FIG. 4A) that forms the appearance of the electronic device 900, or may form the outside of one face of the housing. For example, the housing may include a first face (the first face 4001 in FIG. 4A) that forms the front face of the electronic device 900 and a second face (e.g., the second face 4002 in FIG. 4B) that forms the rear face of the electronic device 900. The electronic device 900 may include a display (not illustrated) (e.g., the display 411 in FIG. 4A or the display 520 in FIG. 5), which may be exposed through at least a portion of the first face, which is light-transmissive. The first antenna 911 and the second antenna 912 may be disposed on the second face, or may form a portion of the second face.

The electromagnetic field circuit 920 may include a power transmission/reception circuit 921 and a communication circuit 923. According to an embodiment, the power transmission/reception circuit 921 may wirelessly receive power from an external device or may wirelessly transmit power to an external device using the first antenna 911. For example, the power transmission/reception circuit 921 is capable of wirelessly receiving power from an external device using the first antenna 911 so as to charge the battery 990 of the electronic device 900.

According to various embodiments, the power transmission/reception circuit 921 may be an electromagnetic-induction-type or electromagnetic-resonance-type power transmission/reception circuit.

According to an embodiment, the communication circuit 923 may implement various types of communication using the first antenna 911 and the second antenna 912. For example, the communication circuit 923 may implement short-range communication (e.g., NFC or MST) using the first antenna 911 and the second antenna 912.

The connection circuit 930 may connect the first antenna 911 and the electromagnetic field circuit 920. According to an embodiment, the connection circuit 930 may include a first line 931 that connects the first end 911a of the first antenna 911 and the electromagnetic field circuit 920. According to various embodiments, the connection circuit 930 may include a second line 932 that connects the second end 911*b* of the first antenna 911 and the electromagnetic field circuit 920. For example, the wireless power transmission/reception system of the electronic device 900 may include a first electric path in which the power transmission/reception circuit 921, the first line 931, the first antenna 911, and the second line 932 are connected.

The connection circuit 930 may connect the second antenna 912 and the electromagnetic field circuit 920. According to an embodiment, the connection circuit 930 may include a third line 933 that connects the second end 912*b* of the second antenna 912 and the electromagnetic field circuit 920. For example, one end of the third line 933 may be electrically connected to the second end 912*b* of the second antenna 912, and the other end of the third line 933 may be electrically connected to a point 9321 on the second line 932.

According to an embodiment, the electronic device 900 may include a fourth line 934 that connects the first antenna 911 and the second antenna 912. For example, one end of the fourth line 934 may be electrically connected to a point 911*c* on the conductive line of the first antenna 911 (e.g., the portion 714 on the (1-1)$^{th}$ extension line 7111 in FIG. 7), and the other end of the fourth line 934 may be electrically connected to the first end 912*a* of the second antenna 912. According to various embodiments, the fourth line 934 may include the electrical connection portion between the first antenna 710 and the second antenna 720 of FIG. 7. According to an embodiment, a communication system (e.g., a short-range communication system) of the electronic device 900 may include a second electric path in which the communication circuit 923, the first line 931, the first antenna 911, the second antenna 912, and the third line 933 are connected.

According to an embodiment, the connection circuit 930 may include a fifth line 935 connected to the second electric path. For example, one end of the fifth line 935 may be electrically connected to a point 9322 on the second line 932, and the other end of the fifth line 935 may be electrically connected to a point 9331 on the third line 933.

According to an embodiment, the connection circuit 930 may include various types of first connection circuits 901 (or first isolation circuits) connected to the fifth line 935. The first connection circuit 901 may electrically or magnetically isolate the communication system from the wireless power transmission/reception system so as to prevent power from leaking from the wireless power transmission/reception system to the communication system. A communication system may include the first antenna 911, the second antenna 912, and the communication circuit 923. A wireless power transmission/reception system supports electromagnetic-induction-type wireless power transmission/reception, and may include the first antenna 911 and the power transmission/reception circuit 921. According to various embodiments, a wireless power transmission/reception system supports electromagnetic-resonance-type wireless power transmission/reception, and may include the third antenna (not illustrated) and the power transmission/reception circuit 921 of the electronic device 900.

For example, the power transmission/reception circuit 921 (e.g., the electromagnetic-resonance-type wireless power transmission/reception circuit) is capable of wirelessly receiving power from an external device or is capable of wirelessly transmitting power to an external device using a third antenna (not illustrated) (e.g., the third antenna 730 in FIG. 7). When power is wirelessly received from an external device, an electromagnetic field generated by the antenna of the external device may be applied not only to the third antenna, but also to the first antenna 911 and to the second antenna 912, which are located adjacent to the third antenna. The electromagnetic field generated by the antenna of the external device may have an electromagnetic characteristic (e.g., an SRF) capable of resonating at least a portion of the first antenna 911 and the second antenna 912. According to various embodiments, a wireless power transmission/reception system including the third antenna and the power transmission/reception circuit 921 may have an electromagnetic characteristic capable of resonating at least a portion of the first antenna 911 and the second antenna 912. According to an embodiment, this electromagnetic characteristic may be harmonics of the resonance frequency for wireless power transmission/reception between the wireless power transmission/reception system and the antenna of an external device. Due to this, when power is wirelessly received from an external device, some of the power from the external device may leak to the first antenna 911 and the second antenna 912. Similarly, when power is wirelessly transmitted to an external device using the third antenna, some of the power may leak to the communication circuit 923 by electromagnetic coupling between the power transmission/reception system (e.g., the third antenna) and at least a portion of the first antenna 911 and the second antenna 912. This leakage power may degrade the efficiency of wireless power reception or transmission by the electronic device 900. According to various embodiments, the leakage power may damage the communication circuit 923 of the electromagnetic field circuit 920. According to an embodiment, the first connection circuit 901 is capable of preventing power from leaking to the communication circuit 923 when the power transmission/reception circuit 921 wirelessly receives the power from an external device or wirelessly transmits the power to an external device.

According to various embodiments, the first connection circuit 901 may include at least one passive element or active element.

According to an embodiment, referring to FIGS. 10A to 10F, the first connection circuit 901 may include at least one capacitor. For example, the electronic device 900 may include a third antenna (not illustrated) for wirelessly receiving or transmitting power in an electromagnetic resonance manner. The first connection circuit 901 is capable of preventing power from leaking from the wireless power transmission/reception system to the communication system when power is wirelessly transmitted/received, by adjusting an electromagnetic characteristic (e.g., an SRF) between the wireless power transmission/reception system and the communication system. For example, the first connection circuit 901 is capable of adjusting the electromagnetic characteristics such that resonance at at least one frequency between the wireless power transmission/reception system and at least a portion of the communication system (e.g., the first antenna 911 and the second antenna 912) does not occur. A wireless power transmission/reception system may include the third antenna and the power transmission/reception circuit 921. A communication system may include the first antenna 911, the second antenna 912, and the communication circuit 923.

According to another embodiment, referring to FIG. 10B or 10E, the first connection circuit 901 may include at least one variable capacitor. For example, when the power transmission/reception circuit 921 wirelessly receives power from an external device or wirelessly transmits power to an external device via the third antenna (not illustrated), the control circuit 940 may detect power leaking from the wireless power transmission/reception system and may adjust the variable capacitor of the first connection circuit 901 according to the detected leakage power.

According to an embodiment, the connection circuit 930 may further include various types of second connection circuits 902 (or second isolation circuits) connected to the third line 933. The second connection circuit 902 may be connected to a line between a point 9331 on the third line 933 and a point 9321 on the second line 932. According to an embodiment, the second connection circuit 902 may electrically or magnetically isolate the communication system from the wireless power transmission/reception system so as to prevent power from leaking from the wireless power transmission/reception system to the communication system.

For example, the power transmission/reception circuit 921 (e.g., the electromagnetic-induction-type wireless power transmission/reception circuit) is capable of wirelessly receiving power from an external device using the first antenna 911. According to an embodiment, the second antenna 912 is electrically connected to the first antenna 911, and some of the power received from an external device may leak to the communication circuit 923. This leakage power may damage the communication circuit 923 of the electromagnetic field circuit 920. According to an embodiment, when the power transmission/reception circuit 921 wirelessly receives power from an external device or wirelessly transmits power to an external device, the second connection circuit 902 is capable of preventing the communication circuit 923 from being damaged by blocking the flow of the leakage current into the communication circuit 923.

According to various embodiments, even when the power transmission/reception circuit 921 wirelessly receives or transmits power using a third antenna (not illustrated) of the electronic device 900, the second connection circuit 902 is capable of preventing the communication circuit 923 from being damaged by blocking the flow of the leakage current into the communication circuit 923.

According to various embodiments, the second connection circuit 902 may include at least one passive element or active element.

According to an embodiment, referring to FIGS. 10A to 10F, the second connection circuit 902 may include a switch. For example, when the power transmission/reception circuit 921 wirelessly receives power from an external device or wirelessly transmits power to an external device, the control circuit 940 turns off the switch, so that power can be prevented from leaking to the communication circuit 923.

According to various embodiments, the second connection circuit 902 may further include various types of high-voltage elements. For example, the second connection circuit 902 may include at least one capacitor, diode, switch (e.g., a MOSFET or an AC isolation switch), or the like. For example, referring to FIG. 10C or 10F, the second connection circuit 902 may further include a TVS diode 9021. The TVS diode 9021 may be connected to an electric path between the third line 933 and a ground member (e.g., a ground of a PCB) 900G.

According to an embodiment, the first connection circuit 901 reduces the amount of power transmitted to the second connection circuit 902 (e.g., the TVS diode), so that the amount of leakage power that needs to be blocked by the second connection circuit 902 can be reduced. Thereby, it is possible to secure the performance of the second connection circuit 902 (e.g., the TVS diode). Thereby, according to various embodiments, the risk of the second connection circuit 902 being damaged by leakage power can be reduced. According to various embodiments, when the first connection circuit 901 is applied, the second connection circuit 902 may be designed such that an element of a first specification and cost can be replaced by an element of a second specification and cost lower than the first specification and cost.

According to various embodiments, the electronic device 900 may further include a third connection circuit 903 mounted on a line between the second end 912b of the second antenna 912 and a point 9331 on the third line 933. According to various embodiments, the electronic device 900 may further include a fourth connection circuit 904 or a fifth connection circuit 905 mounted on the lines 931 and 932 between the first antenna 911 and the electromagnetic field circuit 920. For example, the fourth connection circuit 904 may be connected to a line between the first end 911a of the first antenna 911 and the point 9311 on the first line 931. According to various embodiments, the fifth connection circuit 905 may be mounted on a line between the second end 911b of the first antenna 911 and the point 9321 on the second line 932. According to various embodiments, the fourth connection circuit 904 or the fifth connection circuit 905 may be a substantially parallel-type circuit that connects a point on the first line 931 and a point on the second line 932.

According to various embodiments, at least a portion of the third connection circuit 903, the fourth connection circuit 904, or the fifth connection circuit 905 may include a circuit for adjusting an electromagnetic characteristic (e.g., frequency matching) of a system (e.g., a wireless power transmission/reception system) including the first antenna 911 and the power transmission/reception circuit 921. According to various embodiments, at least a portion of the third connection circuit 903, the fourth connection circuit 904, or the fifth connection circuit 905 may include a circuit for adjusting an electromagnetic characteristic (e.g., frequency matching) of a system (e.g., a short-range communication system) including the first antenna 911, the second antenna 912, and the communication circuit 923. For example, the third connection circuit 903, the fourth connection circuit 904, or the fifth connection circuit 905 may include at least one passive element or active element. According to various embodiments, the third connection circuit 903, the fourth connection circuit 904, or the fifth connection circuit 905 may include various types of components such as a capacitor and a diode. For example, referring to FIGS. 10A to 10F, the fourth connection circuit 904 may include a capacitor 9041 connected to the first line 931.

In another example, referring to FIGS. 10D to 10F, the fourth connection circuit 904 or the fifth connection circuit 905 may include at least one capacitor 9052 connected to an electric path that connects a point on the first line 931 and a point on the second line 932. The at least one capacitor 9052 of the fourth connection circuit 904 or the fifth connection circuit 905 may be related to an electromagnetic characteristic on the basis of which a system including the first antenna 911 and the power transmission/reception circuit 921 determines whether an external device wirelessly transmits power.

According to various embodiments, the fourth connection circuit 904 or the fifth connection circuit 905 may further include various types of high-voltage elements. For example, referring to FIG. 10C or 10F, the fourth connection circuit 904 or the fifth connection circuit 905 may include a TVS diode 9051. The TVS diode 9051 may be connected to an electric path between the first line 931 and a ground member (e.g., a ground of a PCB) 900G. When the power transmission/reception circuit 921 wirelessly receives power from an external device or wirelessly transmits power to an external device, the TVS diode 9051 is capable of blocking leakage of power to the communication circuit 923.

The control circuit 940 (e.g., the processor 120 in FIG. 1 or the processor 210 in FIG. 2) may be electrically connected to the electromagnetic field circuit 920. According to various embodiments, the control circuit 940 may be similar to or the same as the control circuit 640 of FIG. 6, and a detailed description thereof will thus be omitted.

Figure 11:
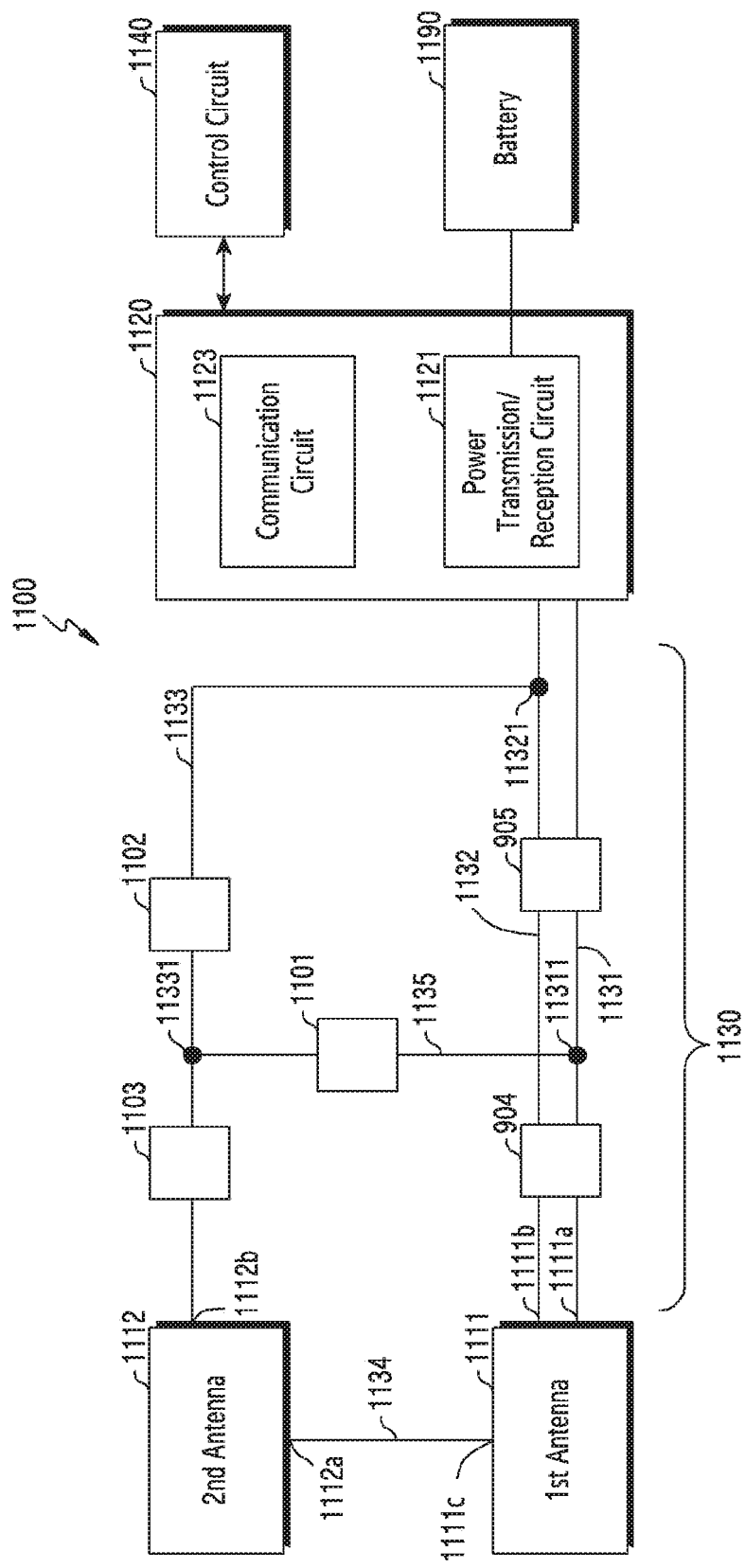
FIG. 11 is a block diagram illustrating an electronic device according to an embodiment of the present disclosure.
Figure 12A:
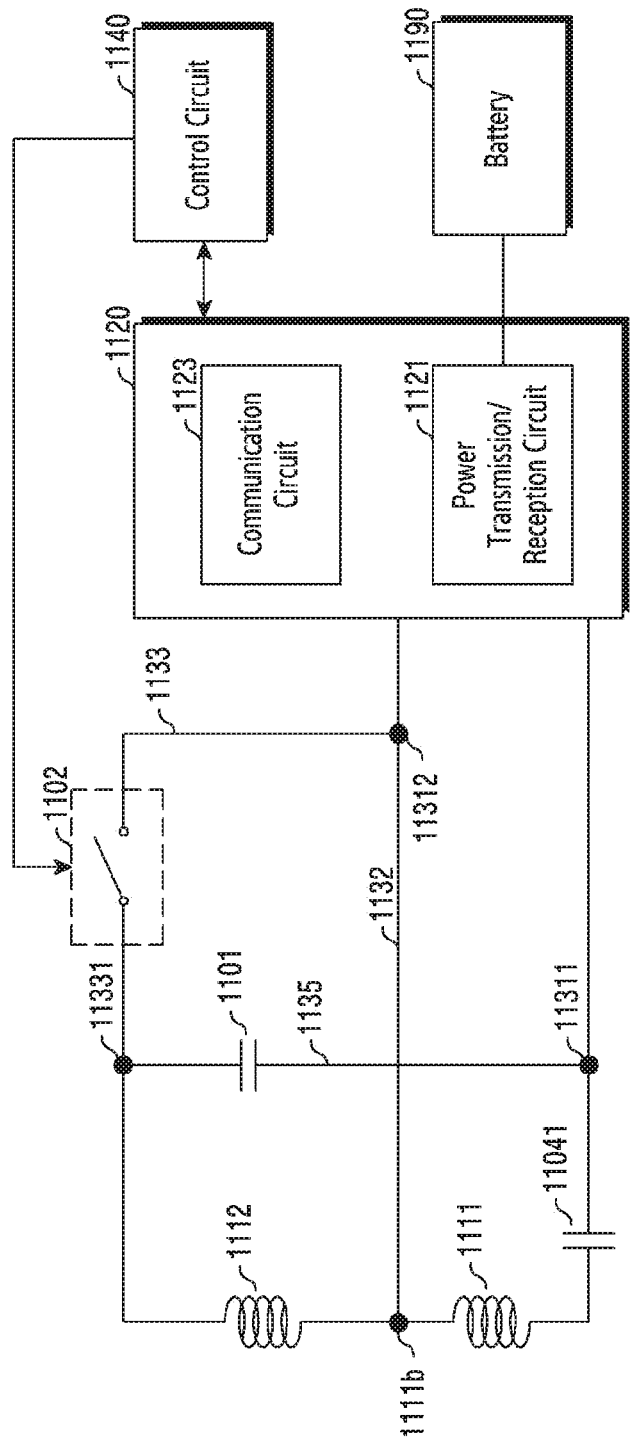
FIGS. 12A to 12C are circuit diagrams of the electronic device of FIG. 9, according to various embodiments.
Figure 12B:
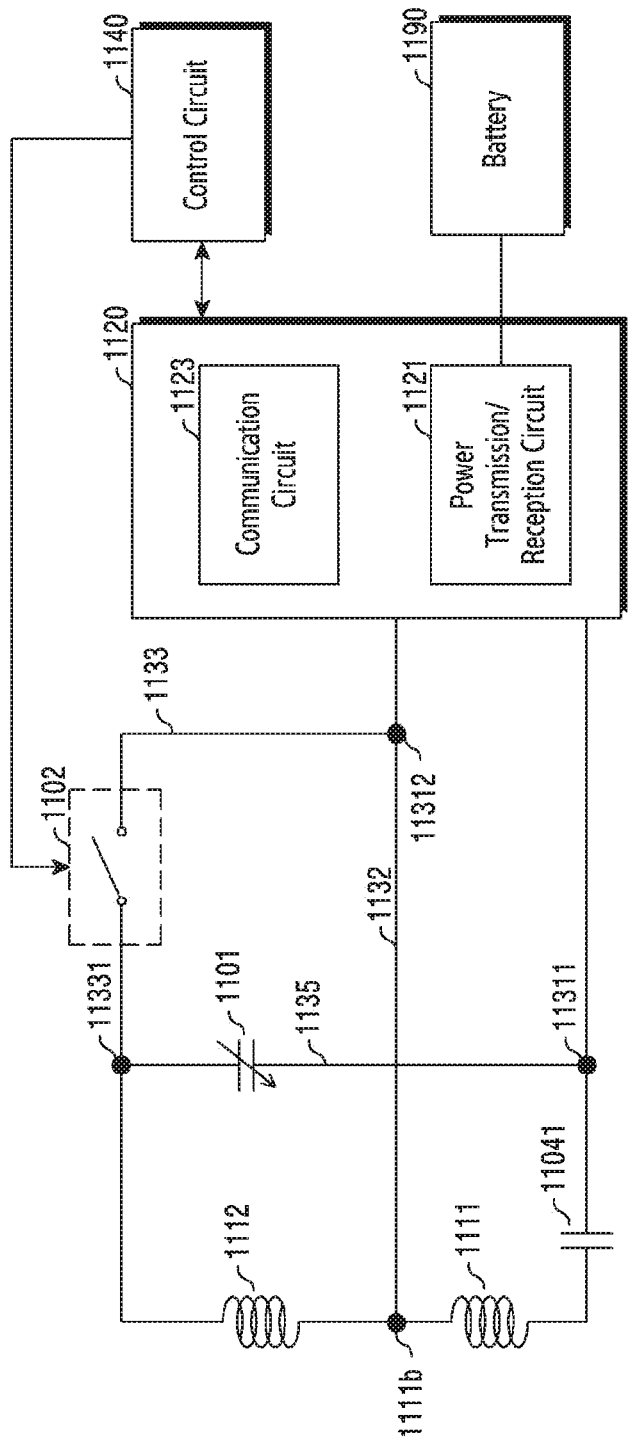
Figure 12C:
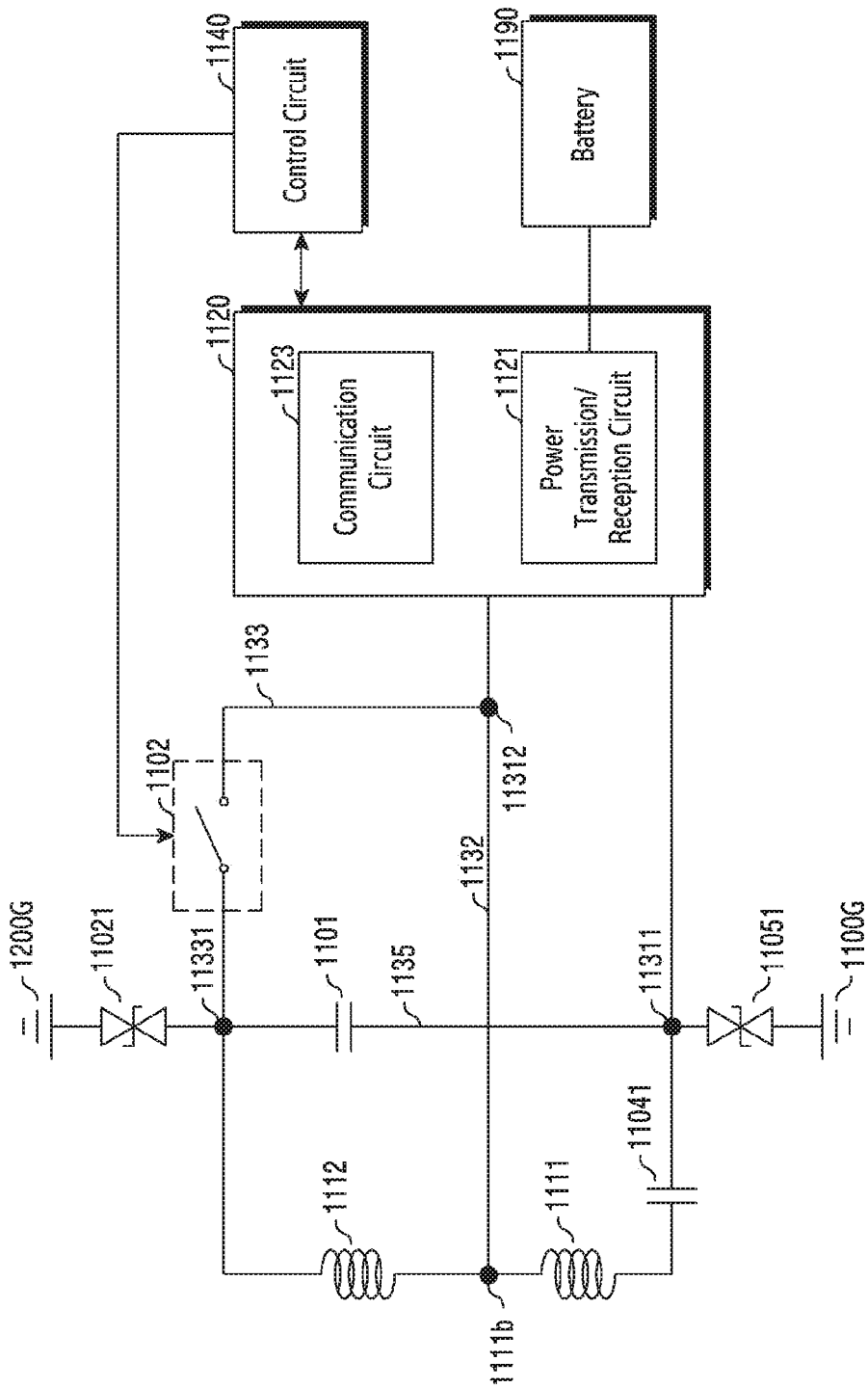

FIG. 11 is a block diagram illustrating an electronic device according to an embodiment of the present disclosure. FIGS. 12A to 12C are circuit diagrams of the electronic device of FIG. 9, according to various embodiments. An electronic device 1200 may include all or part of, for example, the electronic device 101 of FIG. 1, the electronic device 201 of FIG. 2, the electronic device 400 of FIGS. 4A and 4B, the electronic device 500 of FIG. 5, or the electronic device 600 of FIG. 6.

Referring to FIGS. 11 to 12C, the electronic device 1100 may include a first antenna 1111, a second antenna 1112, an electromagnetic field circuit 1120, a connection circuit 1130, and a control circuit 1140.

According to an embodiment, the first antenna 1111 may be a radiator for supporting a power transmission/reception circuit 1121. The first antenna 1111 may be any of various types of radiators. For example, the first antenna 1111 may include a conductive line extending from a first end 1111a to a second end 1111b and including a wound portion between the first end 1111a and the second end 1111b. According to various embodiments, the first antenna 1111 may include the first antenna 710 of FIG. 7. The second antenna 1112 may be any of various types of radiators. For example, the second antenna 1112 may include a conductive line extending from a first end 1112a to a second end 1112b and including a wound portion between the first end 1112a and the second end 1112b.

According to an embodiment, the first end 1112a of the second antenna 1112 may be a point 1111c on the conductive line of the first antenna 1111 (e.g., the portion 714 on the $(1-1)^{th}$ extension line 7111 in FIG. 7). According to various embodiments, the second antenna 1112 may include the second antenna 720 of FIG. 7.

According to an embodiment, the first antenna 1111 and/or the second antenna 1112 may be disposed within a housing (not illustrated) that forms the appearance of the electronic device 1100, or may form the outside of one face of the housing. For example, the housing may include a first face (e.g., the first face 4001 in FIG. 4A) that forms the front face of the electronic device 1100 and a second face (e.g., the second face 4002 in FIG. 4B) that forms the rear face of the electronic device 1100. The electronic device 1100 may include a display (not illustrated), which may be exposed through at least a portion of the first face, which is light-transmissive. The first antenna 911 and the second antenna 912 may be disposed on the second face, or may form a portion of the second face.

The electromagnetic field circuit 1120 may include a power transmission/reception circuit 1121 and a communication circuit 1123. According to an embodiment, the power transmission/reception circuit 1121 may wirelessly receive power from an external device or may wirelessly transmit power to an external device using the first antenna 1111. For example, the power transmission/reception circuit 1121 is capable of wirelessly receiving power from an external device using the first antenna 1111 so as to charge the battery 1190 of the electronic device 1100.

According to various embodiments, the power transmission/reception circuit 921 may be an electromagnetic-induction-type or electromagnetic-resonance-type power transmission/reception circuit.

According to an embodiment, the communication circuit 1123 may implement various types of communication using the first antenna 1111 and the second antenna 1112. For example, the communication circuit 1123 may implement short-range communication (e.g., NFC or MST) using the first antenna 1111 and the second antenna 1112.

The connection circuit 1130 may connect the first antenna 1111 and the electromagnetic field circuit 1120. According to an embodiment, the connection circuit 1130 may include a first line 1131 that connects the first end 1111a of the first antenna 1111 and the electromagnetic field circuit 1120. According to various embodiments, the connection circuit 1130 may include a second line 1132 that connects the second end 1111b of the first antenna 1111 and the electromagnetic field circuit 1120. For example, the wireless power transmission/reception system of the electronic device 1100 may include a first electric path in which the power transmission/reception circuit 1121, the first line 1131, the first antenna 1111, and the second line 1132 are connected.

The connection circuit 1130 may connect the second antenna 1112 and the electromagnetic field circuit 1120. According to an embodiment, the connection circuit 1130 may include a third line 1133 that connects the second end 1112b of the second antenna 1112 and the electromagnetic field circuit 1120. For example, one end of the third line 1133 may be electrically connected to the second end 1112b of the second antenna 1112, and the other end of the third line 1133 may be electrically connected to a point 11321 on the second line 1132.

According to an embodiment, the electronic device 1100 may include a fourth line 1134 that connects the first antenna 1111 and the second antenna 1112. For example, one end of the fourth line 1134 may be electrically connected to a point 1111c on the conductive line of the first antenna 1111 (e.g., the portion 714 on the $(1-1)^{th}$ extension line 7111 in FIG. 7), and the other end of the fourth line 1134 may be electrically connected to the first end 1112a of the second antenna 1112. According to various embodiments, the fourth line 1134 may include the electrical connection portion between the first antenna 710 and the second antenna 720 of FIG. 7. According to an embodiment, a communication system of the electronic device 1100 (e.g., a short-range communication system) may include a second electric path in which the communication circuit 1123, the first line 1131, the first antenna 1111, the second antenna 1112, and the third line 1133 are connected.

According to an embodiment, the connection circuit 1130 may include a fifth line 1135 connected to the second electric path. For example, one end of the fifth line 1135 may be electrically connected to a point 11311 on the first line 1131, and the other end of the fifth line 1135 may be electrically connected to a point 11331 on the third line 1133.

According to an embodiment, the connection circuit 1130 may include various types of first connection circuits 1101 (or first isolation circuits) connected to the fifth line 1135. The first connection circuit 1101 may electrically or magnetically isolate the communication system from the wireless power transmission/reception system so as to prevent power from leaking from the wireless power transmission/reception system to the communication system. A communication system may include the first antenna 1111, the second antenna 1112, and the communication circuit 1123. A wireless power transmission/reception system supports electromagnetic-induction-type wireless power transmission/reception, and may include the first antenna 1111 and the power transmission/reception circuit 1121. According to various embodiments, a wireless power transmission/reception system supports electromagnetic-resonance-type wireless power transmission/reception, and may include the third antenna (not illustrated) and the power transmission/reception circuit 1121 of the electronic device 1100.

For example, the power transmission/reception circuit 1121 (e.g., the electromagnetic-resonance-type wireless power transmission/reception circuit) is capable of wirelessly receiving power from an external device or capable of wirelessly transmitting power to an external device using a third antenna (not illustrated) (e.g., the third antenna 730 in FIG. 7). When power is wirelessly received from an external device, an electromagnetic field generated by the antenna of the external device may be applied not only to the third antenna, but also to the first antenna 1111 and the second antenna 1112, which are located adjacent to the third antenna. The electromagnetic field generated by the antenna of the external device may have an electromagnetic characteristic (e.g., an SRF) capable of resonating at least a portion of the first antenna 1111 and the second antenna 1112. According to various embodiments, a wireless power transmission/reception system including the third antenna and the power transmission/reception circuit 1121 may have an electromagnetic characteristic capable of resonating at least a portion of the first antenna 1111 and the second antenna 1112. According to an embodiment, this electromagnetic characteristic may be harmonics of the resonance frequency for wireless power transmission/reception between the wireless power transmission/reception system and the antenna of an external device. Due to this, when power is wirelessly received from an external device, some of the power from the external device may leak to the first antenna 1111 and the second antenna 1112. Similarly, when power is wirelessly transmitted to an external device using the third antenna, some of the power may leak to the communication circuit 1123 by electromagnetic coupling between the wireless power transmission/reception system (e.g., the third antenna) and at least a portion of the first antenna 1111 and the second antenna 1112. This leakage power may degrade the efficiency of wireless power reception or transmission by the electronic device 1100. According to various embodiments, the leakage power may damage the communication circuit 1123 of the electromagnetic field circuit 1120. According to an embodiment, the first connection circuit 1101 is capable of preventing power from leaking to the communication circuit 1123 when the power transmission/reception circuit 1121 wirelessly receives the power from an external device or wirelessly transmits the power to an external device.

According to various embodiments, the first connection circuit 1101 may include at least one passive element or active element.

According to an embodiment, referring to FIGS. 12A to 12C, the first connection circuit 1101 may include at least one capacitor. For example, the electronic device 1100 may include a third antenna (not illustrated) for wirelessly receiving or transmitting power in an electromagnetic resonance manner. The first connection circuit 1101 is capable of preventing power from leaking from the wireless power transmission/reception system to the communication system when power is wirelessly transmitted/received by adjusting the electromagnetic characteristics (e.g., SRF) between the wireless power transmission/reception system and the communication system. For example, the first connection circuit 1101 is capable of adjusting the electromagnetic characteristics such that resonance at at least one frequency between the wireless power transmission/reception system and at least a portion (e.g., the first antenna 1111 and the second antenna 1112) of the communication system does not occur. A wireless power transmission/reception system may include the third antenna and the power transmission/reception circuit 1121. A communication system may include the first antenna 1111, the second antenna 1112, and the communication circuit 1123.

According to another embodiment, referring to FIG. 12B, the first connection circuit 1101 may include at least one variable capacitor. For example, when the power transmission/reception circuit 1121 wirelessly receives power from an external device or wirelessly transmits power to an external device via the third antenna (not illustrated), the control circuit 1140 may detect power leaking from the wireless power transmission/reception system and may adjust the variable capacitor of the first connection circuit 1101 according to the detected leakage power.

According to an embodiment, the connection circuit 1130 may further include various types of second connection circuits 1102 (or second isolation circuits) connected to the third line 1133. The second connection circuit 1102 may be mounted on a line between a point 11331 on the third line 1133 and a point 11321 on the second line 1132. According to an embodiment, the second connection circuit 1102 may electrically or magnetically isolate the communication system from the wireless power transmission/reception system so as to prevent power from leaking from the wireless power transmission/reception system to the communication system.

For example, the power transmission/reception circuit 1121 (e.g., the electromagnetic-induction-type wireless power transmission/reception circuit) is capable of wirelessly receiving power from an external device using the first antenna 1111. According to an embodiment, the second antenna 1112 may be electrically connected to the first antenna 1111, and some of the power received from an external device may leak to the communication circuit 1123. This leakage power may damage the communication circuit 1123 of the electromagnetic field circuit 1120. According to an embodiment, when the power transmission/reception circuit 1121 wirelessly receives power from an external device or wirelessly transmits power to an external device, the second connection circuit 1102 is capable of preventing the communication circuit 1123 from being damaged by blocking the flow of the leakage current into the communication circuit 1123.

According to various embodiments, even when the power transmission/reception circuit 1121 wirelessly receives or transmits power using a third antenna of the electronic device 1100 (not illustrated), the second connection circuit 1102 is capable of preventing the communication circuit 1123 from being damaged by blocking the flow of the leakage current into the communication circuit 1123.

According to various embodiments, the second connection circuit 1102 may include at least one passive element or active element.

According to an embodiment, referring to FIGS. 12A to 12C, the second connection circuit 1102 may include a switch. For example, when the power transmission/reception circuit 1121 wirelessly receives power from an external device or wirelessly transmits power to an external device, the control circuit 1140 may turn off the switch, so that power can be prevented from leaking to the communication circuit 1123.

According to various embodiments, the second connection circuit 1102 may further include various types of high-voltage elements. For example, the second connection circuit 1102 may include at least one capacitor, diode, switch (e.g., a MOSFET or an AC isolation switch), or the like. For example, referring to FIG. 12C, the second connection circuit 1102 may further include a TVS diode 11021. The TVS diode 11021 may be connected to an electric path between the third line 1133 and a ground member (e.g., a ground of a PCB) 1100G.

According to an embodiment, the first connection circuit 1101 reduces the amount of power transmitted to the second connection circuit 1102 (e.g., the TVS diode), so that the amount of leakage power that needs to be blocked by the second connection circuit 1102 can be reduced. Thereby, it is possible to secure the performance of the second connection circuit 1102 (e.g., the TVS diode). Thereby, according to various embodiments, the risk of the second connection circuit 1102 being damaged by leakage power can be reduced. According to various embodiments, when the first connection circuit 901 is applied, the second connection circuit 902 may be designed such that an element of a first specification and cost can be replaced by an element of a second specification and cost lower than the first specification and cost.

According to various embodiments, the electronic device 1100 may further include a third connection circuit 1103 mounted on a line between the second end 1112b of the second antenna 1112 and a point 11331 on the third line 1133. According to various embodiments, the electronic device 1100 may further include a fourth connection circuit 1104 or a fifth connection circuit 1105 mounted on the lines 1131 and 1132 between the first antenna 1111 and the electromagnetic field circuit 1120. For example, the fourth connection circuit 1104 may be connected to a line between the first end 1111a of the first antenna 1111 and the point 11311 on the first line 1131. According to various embodiments, the fifth connection circuit 1105 may be mounted on a line between the second end 1111b of the first antenna 1111 and the point 11321 on the second line 1132. According to various embodiments, the fourth connection circuit 1104 or the fifth connection circuit 1105 may be a substantially parallel-type circuit that connects a point on the first line 1131 and a point on the second line 1132.

According to various embodiments, at least a portion of the third connection circuit 1103, the fourth connection circuit 1104, or the fifth connection circuit 1105 may include a circuit for adjusting an electromagnetic characteristic (e.g., frequency matching) of a system (e.g., a wireless power transmission/reception system) including the first antenna 1111 and the power transmission/reception circuit 1121. According to various embodiments, at least a portion of the third connection circuit 1103, the fourth connection circuit 1104, or the fifth connection circuit 1105 may include a circuit for adjusting an electromagnetic characteristic (e.g., frequency matching) of a system (e.g., a short-range communication system) including the first antenna 1111, the second antenna 1112, and the communication circuit 1123. For example, the third connection circuit 1103, the fourth connection circuit 1104, or the fifth connection circuit 1105 may include at least one passive element or active element. According to various embodiments, the third connection circuit 1103, the fourth connection circuit 1104, or the fifth connection circuit 1105 may include various types of components such as a capacitor and a diode. For example, referring to FIGS. 12A to 12C, the fourth connection circuit 1104 may include a capacitor 11041 connected to the first line 1131.

According to another embodiment, the fourth connection circuit 1104 or the fifth connection circuit 1105 may further include various types of high-voltage elements. For example, referring to FIG. 12C, the fourth connection circuit 1104 or the fifth connection circuit 1105 may include a TVS diode 11051. The TVS diode 11051 may be connected to an electric path that connects the first line 1131 and a ground member (e.g., a ground of a PCB) 1100G. When the power transmission/reception circuit 1121 wirelessly receives power from an external device or wirelessly transmits power to an external device, the TVS diode 11051 is capable of blocking leakage of power to the communication circuit 1123.

The control circuit 1140 (e.g., the processor 120 in FIG. 1 or the processor 210 in FIG. 2) may be electrically connected to the electromagnetic field circuit 1120. According to various embodiments, the control circuit 1140 may be similar to or the same as the control circuit 640 of FIG. 6 or the control circuit 940 of FIG. 9, and a detailed description thereof will thus be omitted.

Figure 13:
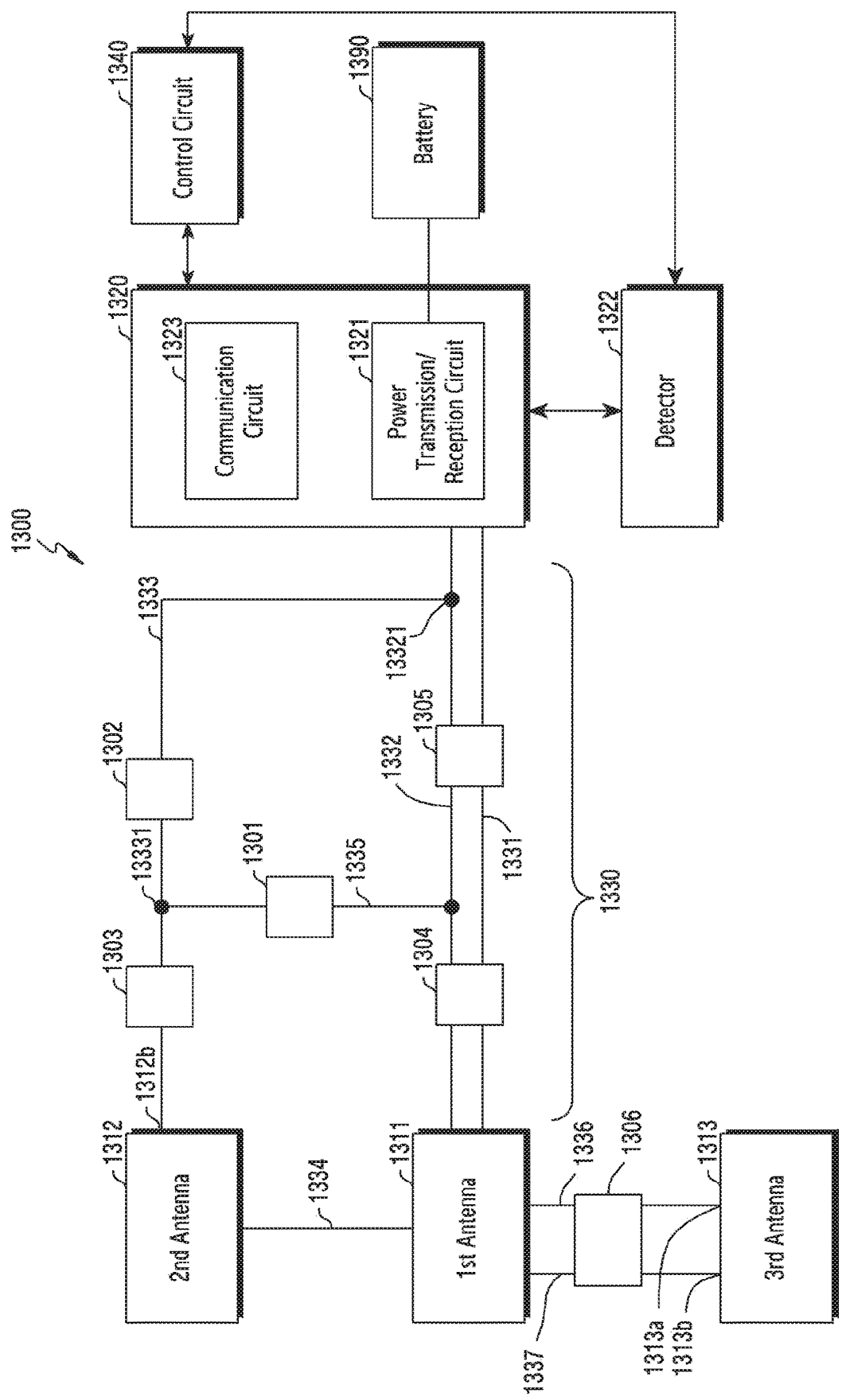
FIG. 13 is a block diagram illustrating an electronic device according to an embodiment of the present disclosure.
Figure 14A:
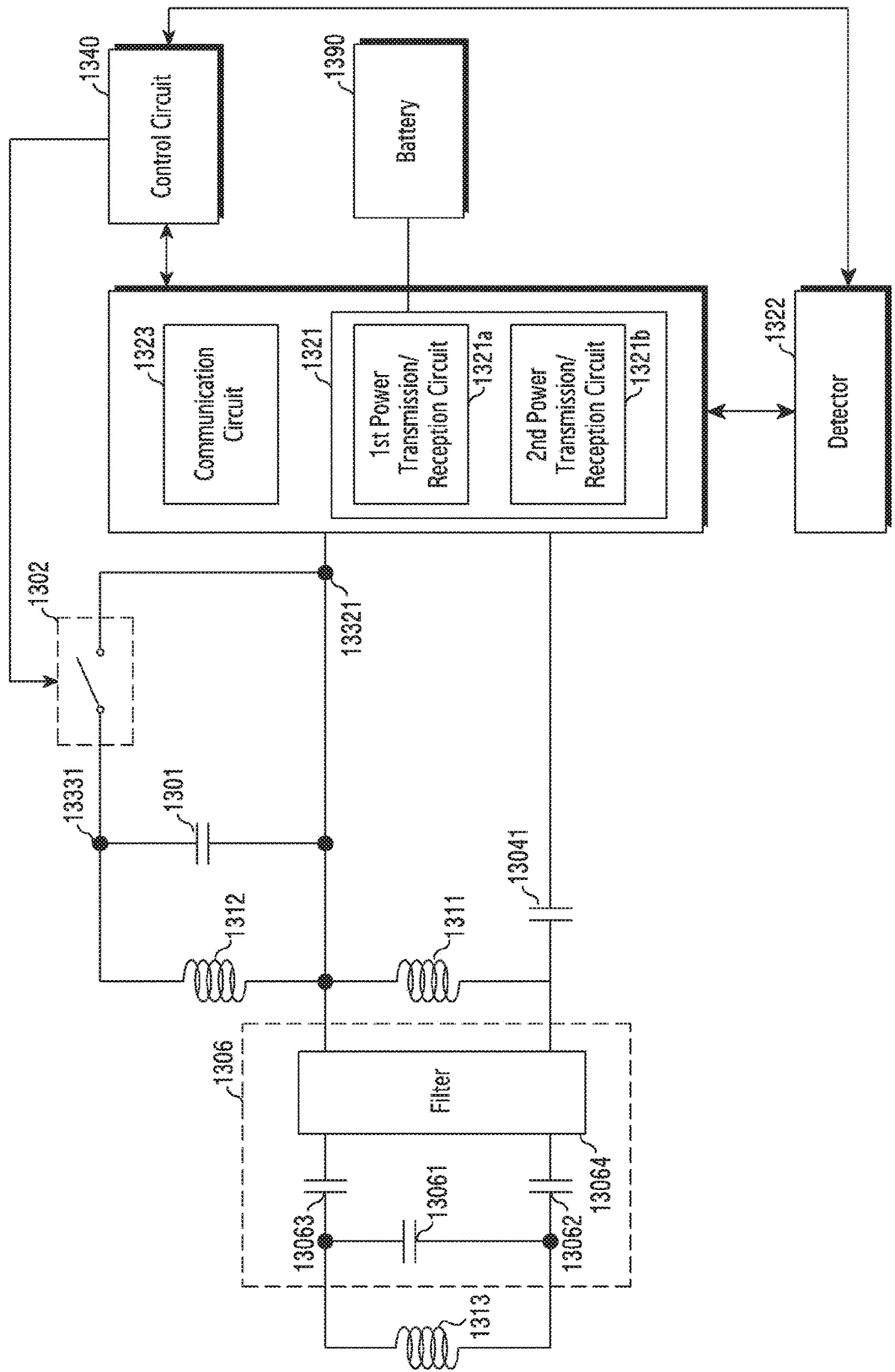
FIGS. 14A and 14B are circuit diagrams of the electronic device of FIG. 13, according to an embodiment of the present disclosure.
Figure 14B:
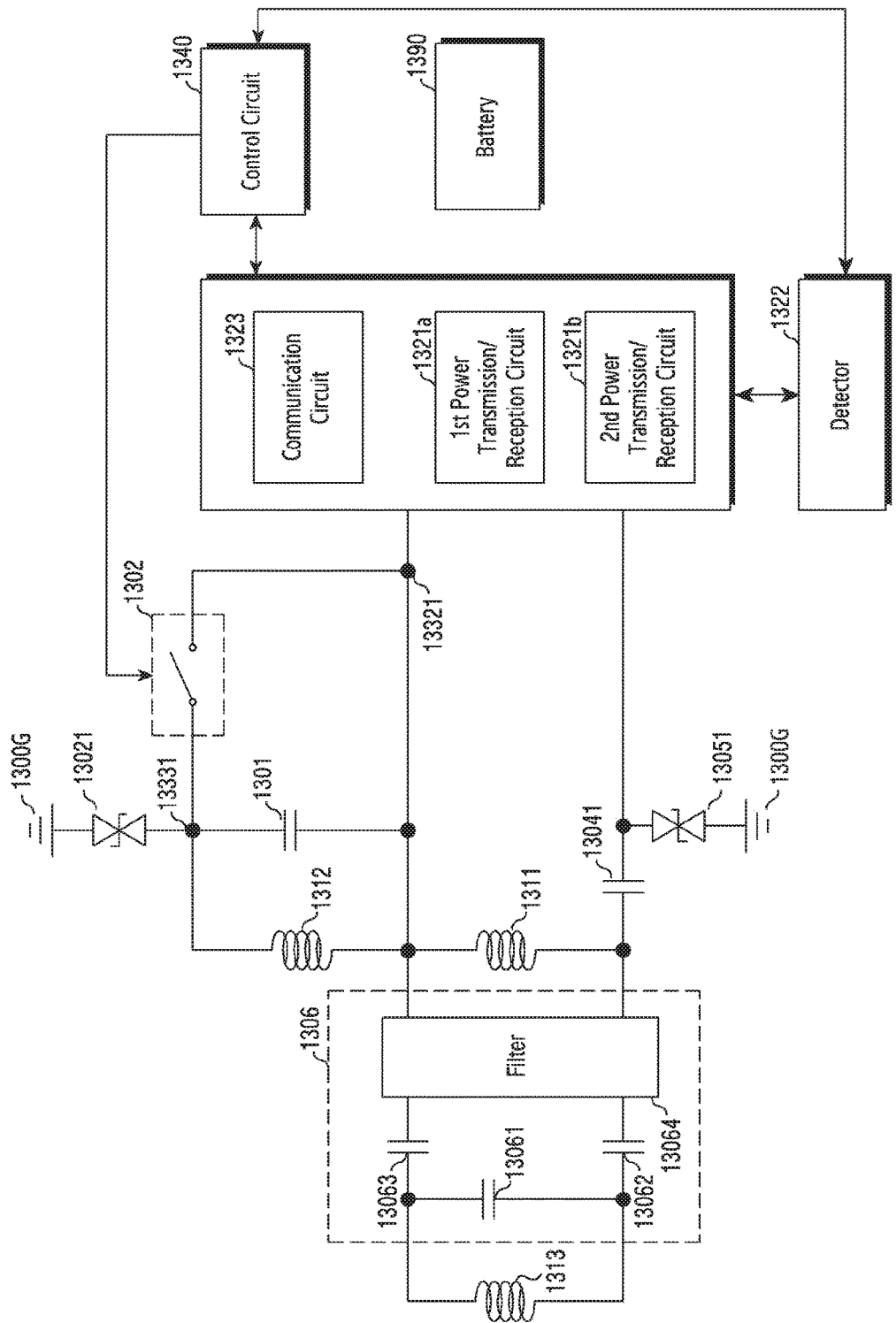
Figure 15:
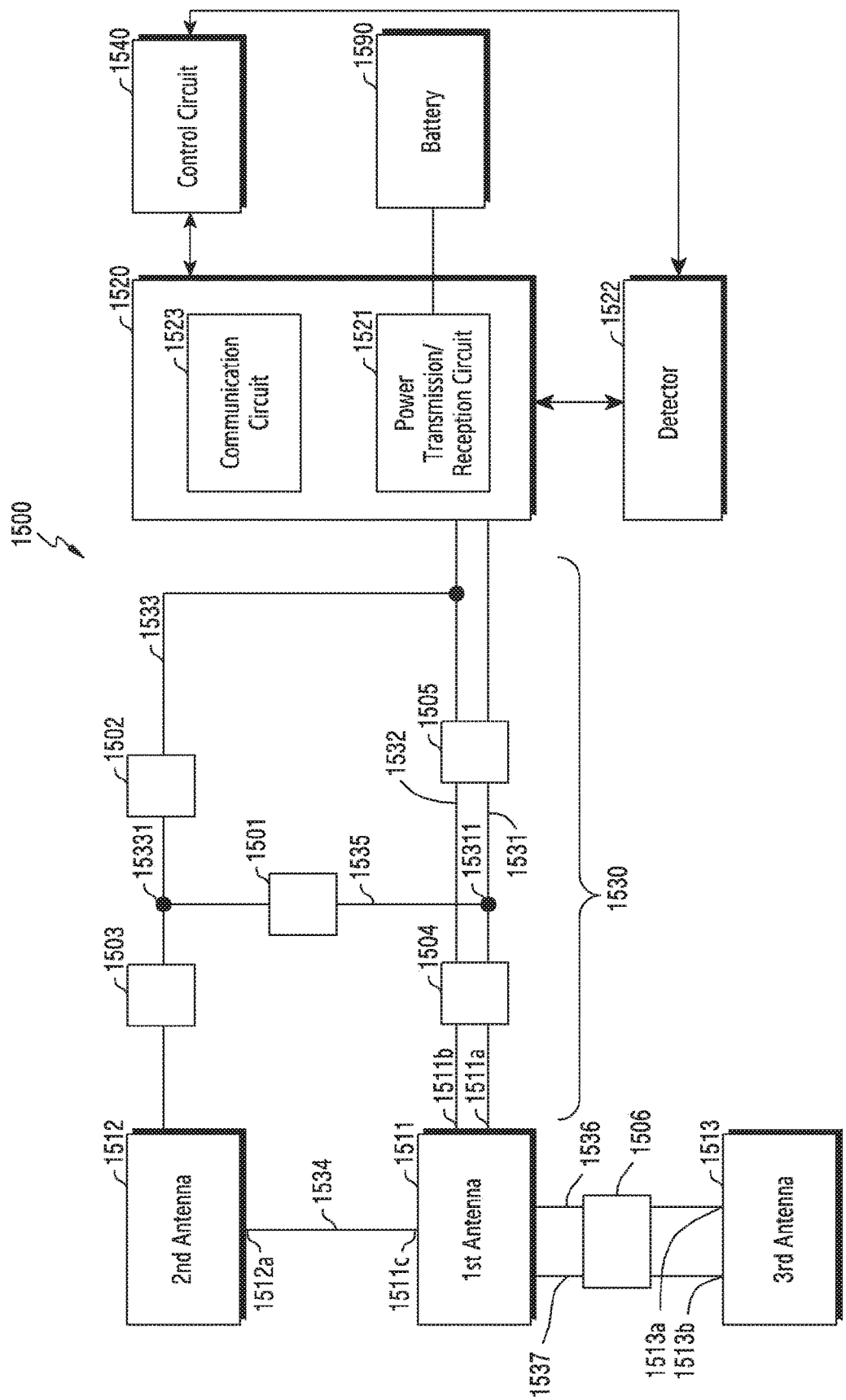
FIG. 15 is a block diagram illustrating an electronic device according to an embodiment of the present disclosure.
Figure 16A:
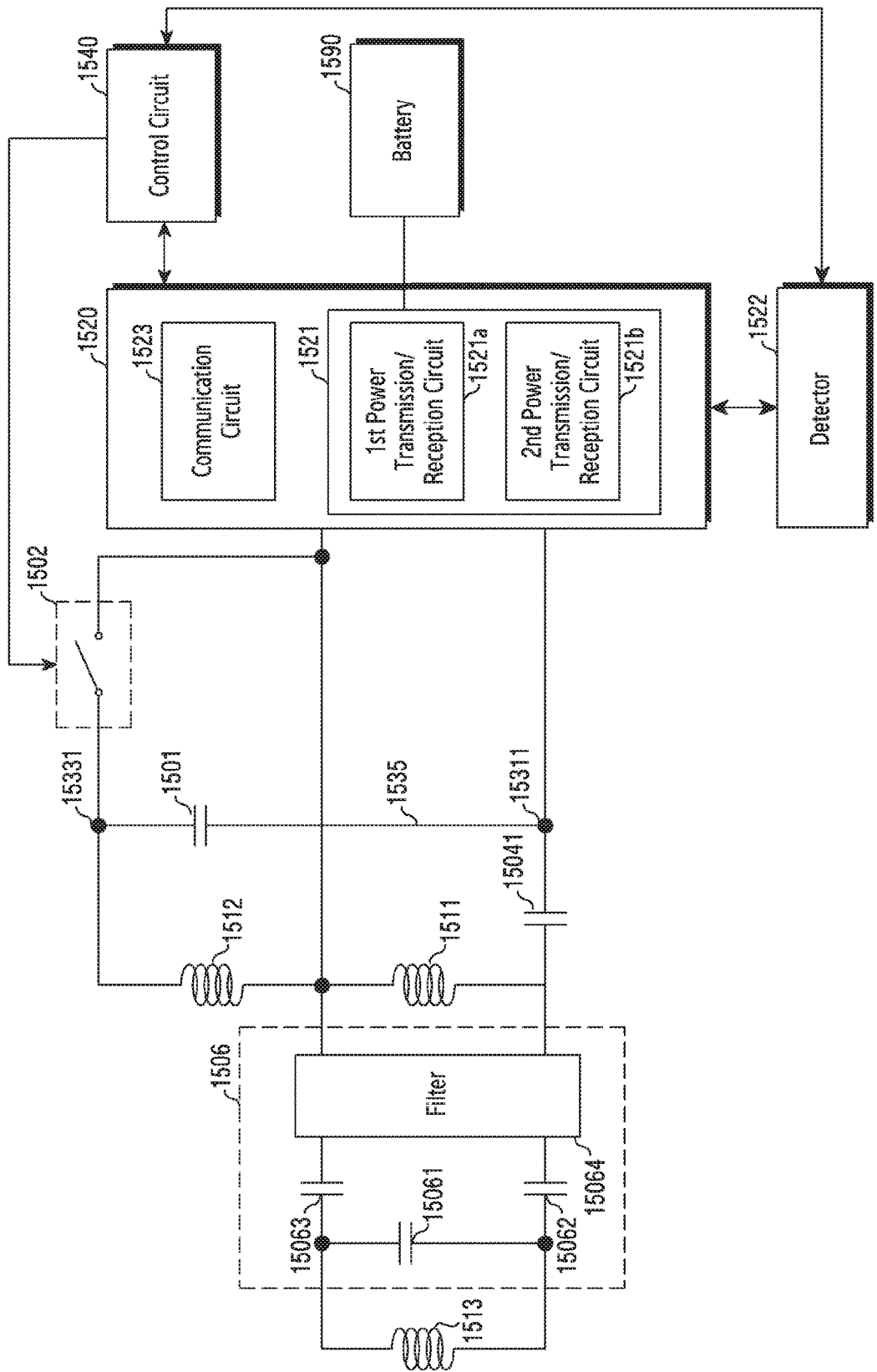
FIGS. 16A and 16B are circuit diagrams of the electronic device of FIG. 15, according to an embodiment.
Figure 16B:
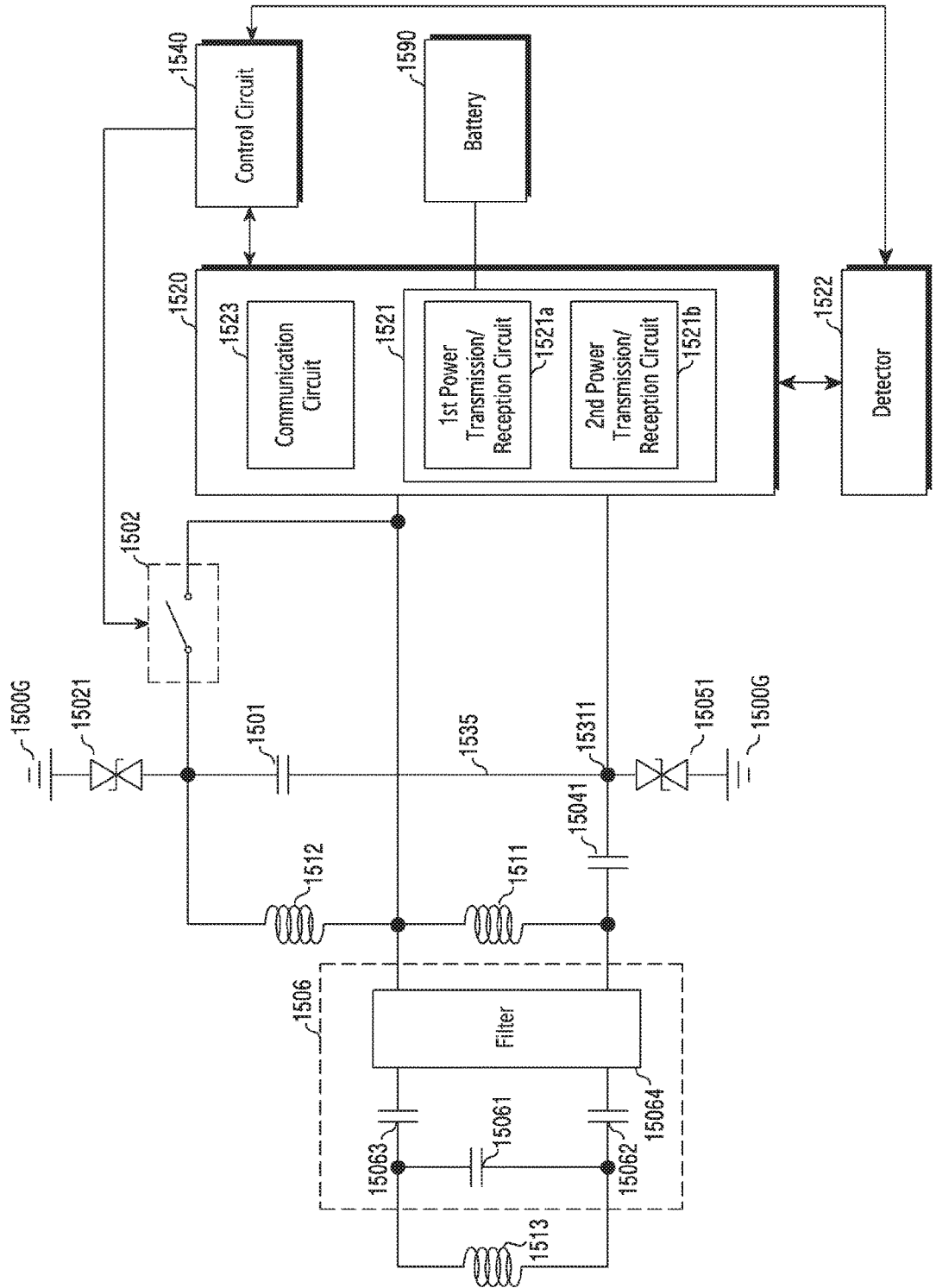
Figure 17:
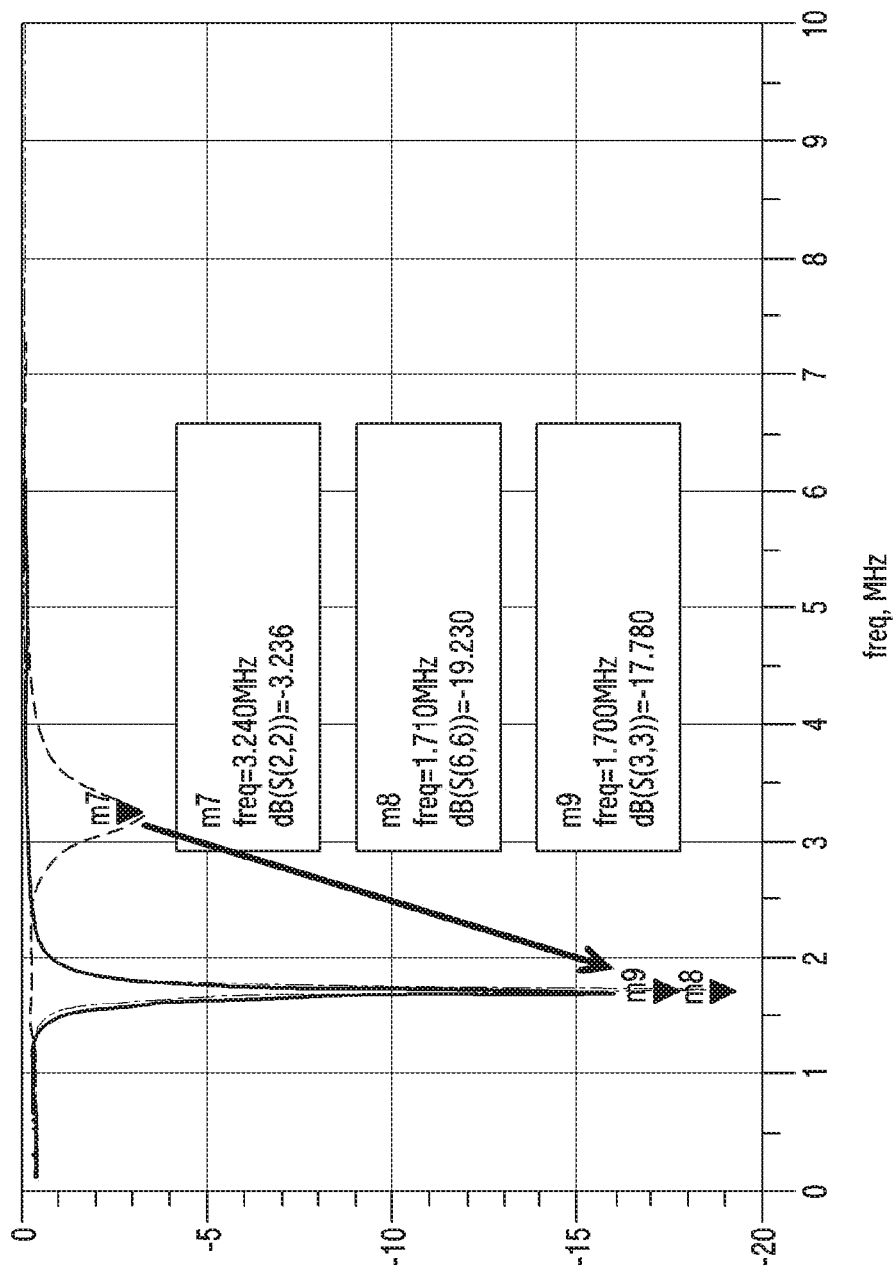
FIG. 17 is a graph showing electromagnetic characteristics before and after providing a first connection circuit in an electronic device according to an embodiment of the present disclosure.

FIG. 13 is a block diagram illustrating an electronic device according to an embodiment of the present disclosure, FIGS. 14A and 14B are circuit diagrams of the electronic device of FIG. 13 according to an embodiment of the present disclosure, FIG. 15 is a block diagram illustrating an electronic device according to an embodiment of the present disclosure, FIGS. 16A and 16B are circuit diagrams of the electronic device of FIG. 15, according to an embodiment, and FIG. 17 is a graph showing electromagnetic characteristics before and after providing a first connection circuit in an electronic device according to an embodiment of the present disclosure.

According to various embodiments, an electronic device (e.g., the electronic device 1300 in FIG. 13 or the electronic device 1500 in FIG. 15) may include all or part of, for example, the electronic device 101 of FIG. 1, the electronic device 201 of FIG. 2, the electronic device 400 of FIGS. 4A and 4B, the electronic device 500 of FIG. 5, or the electronic device 600 of FIG. 6.

Referring to FIGS. 13 to 14B, the electronic device 1300 may include a first antenna 1311, a second antenna 1312, an electromagnetic field circuit 1320, a connection circuit 1330, and a control circuit 1340. According to various embodiments, a first antenna 1311, a second antenna 1312, an electromagnetic field circuit 1320, a connection circuit 1330, a control circuit 1340, and a battery 1390 are similar to the first antenna 911, the second antenna 912, the electromagnetic field circuit 920, the connection circuit 930, the control circuit 940, and the battery 990 of FIG. 9, respectively, and detailed descriptions thereof will thus be omitted. For example, the electronic device 1300 may include a first line 1331, a second line 1332, a third line 1333, a fourth line 1334, or a fifth line 1335. According to various embodiments, the electronic device 1300 may include a first connection circuit 1301, a second connection circuit 1302, a third connection circuit 1303, a fourth connection circuit 1304, or a fifth connection circuit 1305.

According to an embodiment, the electronic device 1300 may further include a third antenna 1313. The third antenna 1313 may be a radiator for supporting a power transmission/reception circuit 1321. The third antenna 1313 may be any of various types of radiators. For example, referring to FIGS. 14A and 14B, the third antenna 1313 may include a conductive line extending from a first end 1313*a* thereof to a second end 1313*b* thereof and including a wound portion between the first end 1313*a* and the second end 1313*b*. According to various embodiments, the third antenna 1313 may include the third antenna 730 of FIG. 7.

According to an embodiment, the first antenna 1311, the second antenna 1312, or the third antenna 1313 may be disposed within a housing (not illustrated) that forms the appearance of the electronic device 1300, or may form the outside of one face of the housing. For example, the housing may include a first face (e.g., the first face 4001 in FIG. 4A) that forms the front face of the electronic device 1300 and a second face (e.g., the second face 4002 in FIG. 4B) that forms the rear face of the electronic device 1300. The electronic device 1300 may include a display (not illustrated) (e.g., the display 411 in FIG. 4A or the display 520 in FIG. 5), which may be exposed through at least a portion of the first face, which is light-transmissive. The first antenna 1311, the second antenna 1312, and the third antenna 1313 may be disposed on the second face, or may form a portion of the second face.

According to an embodiment, referring to FIGS. 14A and 14B, the electromagnetic field circuit 1320 may include a first power transmission/reception circuit 1321*a*, a second power transmission/reception circuit 1321*b*, and a communication circuit 1323. The first power transmission/reception circuit 1321*a* may wirelessly receive power from an external device or may wirelessly transmit power to an external device using the first antenna 1311. For example, the first power transmission/reception circuit 1321*a* may include an electromagnetic-induction-type wireless power transmission/reception circuit. The second power transmission/reception circuit 1321*b* may wirelessly receive power from an external device or may wirelessly transmit power to an external device using the third antenna 1313. The second power transmission/reception circuit 1321*b* may include an electromagnetic-resonance-type wireless power transmission/reception circuit. The communication circuit 1323 may implement various types of communication using the first antenna 1311 and the second antenna 1312. For example, the communication circuit 1323 may implement short-range communication (e.g., NFC or MST) using the first antenna 1311 and the second antenna 1312.

According to an embodiment, a short-range communication system 1323 may include a first electric path in which the communication circuit 1323, the first line 1331, the first antenna 1311, the second antenna 1312, and the third line 1333 are connected.

According to an embodiment, an electromagnetic-induction-type wireless power transmission/reception system may include a second electric path in which the second power transmission/reception circuit 1321*b*, the first line 1331, the first antenna 1311, and the second line 1312 are connected.

According to an embodiment, the connection circuit 1330 may further include a sixth line 1336 that connects the first end 1313*a* of the third antenna 1313 and the first antenna 1311. According to various embodiments, the connection circuit 1330 may further include a seventh line 1337 that connects the second end 1313*b* of the third antenna 1313 and the first antenna 1311. For example, an electromagnetic-resonance-type wireless power transmission/reception system may include a third electric path in which the second power transmission/reception circuit 1321*b*, the first line 1331, the sixth line 1336, the sixth antenna 1336, the third antenna 1313, the seventh line 1337, and the second line 1332 are connected.

According to various embodiments, the connection circuit 1330 may include various types of first connection circuits 1301 (e.g., a first isolation circuit) connected to the fifth line 1335. The first connection circuit 1301 may electrically or magnetically isolate the communication system from the wireless power transmission/reception system so as to prevent power from leaking from the electromagnetic-induction-type or electromagnetic-resonance-type wireless power transmission/reception system to the communication system.

For example, the second power transmission/reception circuit 1321*b* may wirelessly receive power from an external device or may wirelessly transmit power to an external device using the third antenna 1313. When power is wirelessly received from an external device, an electromagnetic field generated by the antenna of the external device may be applied not only to the third antenna 1313, but also to the first antenna 1311 and the second antenna 1312, which are located adjacent to the third antenna 1313. The electromagnetic field generated by the antenna of the external device may have an electromagnetic characteristic (e.g., an SRF) capable of resonating at least a portion of the first antenna 1311 and the second antenna 1312. According to various embodiments, a wireless power transmission/reception system including the third antenna 1313 and the power transmission/reception circuit 1321 may have an electromagnetic characteristic capable of resonating at least a portion of the first antenna 1311 and the second antenna 1312. According to an embodiment, this electromagnetic characteristic may be harmonics of the resonance frequency for wireless power transmission/reception between the wireless power transmission/reception system and the antenna of an external device. Due to this, when power is wirelessly received from an external device, some of the power from the external device may leak to the communication circuit 1323. Similarly, when power is wirelessly transmitted to an external device using the third antenna 1313, some of the power may leak to the communication circuit 1323 by electromagnetic coupling between the wireless power transmission/reception system and at least a portion of the first antenna 1311 and the second antenna 1312. This leakage power may degrade the efficiency of wireless power reception or transmission by the electronic device 1300. According to various embodiments, the leakage power may damage the communication circuit 1323 of the electromagnetic field circuit 1320. According to an embodiment, the first connection circuit 1301 is capable of preventing power from leaking to the communication circuit 1323 when the power transmission/reception circuit 1321 wirelessly receives the power from an external device or wirelessly transmits the power to an external device.

According to various embodiments, the first connection circuit 1301 may include at least one passive element or active element.

According to an embodiment, referring to FIGS. 14A and 14B, the first connection circuit 1301 may include at least one capacitor. The first connection circuit 1301 is capable of preventing power from leaking from the wireless power transmission/reception system to the communication system when power is wirelessly transmitted/received by adjusting an electromagnetic characteristic between the wireless power transmission/reception system and the communication system. For example, the first connection circuit 1301 is capable of adjusting the electromagnetic characteristic such that resonance at at least one frequency between the wireless power transmission/reception system and at least a portion of the communication system does not occur. The wireless power transmission/reception system may be an electromagnetic-resonance-type wireless power transmission/reception system that includes the third antenna 1313 and the second power transmission/reception circuit 1321b.

For example, referring to FIG. 17, an electromagnetic-resonance-type wireless power system may have a resonance frequency of about 3.24 MHz before the first connection circuit 1301 is installed. The resonance frequency of 3.24 MHz may correspond to harmonics of a resonance frequency of 6.78 MHz required for the electromagnetic-resonance-type wireless power system and an external device to wirelessly transmit and receive power. A communication system (e.g., a short-range communication system) that includes the first antenna 1311, the second antenna 1312, and the communication circuit 1323 may have a resonance frequency of 3.24 MHz. When power is wirelessly received from an external device or wirelessly transmitted to an external device via the third antenna 1313 before the first connection circuit 1301 is installed, the communication system may resonate at a frequency of 3.24 MHz, and thus some of the power may leak to the communication system. According to an embodiment, when the first connection circuit 1301 is installed, it is possible to shift the resonance frequency of 3.24 MHz of the magnetic-resonance-type wireless power transmission/reception system to a resonance frequency of about 1.7 MHz. The first connection circuit 1301 may change the resonance frequency of 3.24 MHz of the magnetic-resonance-type wireless power transmission/reception system to the resonance frequency of 1.7 MHz, which may cause power leakage through the first antenna and the second antenna to be reduced when power is wirelessly received or transmitted using the third antenna 1313.

According to another embodiment, although not illustrated, the first connection circuit 1301 may include at least one variable capacitor. The variable capacitor of the first connection circuit 1301 is similar to the variable capacitor 901 of FIG. 10B, and a detailed description thereof will thus be omitted.

According to an embodiment, the connection circuit 1330 may include various types of second connection circuits 1302 mounted on the third line 1333. The second connection circuit 1302 may be connected to a line between a point 13331 on the third line 1333 and a point 13321 on the second line 1332. According to an embodiment, the second connection circuit 1302 may electrically or magnetically isolate the communication system from the wireless power transmission/reception system so as to prevent power from leaking from the wireless power transmission/reception system to the communication system.

For example, the power transmission/reception circuit 1321 (e.g., the first wireless power transmission/reception circuit 1321a of an electromagnetic-induction type) is capable of wirelessly receiving power from an external device using the first antenna 1311. According to an embodiment, the second antenna 1312 is electrically connected to the first antenna 1311, and when power is wirelessly received from an external device via the first antenna 1311, some of the power may leak to the communication circuit 1323 via the second antenna 1312. This leakage power may damage the communication circuit 1323. According to an embodiment, when the power transmission/reception circuit 1321 wirelessly receives power from an external device or wirelessly transmits power to an external device, the second connection circuit 1302 is capable of preventing the communication circuit 1323 from being damaged by blocking the flow of the leakage current into the communication circuit 1323.

According to various embodiments, even when the power transmission/reception circuit 1321 wirelessly receives or transmits power using the third antenna 1313, the second connection circuit 1302 is capable of preventing the communication circuit 1323 from being damaged by preventing the current from leaking to the communication circuit 1323.

According to various embodiments, the second connection circuit 1302 may include at least one passive element or active element.

According to an embodiment, referring to FIGS. 12A to 12C, the second connection circuit 1302 may include a switch. For example, when the power transmission/reception circuit 1321 wirelessly receives power from an external device or wirelessly transmits power to an external device, the control circuit 1340 turns off the switch, so that power can be prevented from leaking to the communication circuit 1323.

According to various embodiments, the second connection circuit 1302 may further include various types of high-voltage elements. For example, the second connection circuit 1302 may include at least one capacitor, diode, switch (e.g., a MOSFET or an AC isolation switch), or the like. For example, referring to FIG. 14B, the second connection circuit 1302 may further include a TVS diode 13021. The TVS diode 13021 may be connected to an electric path between the third line 1333 and a ground member (e.g., a ground of a PCB) 1300G.

According to an embodiment, the first connection circuit 1301 reduces the amount of power transmitted to the second connection circuit 1302 (e.g., the TVS diode), so that the amount of leakage power that needs to be blocked by the second connection circuit 1302 can be reduced. Thereby, it is possible to secure the performance of the second connection circuit 1302 (e.g., the TVS diode). Thereby, according to various embodiments, the risk of the second connection circuit 1302 being damaged by leakage power can be reduced. According to various embodiments, when the first connection circuit 1301 is applied, the second connection circuit 1302 may be designed such that an element of a first specification and cost can be replaced by an element of a second specification and cost lower than the first specification and cost.

According to various embodiments, at least a portion of the third connection circuit 1303, the fourth connection circuit 1304, or the fifth connection circuit 1305 may include a circuit for adjusting an electromagnetic characteristic (e.g., frequency matching) of a power transmission/reception system including the first antenna 1311 and the power transmission/reception circuit 1321. According to various embodiments, at least a portion of the third connection circuit 1303, the fourth connection circuit 1304, or the fifth connection circuit 1305 may include a circuit for adjusting an electromagnetic characteristic (e.g., frequency matching) of a communication system including the first antenna 1311, the second antenna 1312, and the communication circuit 1323.

For example, the third connection circuit 1303, the fourth connection circuit 1304, or the fifth connection circuit 1305 may include at least one passive element or active element. According to various embodiments, the third connection circuit 1303, the fourth connection circuit 1304, or the fifth connection circuit 1305 may include various types of components such as a capacitor and a diode. For example, referring to FIGS. 14A and 14B, the fourth connection circuit 1304 may include a capacitor 13041 connected to the first line 1331.

According to another embodiment, the fourth connection circuit 1304 or the fifth connection circuit 1305 may further include various types of high-voltage elements. For example, referring to FIG. 14B, the fourth connection circuit 1304 or the fifth connection circuit 1305 may include a TVS diode 13051. The TVS diode 13051 may be connected to an electric path between the first line 1331 and a ground member (e.g., a ground of a PCB) 1300G. When the power transmission/reception circuit 1321 wirelessly receives power from an external device or wirelessly transmits power to an external device, the TVS diode 13051 is capable of blocking leakage of power to the communication circuit 1323.

According to various embodiments, the electronic device 1300 may further include a sixth connection circuit 1306 mounted on the lines 1336 and 1337 between the third antenna 1313 and the first antenna 1311. For example, the sixth connection circuit 1306 may include various types of circuits connected to the sixth line 1336. According to various embodiments, the sixth connection circuit 1306 may include various types of circuits connected to the seventh line 1337. According to various embodiments, the sixth connection circuit 1306 may include various types of circuits connected to an electric path between a point on the sixth line 1336 and a point on the seventh line 1337.

According to various embodiments, at least a portion of the sixth connection circuit 1306 may include a circuit for adjusting an electromagnetic characteristic (e.g., frequency matching) of a wireless power transmission/reception system including the third antenna 1313 and the second power transmission/reception circuit 1321b.

For example, referring to FIGS. 14A and 14B, the sixth connection circuit 1306 may include at least one capacitor 13061 connected to an electric path that connects a point on the sixth line 1336 and a point on the second line 1337. According to various embodiments, the sixth connection circuit 1306 may include at least one capacitor 13062 connected to the sixth line 1336. According to various embodiments, the sixth connection circuit 1306 may include at least one capacitor 13063 connected to the seventh line 1337.

According to various embodiments, referring to FIG. 14A or 14B, the sixth connection circuit 1306 may include at least one filter 13064 connected between the third antenna 1313 and the first antenna 1311. For example, the at least one filter 13064 may include an ElectroMagnetic Interference (EMI) filter.

According to an embodiment, the electronic device 1300 may further include a detector 1322. The detector 1322 may detect power, which is wirelessly received from an external device via the third antenna 1313. The detector 1322 may recognize an external device that wirelessly transmits power in an electromagnetic resonance manner using short-range communication. For example, the detector 1322 may detect an external device that wirelessly transmits power in an electromagnetic resonance manner using Bluetooth Low Energy (BLE).

The control circuit 1340 (e.g., the processor 120 in FIG. 1 or the processor 210 in FIG. 2) may be electrically connected to the electromagnetic field circuit 1320. According to various embodiments, the control circuit 1340 includes at least a portion of the control circuit 640 of FIG. 6 or the control circuit 940 of FIG. 9, and a detailed description thereof will thus be omitted.

According to one embodiment, referring to FIG. 14A or 14B, when a request for a communication mode (e.g., a short-range communication mode) is detected through an input device (e.g., the input device 250 in FIG. 2) of the electronic device 1300, the control circuit 1340 may activate the communication circuit 1323 and may turn on the switch of the second connection circuit 1302. In the communication mode, the communication circuit 1323 may transmit/receive wireless signals using the first antenna 1311 and the second antenna 1312. According to various embodiments, in the communication mode, the control circuit 1323 may deactivate the first power transmission/reception circuit 1321a or the second power transmission/reception circuit 1321b (deactivate the wireless power transmission/reception mode).

According to an embodiment, referring to FIG. 14A or 14B, when a request for deactivating the communication mode via the input device (e.g., the input device 250 in FIG. 2) of the electronic device 1300 is detected, the control circuit 1340 may deactivate the communication circuit 1323 and may turn off the switch of the second connection circuit 1302. In the state in which the communication mode is released, the power transmission/reception circuit 1321 may wirelessly receive power from an external device or may wirelessly transmit power to an external device using the first antenna 1311 or the third antenna 1313. Since the switch of the second connection circuit 1302 is in the off state, it is difficult for the leakage current to flow into the communication circuit 1323 while the power is wirelessly transmitted or received. According to various embodiments, in the state in which the communication mode is released, the first connection circuit 1301 may electrically or magnetically isolate the communication system from the wireless power transmission/reception system so as to prevent power from leaking from the wireless power transmission/reception system to the communication system.

According to an embodiment, referring to 14A or 14B, when it is detected that power is wirelessly transmitted from an external device, the control circuit 1340 may enter a wireless power transmission/reception mode (e.g., a wireless charging mode) and may activate the first transmission/reception circuit 1321a or the second power transmission/reception circuit 1321b. In the wireless power transmission/reception mode, the power transmission/reception circuit 1321 is capable of wirelessly receiving power using the first antenna 1311 or the third antenna 1313. According to various embodiments, in the wireless power transmission/reception mode, the control circuit 1340 may deactivate the communication circuit 1323 and may turn off the switch of the second connection circuit 1302. Since the switch of the second connection circuit 1302 is in the off state, it is difficult for the leakage current to flow into the communication circuit 1323 while the power is wirelessly transmitted or received. According to various embodiments, in the state in which the communication mode is released, the first connection circuit 1301 may electrically or magnetically isolate the communication system from the wireless power transmission/reception system so as to prevent power from leaking from the wireless power transmission/reception system to the communication system.

Referring to FIGS. 15 to 16B, a first antenna 1511, a second antenna 1512, a third antenna 1513, an electromagnetic field circuit 1520, a control circuit 1540, and a battery 1590 of an electronic device 1500 are similar to or the same as the antenna first antenna 1311, the second antenna 1312, the third antenna 1313, the electromagnetic field circuit 1320, the control circuit 1340, and the battery 1390, respectively, and detailed descriptions thereof will thus be omitted. According to various embodiments, a first line 1531, a second line 1532, a third line 1533, a fourth line 1534, a fifth line 1535, a sixth line 1536, and a seventh line 1537 are similar to or the same as the first line 1331, the second line 1332, the third line 1333, the fourth line 1334, the fifth line 1335, the sixth line 1336, and the seventh line 1337 of FIGS. 13 to 14B, respectively, and detailed descriptions thereof will thus be omitted. According to various embodiments, a second connection circuit 1502, a third connection circuit 1503, a fourth connection circuit 1504, a fifth connection circuit 1505, and a sixth connection circuit 1506 are similar to or the same as the second connection circuit 1302, the third connection circuit 1303, the fourth connection circuit 1304, the fifth connection circuit 1305, and the sixth connection circuit 1306 of FIGS. 13 to 14B, respectively, and detailed descriptions thereof will thus be omitted.

According to various embodiments, a first connection circuit 1501 of FIGS. 15 to 16B may be mounted on a line that connects a point 15311 on the third line 1531 and a point 15331 on the third line 1533 unlike the first connection circuit 1301 of FIGS. 13 to 14B. The first connection circuit 1501 of FIGS. 15 to 16B is capable of preventing power from leaking to the communication circuit 1521 when the power is wirelessly received from an external device or the power is wirelessly transmitted to an external device like the first connection circuit 1501 of FIGS. 13 to 14B.

Table 1 below shows the comparison of energy loss before and after the application of the first connection circuit 1301 of FIGS. 13 to 14B or the first connection circuit 1501 of FIGS. 15 to 16B in an electronic device according to an embodiment.

TABLE 1

| Classification | Electromagnetic-Resonance-Type Power Transmission/Reception System | Communication System |
|---|---|---|
| First Connection Circuit Not Applied | 2.277 | 1.203 |
| First Connection Circuit 1301 of FIG. 14A Applied | 1.554 | 1.693 |
| First Connection Circuit 1501 of FIG. 16A Applied | 1.523 | 1.215 |

(Unit: ohm)

According to an embodiment, an Equivalent Series Resistance (ESR) value for each condition of an electromagnetic-resonance type wireless power transmission/reception system was measured at a frequency of about 6.78 MHz. The ESR value for each condition of the communication system was measured at a frequency of about 200 kHz. Energy loss was measured as an ESR value.

In FIGS. 13 to 14B, the electromagnetic-resonance-type wireless power transmission/reception system may include the third antenna 1313 and the second power transmission/reception circuit 1321b. In FIGS. 13 to 14B, the communication system may include the first antenna 1311, the second antenna 1312, and the communication circuit 1323. In FIGS. 15 to 16B, the electromagnetic-resonance-type power transmission/reception system may include the third antenna 1513 and the second power transmission/reception circuit 1521b. In FIGS. 15 to 16B, the communication system may include the first antenna 1511, the second antenna 1512, and the communication circuit 1523.

Referring to Table 1, when the first connection circuit 1301 of FIGS. 13 to 14B is not applied to the electromagnetic-resonance-type power transmission/reception system and the communication system or when the first connection circuit 1501 of FIGS. 15 to 16B is not applied, the electromagnetic-resonance-type power transmission/reception system may have an ESR value of 2.277 ohms, and the communication system may have an ESR value of 1.203 ohms.

According to an embodiment, when the first connection circuit 1301 of FIGS. 13 to 14B is applied to the electromagnetic-resonance-type power transmission/reception system and the communication system, the electromagnetic-resonance-type power transmission/reception system has relatively low energy loss compared to that prior to applying the first connection circuit 1301, and is capable of having an ESR value of 1.554 ohms. According to various embodiments, when the first connection circuit 1301 of FIGS. 13 to 14B is applied to the electromagnetic-resonance-type power transmission/reception system and the communication system, the communication system has relatively large energy loss compared to that prior to applying the first connection circuit 1301, and is capable of having an ESR value of 1.693 ohms. It can be seen that when the first connection circuit 1301 is applied, the power transmission/reception efficiency of the electromagnetic-resonance-type power transmission/reception system is considerably improved. The performance of the communication system deteriorates due to the first connection circuit 1301, but may not deteriorate to such an extent that the communication system and a function using it are destabilized.

According to an embodiment, when the first connection circuit 1501 of FIGS. 15 to 16B is applied to the electromagnetic-resonance-type power transmission/reception system and the communication system, the electromagnetic-resonance-type power transmission/reception system has relatively low energy loss compared to that prior to applying the first connection circuit 1301, and is capable of having an ESR value of 1.523 ohms. According to various embodiments, when the first connection circuit 1501 of FIGS. 15 to 16B is applied to the electromagnetic-resonance-type power transmission/reception system and the communication system, the communication system has relatively large energy loss compared to that prior to applying the first connection circuit 1301, and is capable of having an ESR value of 1.215 ohms. It can be seen that when the first connection circuit 1501 is applied, the power transmission/reception efficiency of the electromagnetic-resonance-type power transmission/reception system is considerably improved. The performance of the communication system deteriorates due to the first connection circuit 1501, but may not deteriorate to such an extent that the communication system and a function using it are destabilized.

According to an embodiment of the present disclosure, an electronic device may include: at least one antenna; a first circuit configured to wirelessly receive or transmit power using at least a portion of the at least one antenna; a second circuit configured to perform at least one type of communication using at least a portion of the at least one antenna; a first electric path configured to connect the at least one antenna and the first circuit; a second electric path configured to connect the at least one antenna and the second circuit; a third electric path configured to connect a point on the first electric path and a point on the second electric path; and at least one passive element or active element connected to at least one of the first electric path, the second electric path, and the third electric path.

According to an embodiment of the present disclosure, the at least one passive element or active element may prevent a wireless power signal from flowing into the second circuit when the first circuit wirelessly receives or transmits power via the at least one antenna.

According to an embodiment of the present disclosure, the at least one type of communication may include short-range communication.

According to an embodiment of the present disclosure, the at least one type of communication may include MST or NFC).

According to an embodiment of the present disclosure, the first circuit may wirelessly receive or transmit power in an electromagnetic induction manner or an electromagnetic resonance manner.

According to an embodiment of the present disclosure, the at least one passive element or active element may include at least one capacitor connected to the third electric path.

According to an embodiment of the present disclosure, the at least one passive element or active element is connected to the second electric path, and may include a switch configured to electrically connect the at least one antenna and the second circuit to each other or to electrically disconnect the at least one antenna and the second circuit from each other.

According to an embodiment of the present disclosure, the electronic device may further include a control circuit electrically connected to the first circuit and the second circuit. The control circuit may adjust the switch to an off state when the first circuit wirelessly receives or transmits power using at least a portion of the at least one antenna.

According to an embodiment of the present disclosure, the electronic device may further include a detector configured to detect the state in which the first circuit wirelessly receives or transmits power using at least a portion of the at least one antenna.

According to an embodiment of the present disclosure, the at least one passive element or active element may include a TVS diode connected to the second electric path.

According to an embodiment of the present disclosure, the at least one antenna may include a first antenna and a second antenna. The first circuit may wirelessly receive or transmit power using the first antenna. The second circuit may perform at least one type of communication using the first antenna and the second antenna.

According to an embodiment of the present disclosure, the first antenna may include a first conductive line extending from a first end to a second end. The second antenna may include a second conductive line extending from a point on the conductive line to a third end.

According to an embodiment of the present disclosure, the at least one antenna may include a first contact formed at or near the first end of the first conductive line, a second contact formed at or near the second end of the first conductive line, and a third contact formed at or near the third end of the second conductive line. The first circuit and the second circuit may be electrically connected to the at least one antenna through the first contact, the second contact, and the third contact.

According to an embodiment of the present disclosure, the at least one antenna may further include a third antenna and a third circuit configured to wirelessly receive or transmit power using the third antenna.

According to an embodiment of the present disclosure, the first circuit may wirelessly receive or transmit power in an electromagnetic induction manner, and the third circuit may wirelessly receive or transmit power in an electromagnetic resonance manner.

According to an embodiment of the present disclosure, the first circuit and the second circuit may be formed as a single Integrated Circuit (IC).

According to an embodiment of the present disclosure, at least a portion of the at least one antenna includes a wound portion including a plurality of turns.

According to an embodiment of the present disclosure, the electronic device may further include a housing including a first face oriented in a first direction and a second face oriented in a second direction, which is opposite the first direction. The at least one antenna may be disposed in a plane, which is located between the first face and the second face and is substantially parallel to the first face.

Figure 18:
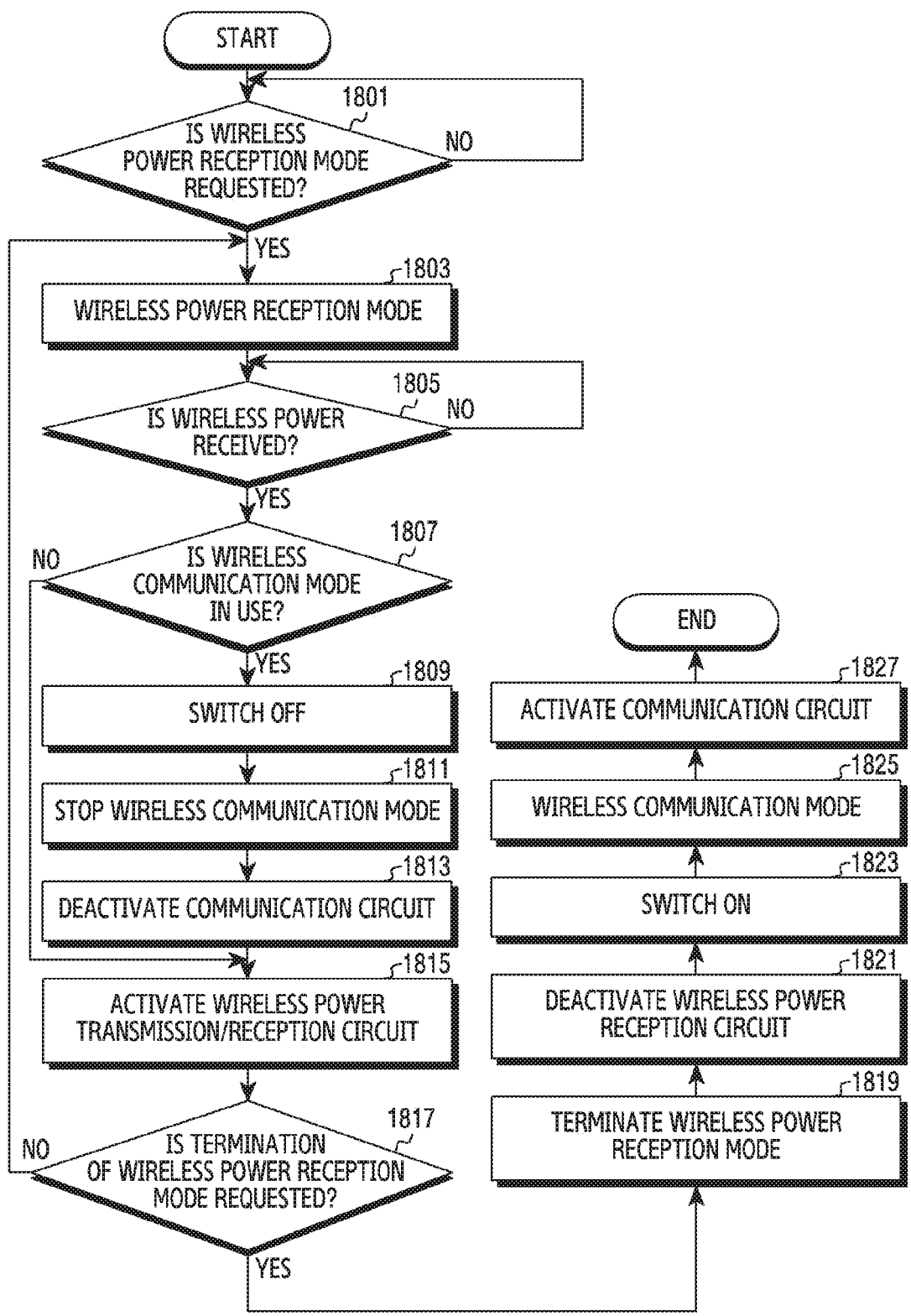
FIG. 18 is a flowchart of an operation of controlling a switch of a second connection circuit in the electronic device of FIG. 9, according to an embodiment of the present disclosure.

FIG. 18 is a flowchart of an operation of controlling a switch of a second connection circuit according to an embodiment of the present disclosure. According to various embodiments, the switch of the second connection circuit may include the switch of the second connection circuit 902 of FIG. 9, the switch of the second connection circuit 1102 of FIG. 11, the switch of the second connection circuit 1302 of FIG. 13, or the switch of the first connection circuit 1501 of FIG. 15.

Referring to FIG. 18, in operation 1801, a control circuit (e.g., the control circuit 640 in FIG. 6) may determine whether a request for a wireless power reception mode occurs.

When a request for the wireless power reception mode is detected in operation 1801, the control circuit 640 may enter the wireless power reception mode in operation 1803. According to an embodiment, the request for the wireless power reception mode may include at least a part of the input made via at least one input device (e.g., the input device 250 in FIG. 2) of the electronic device. According to various embodiments, the request for the wireless power reception mode may include at least a part of the input obtained from at least one sensor (e.g., the sensor module 240 in FIG. 2) of the electronic device. According to various embodiments, the request for the wireless power reception mode may include a signal received from an external device in a wireless or wired manner.

In operation 1805, the control circuit 640 may determine whether power is wirelessly received. For example, referring to FIG. 13 or 15, a control circuit (the control circuit 1340 in FIG. 13 or the control circuit 1540 in FIG. 15) is capable of determining power, which is wirelessly received from an external device in an electromagnetic induction manner, using an electromagnetic characteristic formed by a first antenna (the first antenna 1311 in FIG. 13 or the first antenna 1511 in FIG. 15) and a fourth connection circuit (the fourth connection circuit 1304 in FIG. 13 or the fourth connection circuit 1504 in FIG. 15). In another example, referring to FIG. 13 or 15, the control circuit 1340 or 1540 is capable of detecting power, which is wirelessly received from an external device in an electromagnetic resonance manner through a third antenna (the third antenna 1313 in FIG. 13 or the third antenna 1513 in FIG. 15), using a detector (the detector 1322 in FIG. 13 or the detector 1522 in FIG. 15).

When the state in which no power is wirelessly received in operation 1805 is detected, the control circuit 640 may again perform operation 1805 in the wireless power reception mode.

When the state in which power is wirelessly received in operation 1805 is detected, it is possible to determine whether the wireless communication mode is in use in operation 1807. For example, the wireless communication mode may include a short-range communication mode (e.g., an MST mode or an NFC mode).

When it is determined in operation 1807 that the wireless communication mode is not in use, the control circuit 640 may activate the wireless power transmission/reception circuit in operation 1815. The wireless power transmission/reception circuit is capable of wirelessly receiving power from an external device using at least one antenna.

When it is determined that the wireless communication mode is in use in operation 1807, the control circuit 640 may switch the switch to the off state in operation 1809. When the switch is turned off, the connection between the at least one antenna and the communication circuit can be released. For example, referring to FIG. 13 or 15, when the switch of the second connection circuit (the second connection circuit 1302 in FIG. 13 or the second connection circuit 1502 in FIG. 15) is turned off, the connection between the second antenna (the second antenna 1312 in FIG. 13 or the second antenna 1512 in FIG. 15) and the communication circuit (the communication circuit 1323 in FIG. 13 or the communication circuit 1523) can be released.

In operation 1811, the control circuit 640 may stop the wireless communication mode.

In operation 1813, the control circuit 640 may deactivate the communication circuit in accordance with the stoppage of the wireless communication mode.

In operation 1815, the control circuit 640 may activate the wireless power transmission/reception circuit. According to an embodiment, in the state in which the wireless communication mode is stopped, the wireless power transmission/reception circuit is capable of wirelessly receiving power from an external device using at least one antenna. As described above, since the switch is turned off, it is possible to prevent power from leaking to the communication circuit when the power is wirelessly received from an external device. Thereby, it is possible to prevent the communication circuit from being damaged.

In operation 1817, the control circuit 640 may determine whether a request for terminating a wireless power reception mode occurs.

When the request for terminating the wireless power reception mode is detected in operation 1817, the control circuit 640 may execute operation 1803 and subsequent operations again.

When the request for terminating the wireless power reception mode is detected in operation 1817, the control circuit 640 may terminate the wireless power reception mode in operation 1819. According to an embodiment, the request for terminating the wireless power reception mode may include at least part of the input obtained from at least one input device (e.g., the input device 250 in FIG. 2) or at least one sensor (e.g., the sensor module 240 in FIG. 2) of the electronic device. According to various embodiments, the request for terminating the wireless power reception mode may include a signal received from an external device in a wireless or wired manner.

In operation 1821, the control circuit 640 may deactivate the wireless power circuit in accordance with the termination of the wireless power reception mode.

In operation 1823, the control circuit 640 may switch the switch to the on state. According to an embodiment, when the switch is turned on, at least one of the antenna and the communication circuit may be electrically connected.

In operation 1825, the control circuit 640 may enter the wireless communication mode.

In operation 1827, the control circuit 640 may activate the communication circuit in accordance with the wireless communication mode. According to an embodiment, the communication circuit may perform various types of communication (e.g., short-range communication) using at least one antenna.

According to various embodiments, an operation flow similar to or the same as that of FIG. 18 may also be executed for the wireless power transmission mode instead of the wireless power reception mode.

Figure 19:
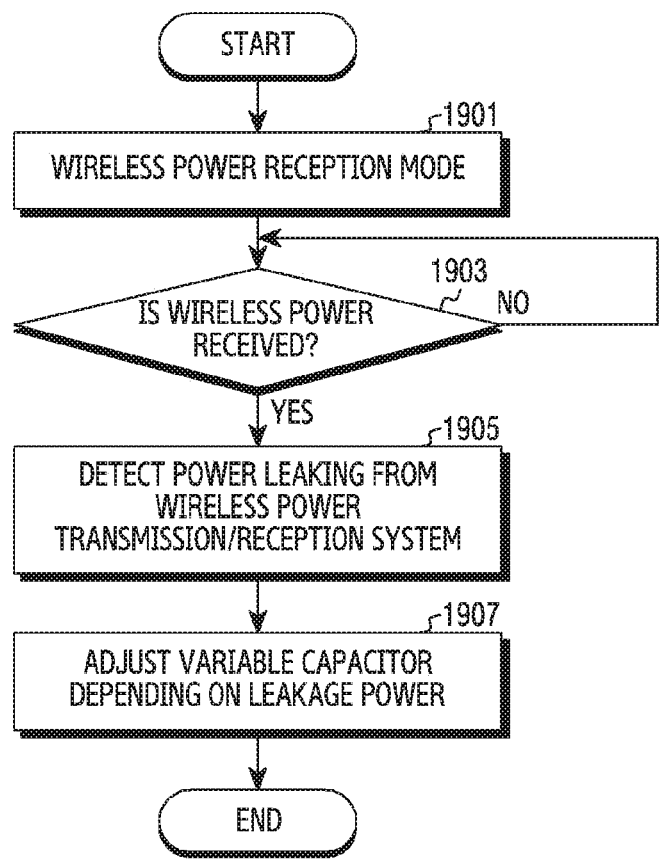
FIG. 19 illustrates an operation flow of controlling a variable capacitor of the first connection circuit in the electronic device of FIG. 9, according to an embodiment of the present disclosure.

FIG. 19 illustrates an operation flow of controlling a variable capacitor of the first connection circuit according to an embodiment of the present disclosure. According to various embodiments, the variable capacitor of the first connection circuit may include the variable capacitor of the first connection circuit 901 of FIG. 9, the variable capacitor of the first connection circuit 1101 of FIG. 11, the variable capacitor of the first connection circuit 1301 of FIG. 13, or the variable capacitor of the first connection circuit 1501 of FIG. 15.

Referring to FIG. 19, in operation 1901, the control circuit (e.g., the control circuit 640 of FIG. 6) may enter a wireless power transmission/reception mode.

In operation 1903, the control circuit 640 may determine whether power is wirelessly received. For example, referring to FIG. 13 or 15, a control circuit (the control circuit 1340 in FIG. 13 or the control circuit 1540 in FIG. 15) is capable of detecting power that is wirelessly received from an external device in an electromagnetic induction manner using an electromagnetic characteristic formed by a first antenna (the first antenna 1311 in FIG. 13 or the first antenna 1511 in FIG. 15) and a fourth connection circuit (the fourth connection circuit 1304 in FIG. 13 or the fourth connection circuit 1504 in FIG. 15). In another example, referring to FIG. 13 or 15, the control circuit (the control circuit 1340 in FIG. 13 or the control circuit 1540 in FIG. 15) is capable of detecting power that is wirelessly received from an external device in an electromagnetic resonance manner through a third antenna (the third antenna 1313 in FIG. 13 or the third antenna 1513 in FIG. 15), via a detector (the detector 1322 in FIG. 13 or the detector 1522 in FIG. 15).

When wirelessly received power is detected in operation 1903, the control circuit 640 may measure the power (e.g., voltage) that leaks from the wireless power transmission/reception system in operation 1905. According to an embodiment, referring to FIG. 13, the wireless power transmission/reception system may be an electromagnetic-induction-type wireless power transmission/reception system that includes the first antenna 1311 and the first power transmission/reception circuit 1321a. According to various embodiments, the wireless power transmission/reception system may be an electromagnetic-resonance-type wireless power transmission/reception system that includes the third antenna 1313 and the second power transmission/reception circuit 1321b. Power that leaks to the communication system including the first antenna 1311, the second antenna 1312, and the communication circuit 1323 may be generated while power is received wirelessly.

In operation 1907, the control circuit 640 may adjust the variable capacitor depending on the detected leakage power. According to an embodiment, the control circuit 640 may adjust the variable capacitor of the first connection circuit (e.g., the first connection part 901 in FIG. 1), the variable capacitor of the first connection circuit 1101 of FIG. 11, the variable capacitor of the first connection circuit 1301 of FIG. 13, or the variable capacitor of the first connection circuit 1501 of FIG. 15 according to the detected leakage power. For example, the larger the detected leakage power, the more the control circuit 640 may increase the capacitance of the variable capacitor connected in parallel to the communication circuit 923, 1123, 1323 or 1523. According to various embodiments, the smaller the detected leakage power, the more the control circuit 640 may decrease the capacitance of the variable capacitor connected in parallel to the communication circuit 923, 1123, 1323 or 1523.

According to an embodiment of the present disclosure, a method of operating an electronic device may include wirelessly receiving or transmitting power through at least one antenna and isolating a short-range communication circuit in the electronic device from wireless power when wirelessly receiving or transmitting power through the at least one antenna.

According to an embodiment of the present disclosure, the isolating operation may disconnect the electrical connection between the at least one antenna and the short-range communication circuit.

According to various embodiments, an operation flow which is similar to or the same as that of FIG. 19 may also be executed for the wireless power transmission mode instead of the wireless power reception mode.

Meanwhile, the above-described embodiments of the present disclosure may be prepared in the form of a program that is executable in a computer, and may be implemented in a general-purpose digital computer that executes the program using a computer-readable recording medium. In addition, a data structure used in the above-described embodiments of the present disclosure may be recorded on a computer-readable recording medium through various means. The computer-readable recording medium may include storage medium, such as a magnetic storage medium (e.g., a ROM, a floppy disc, or a hard disc) or an optical reading medium (e.g., a CD-ROM or a DVD).

The present disclosure has been described above with reference to preferred embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

The invention claimed is:

1. An electronic device comprising:
at least one antenna;
a first circuit configured to wirelessly receive or transmit power using at least a portion of the at least one antenna;
a second circuit configured to perform at least one type of communication using at least a portion of the at least one antenna;
a first electric path configured to connect the at least one antenna and the first circuit;
a second electric path configured to connect the at least one antenna and the second circuit;
a third electric path configured to connect a point on the first electric path and a point on the second electric path; and
at least one passive element or active element connected to at least one of the first electric path, the second electric path, and the third electric path,
wherein the at least one passive element or active element blocks introduction of a wireless power signal into the second circuit when the first circuit wirelessly receives or transmits power via the at least one antenna.

2. The electronic device of claim 1, wherein the at least one type of communication includes a short-range communication.

3. The electronic device of claim 2, wherein the at least one type of communication includes a magnetic secure transmission (MST), or a near field communication (NFC).

4. The electronic device of claim 1, wherein the first circuit wirelessly receives or transmits power in an electromagnetic induction manner or an electromagnetic resonance manner.

5. The electronic device of claim 1, wherein the at least one passive element or active element includes at least one capacitor connected to the third electric path.

6. The electronic device of claim 1, wherein the at least one passive element or active element is connected to the second electric path and includes a switch configured to electrically connect the at least one antenna and the second circuit to each other or to electrically disconnect the at least one antenna and the second circuit from each other.

7. The electronic device of claim 6, wherein the electronic device further comprises a control circuit electrically connected to the first circuit and to the second circuit, and
wherein the control circuit adjusts the switch to an off state when the first circuit wirelessly receives or transmits power using at least a portion of the at least one antenna.

8. The electronic device of claim 7, further comprising:
a detector configured to detect a state in which the first circuit wirelessly receives or transmits power using at least a portion of the at least one antenna.

9. The electronic device of claim 1, wherein the at least one antenna includes a first antenna and a second antenna, the first circuit wirelessly receives or transmits power using the first antenna, and the second circuit performs at least one type of communication using the first antenna and the second antenna.

10. The electronic device of claim 9, wherein the first antenna includes a first conductive line extending from a first end to a second end, and the second antenna includes a second conductive line extending from a point on the conductive line to a third end.

11. The electronic device of claim 10, wherein the at least one antenna includes a first contact formed at or near the first end of the first conductive line, a second contact formed at or near the second end of the first conductive line, and a third contact formed at or near the third end of the second conductive line, and
wherein the first circuit and the second circuit are electrically connected to the at least one antenna through the first contact, the second contact, and the third contact.

12. The electronic device of claim 9, wherein the at least one antenna further includes a third antenna,
wherein the electronic device further comprises a third circuit configured to wirelessly receive or transmit power using the third antenna.

13. The electronic device of claim 12, wherein the first circuit wirelessly receives or transmits power in an electromagnetic induction manner, and
wherein the third circuit wirelessly receives or transmits power in an electromagnetic resonance manner.

14. The electronic device of claim 1, wherein the first circuit and the second circuit are formed as a single integrated circuit (IC).

15. The electronic device of claim 1, wherein at least a portion of the at least one antenna includes a wound portion including a plurality of turns.

16. The electronic device of claim 1, further comprising:
a housing including a first face oriented in a first direction and a second face oriented in a second direction, which is opposite the first direction,
wherein the at least one antenna is disposed in a plane that is located between the first face and the second face and is substantially parallel to the first face.

17. The electronic device of claim 1, wherein the at least one passive element or active element includes a transient voltage suppressor (TVS) diode connected to the second electric path.

18. A method of operating an electronic device, comprising:
wirelessly receiving or transmitting power through at least one antenna; and
isolating a short-range wireless communication circuit in the electronic device from wireless power when wirelessly receiving or transmitting power through the at least one antenna,
wherein the short-range wireless communication circuit is configured to wirelessly transmit data based on at least one of wireless fidelity (Wi-Fi) communication, Bluetooth communication, near field communication (NFC), global navigation satellite system (GNSS) communication or magnetic secure transmission (MST) communication.

19. The method of claim 18, wherein the isolating disconnects the electrical connection between the at least one antenna and the short-range wireless communication circuit.

\* \* \* \* \*